(12) United States Patent
Tosh et al.

(10) Patent No.: US 10,782,421 B2
(45) Date of Patent: Sep. 22, 2020

(54) PHOTONIC CALORIMETER AND PROCESS FOR PERFORMING CALORIMETRY

(71) Applicant: Government of the United States of America, as represented by the Secretary of Commerce, Gaithersburg, MD (US)

(72) Inventors: Ronald Tosh, Frederick, MD (US); Zeeshan Ahmed, Washington, DC (US); Ryan P. Fitzgerald, Washington, DC (US); Nikolai Klimov, Ellicott City, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 33 days.

(21) Appl. No.: 16/276,939

(22) Filed: Feb. 15, 2019

(65) Prior Publication Data

US 2019/0293809 A1    Sep. 26, 2019

Related U.S. Application Data

(60) Provisional application No. 62/647,515, filed on Mar. 23, 2018.

(51) Int. Cl.
  *G01T 1/12* (2006.01)
  *G01T 1/02* (2006.01)
  (Continued)

(52) U.S. Cl.
  CPC ............... *G01T 1/12* (2013.01); *G01T 1/026* (2013.01); *G01T 7/00* (2013.01); *G02B 6/124* (2013.01);
  (Continued)

(58) Field of Classification Search
  CPC .......... G02B 2006/12107; G02B 6/124; G02B 6/29338; G02B 6/29323; G01T 1/12; G01T 1/026; G01T 7/00
  See application file for complete search history.

(56) References Cited

U.S. PATENT DOCUMENTS 9,726,553 B2 *   8/2017  Ahmed ................. G01K 11/00
2003/0043879 A1 * 3/2003  Tanaka ..................... G01T 1/12
                                                      374/31

(Continued)

OTHER PUBLICATIONS

De Leonardis, F., et al., "Modeling of Radiation Effects in Silicon Photonic Devices", IEEE Transactions on Nuclear Science, 2015, 2155-2168, vol. 62, No. 5.

(Continued)

*Primary Examiner* — Taeho Jo
(74) *Attorney, Agent, or Firm* — Office of Chief Counsel for National Institute of Standards and Technology

(57) ABSTRACT

A photonic calorimeter converts ionizing radiation dose to heat and includes: a radiation absorber, a temperature compensator disposed within the radiation absorber, a compensation waveguide, a compensation resonator, a compensation resonator, a thermal isolator on which the radiation absorber is disposed and that thermally isolates the radiation absorber from heat loss by thermal transfer due to physical contact by an object, and the temperature compensator changes the optical resonance of the compensation resonator in response to a change in temperature of the radiation absorber due to absorption of the ionizing radiation by the radiation absorber.

10 Claims, 48 Drawing Sheets

(51) Int. Cl.
*G01T 7/00* (2006.01)
*G02B 6/12* (2006.01)
*G02B 6/124* (2006.01)
*G02B 6/293* (2006.01)

(52) U.S. Cl.
CPC ...... *G02B 6/29323* (2013.01); *G02B 6/29338* (2013.01); *G02B 2006/12107* (2013.01)

(56) References Cited

U.S. PATENT DOCUMENTS

| | | | | |
|---|---|---|---|---|
| 2009/0101875 | A1* | 4/2009 | Boyden | A61K 41/0042 252/600 |
| 2009/0104179 | A1* | 4/2009 | Boyden | A61K 41/0042 424/130.1 |
| 2012/0156763 | A1* | 6/2012 | Wikswo | G01N 33/5038 435/287.1 |
| 2014/0321502 | A1* | 10/2014 | Ahmed | G01K 11/00 374/130 |
| 2015/0108356 | A1* | 4/2015 | Seuntjens | G01T 1/12 250/370.07 |
| 2016/0258942 | A1* | 9/2016 | Scherer | A61B 5/1459 |
| 2017/0173367 | A1* | 6/2017 | Seuntjens | G01K 17/003 |
| 2018/0045835 | A1* | 2/2018 | Kher | G01T 1/201 |
| 2020/0041508 | A1* | 2/2020 | Scherer | G01N 33/552 |

OTHER PUBLICATIONS

Grillanda, S., et al., "Gamma radiation effects on silicon photonic waveguides", Optics Letters, 2016, 3053-3056, vol. 41 No. 13.
Desrosier, M., CIRMS Meeting, IAME Breakout Session II, "The Electronic Gray", http://cirms.org/pdf/cirms2016/CIRMS-2016-Desrosiers.pdf (conceptual art on 1 slide), Apr. 18, 2016.
Dusautoy, A.R., "The UK primary standard calormeter for photon-beam absorbed dose measurement", Phys. Med. Biol., 1996, 137-151, vol. 41, UK.

* cited by examiner

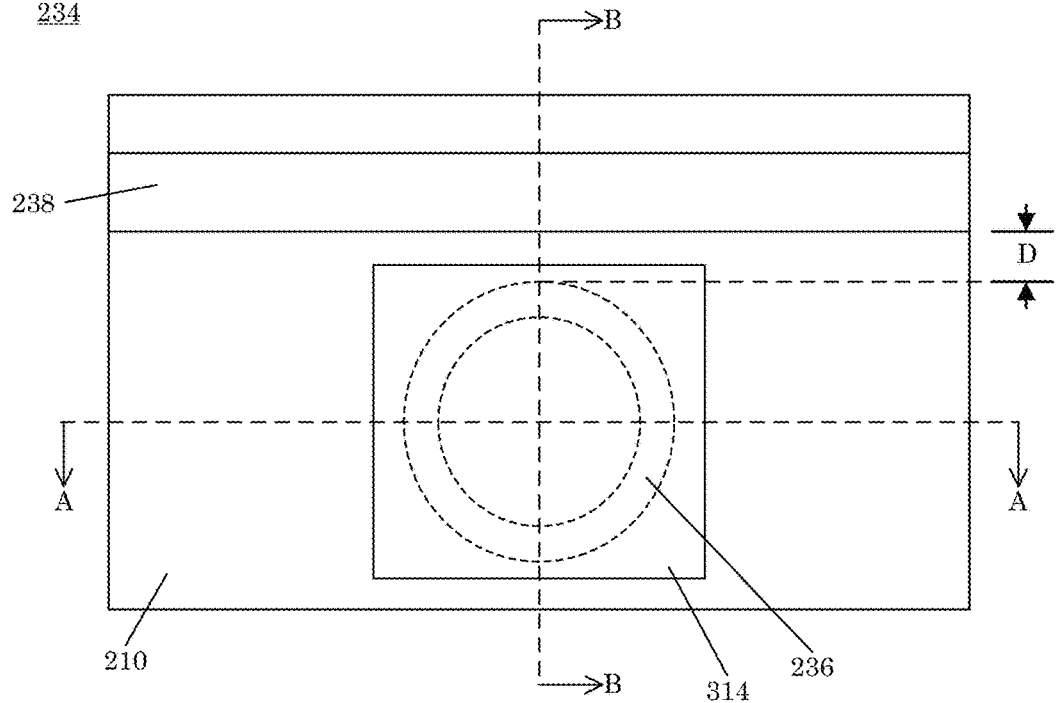
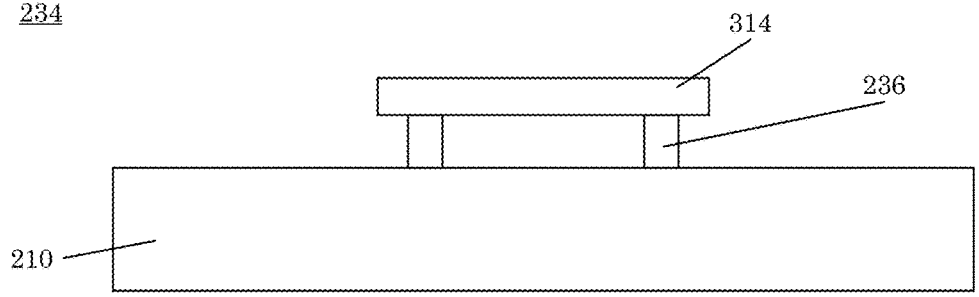
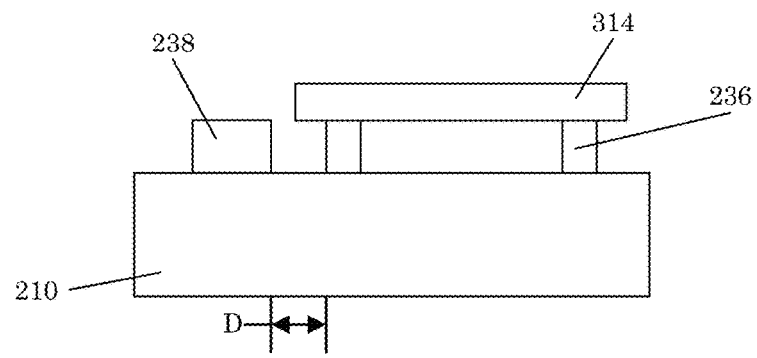
Figure 21

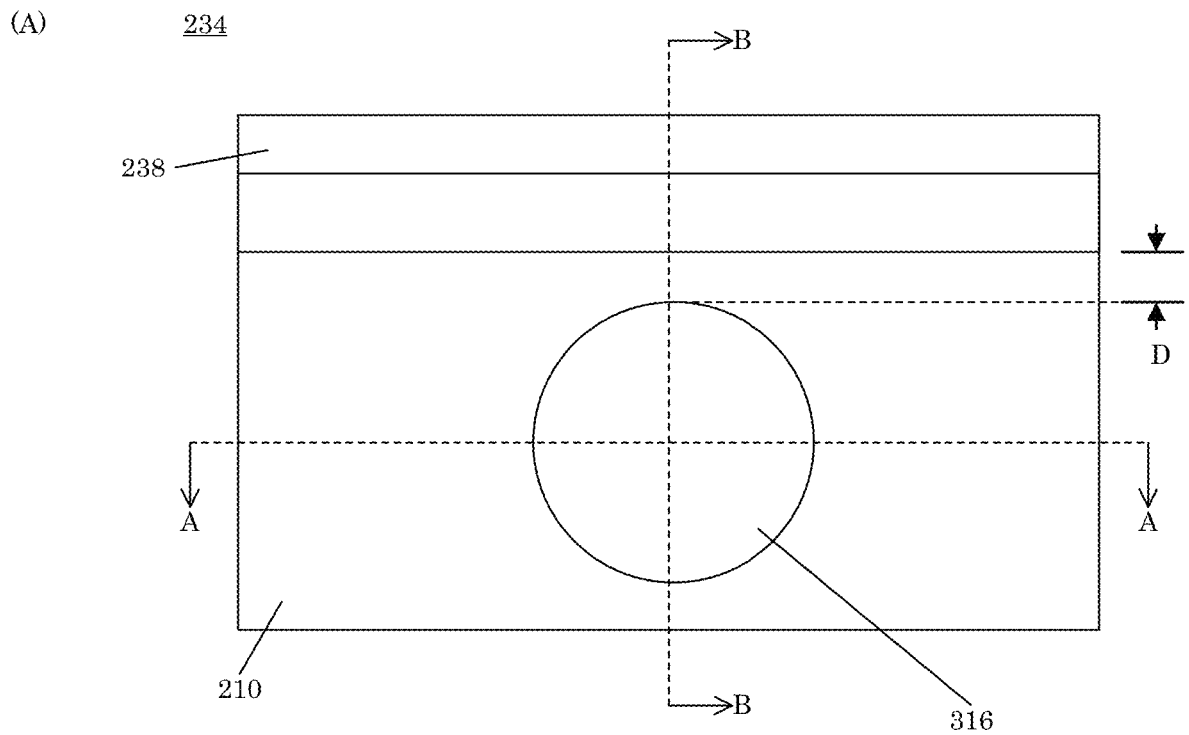
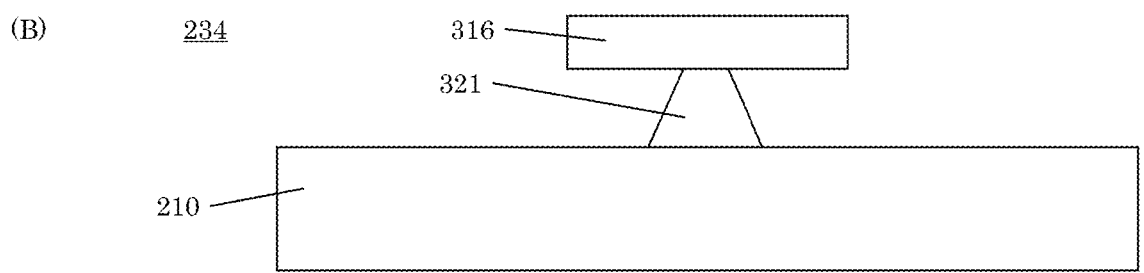
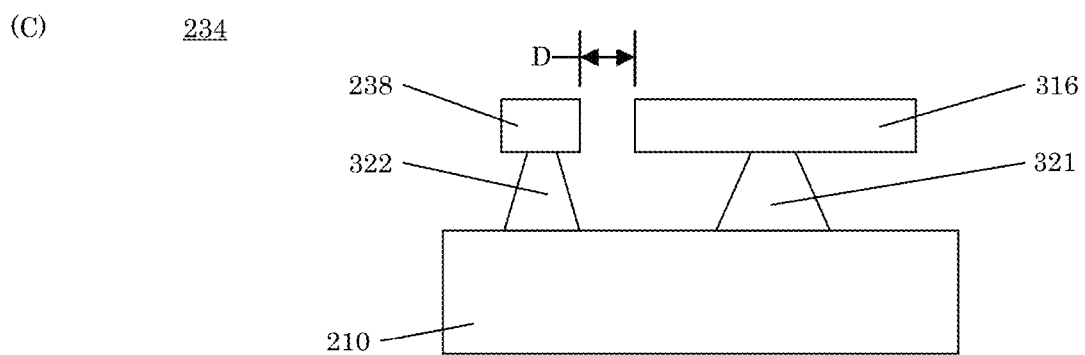
Figure 22

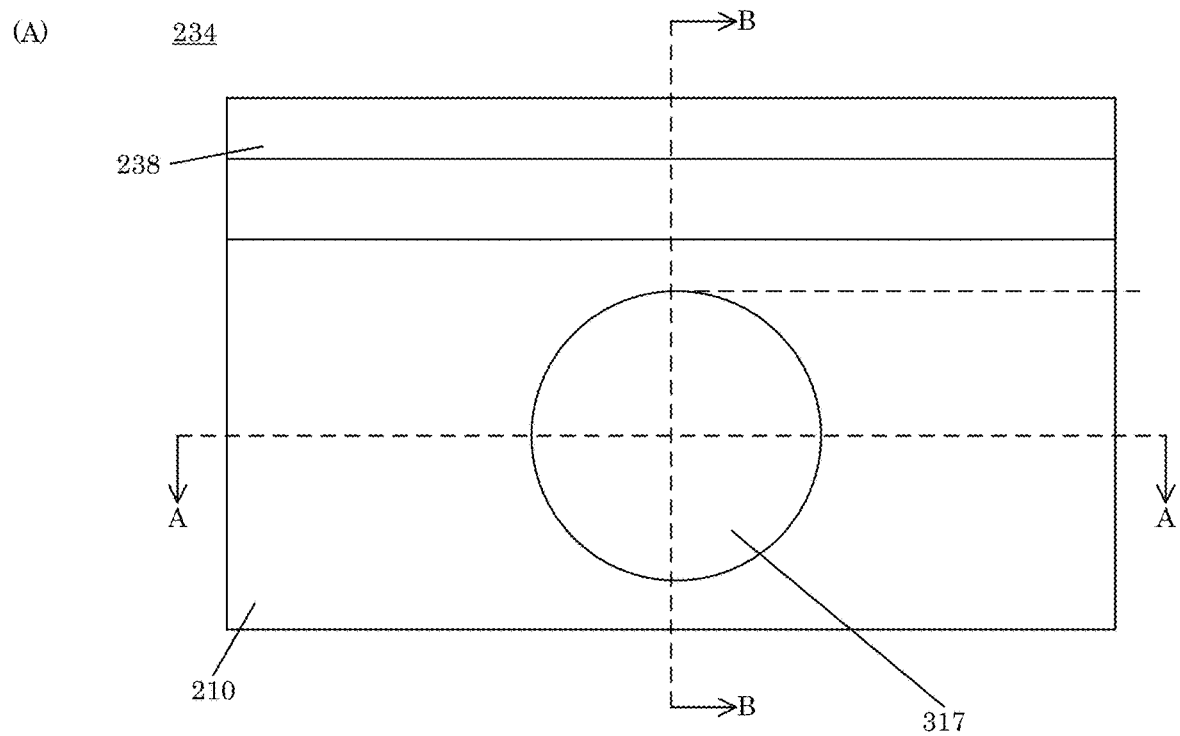
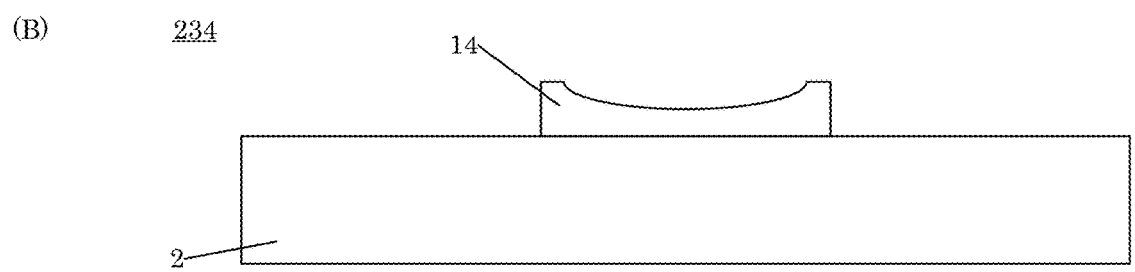
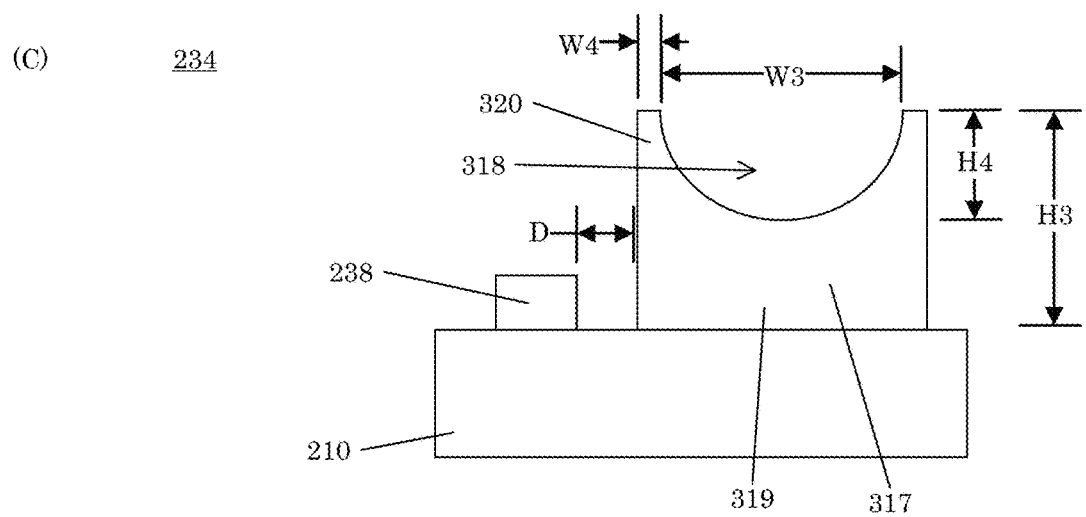
Figure 23

(A)
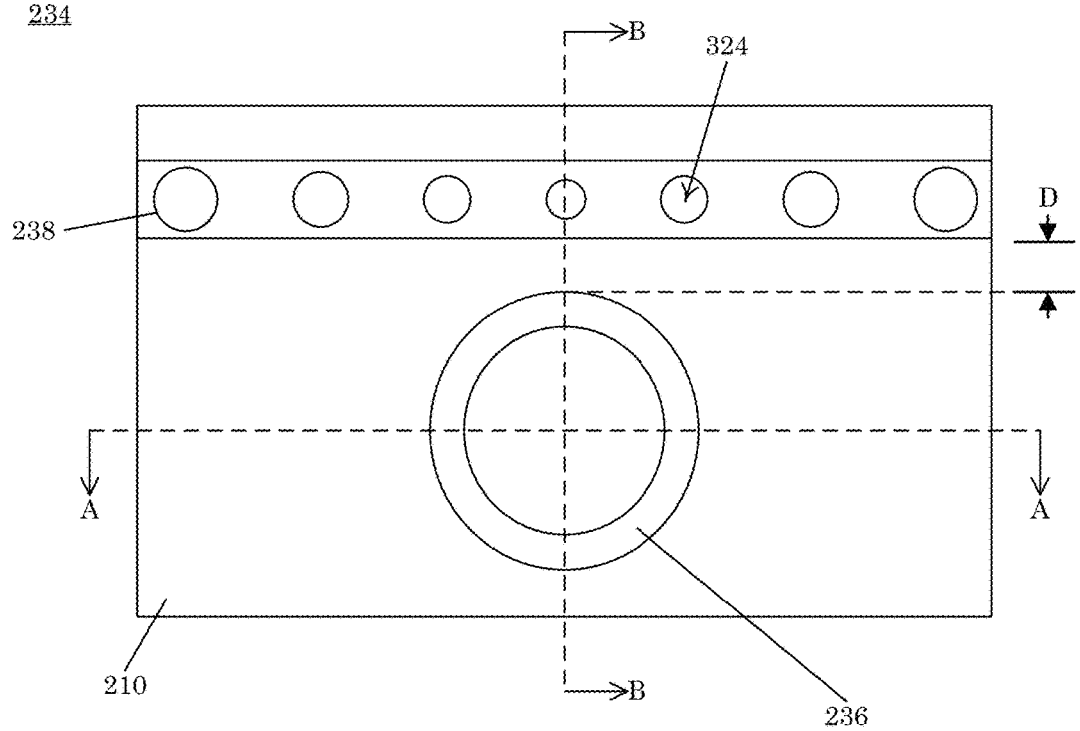
(B)
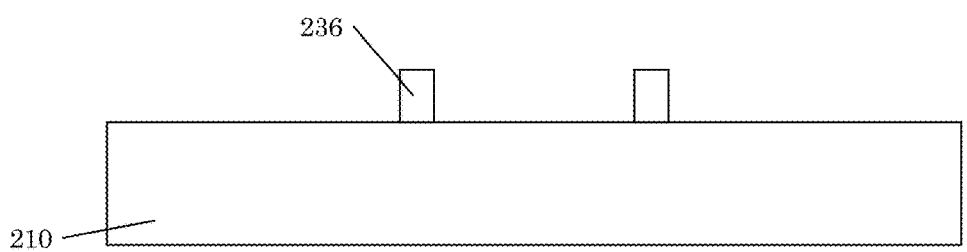
(C)
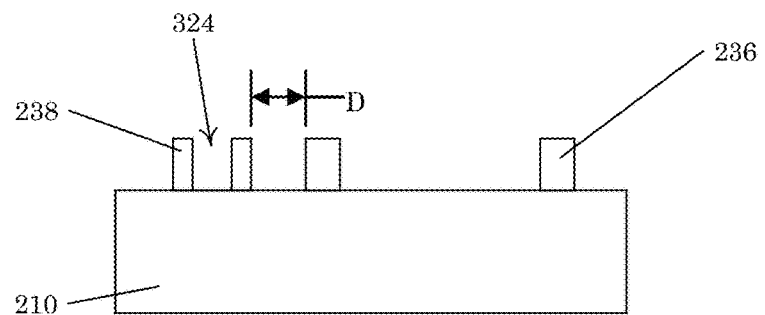
Figure 24

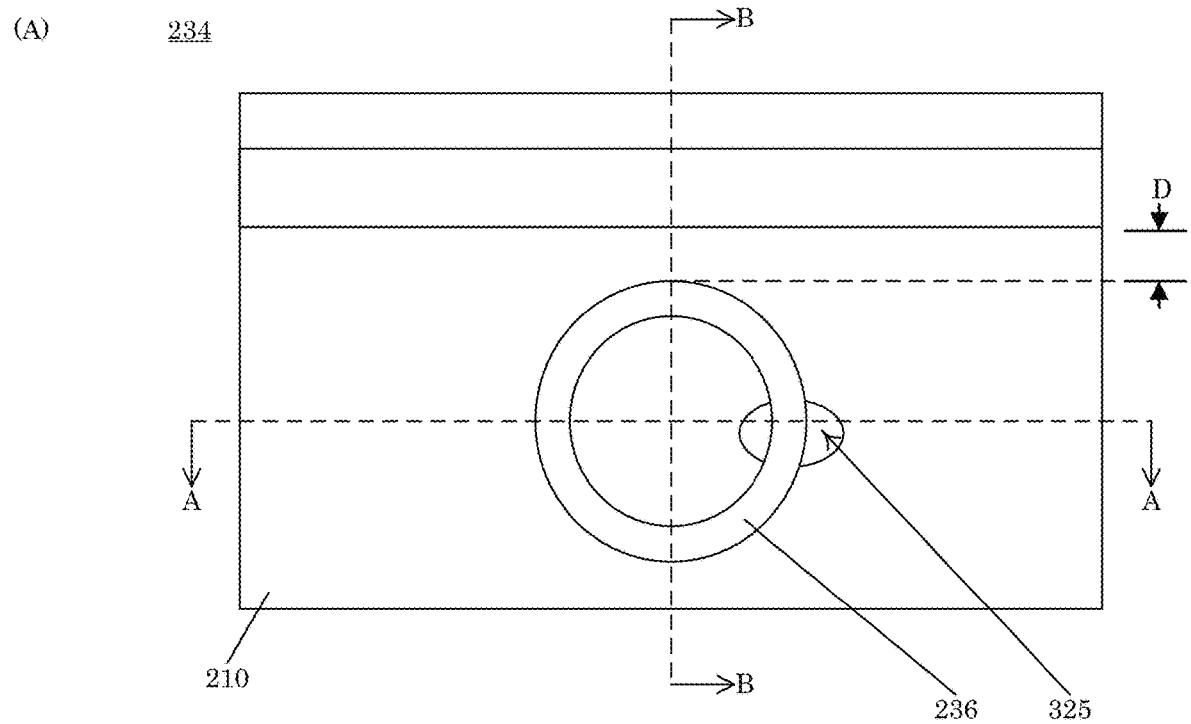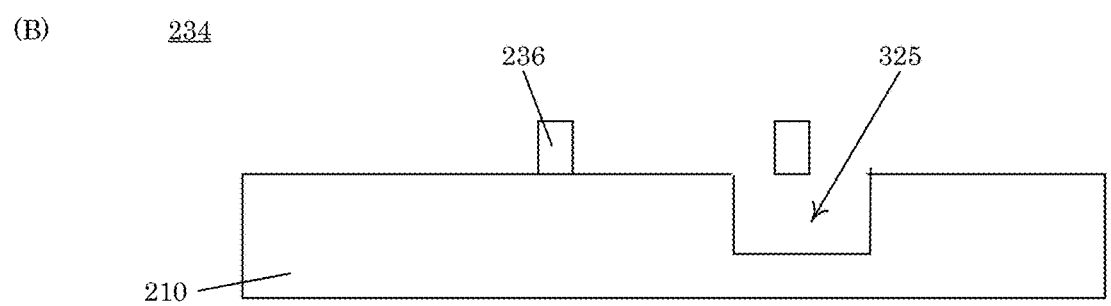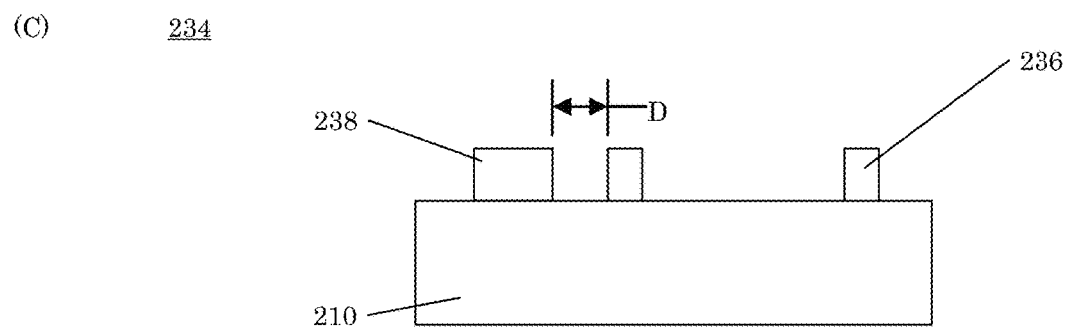
Figure 25

(A)
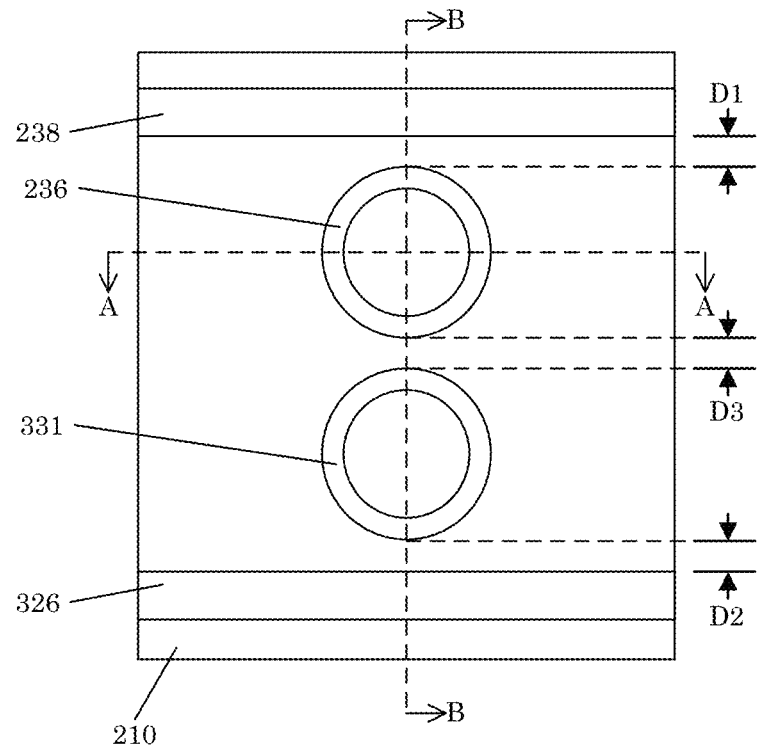
(B)
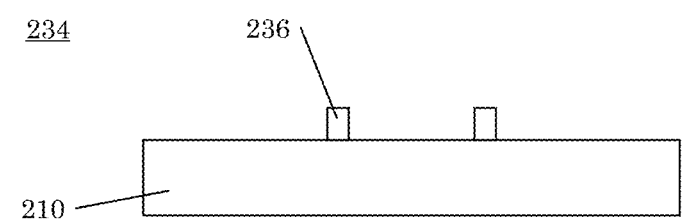
(C)
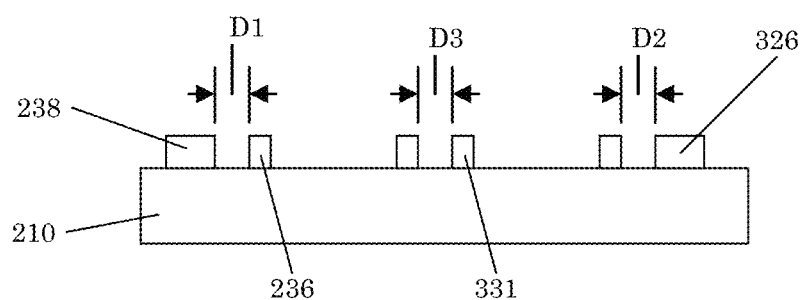
Figure 28

(A) 332
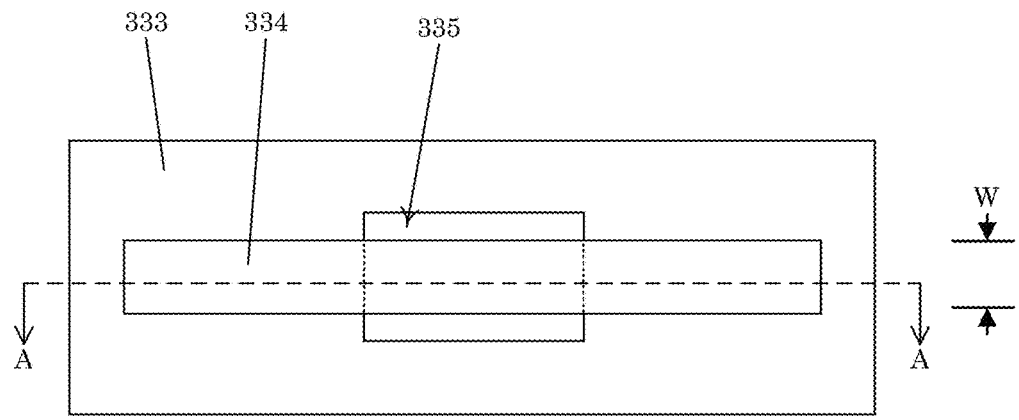
(B) 332
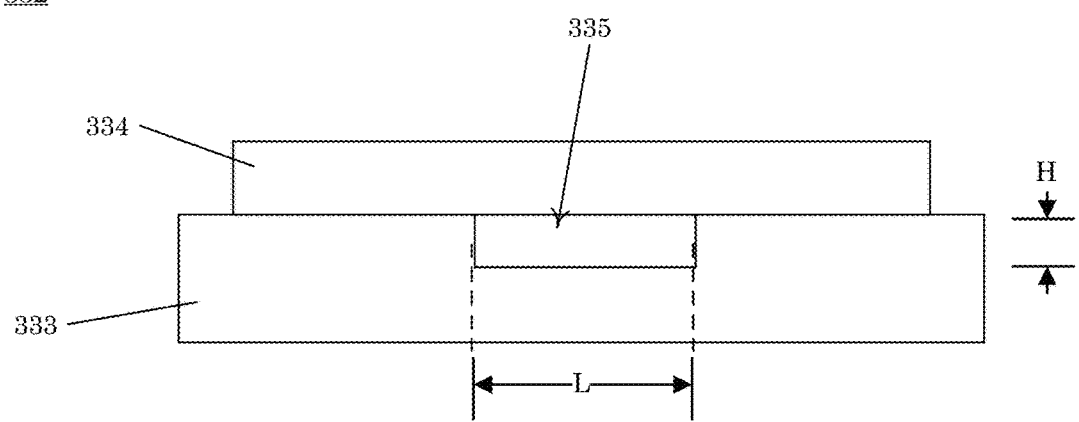
Figure 29

(A)
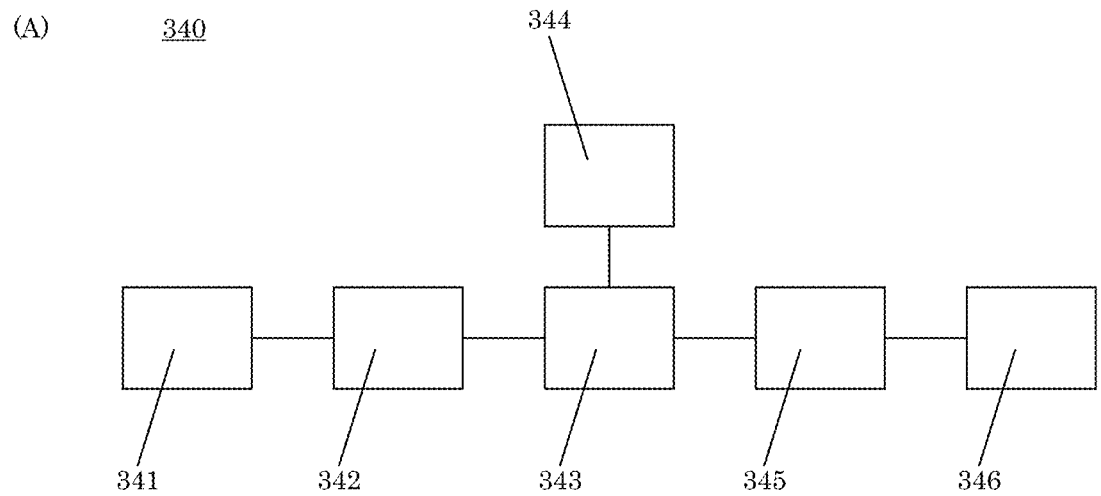
FIG. 15
(B)
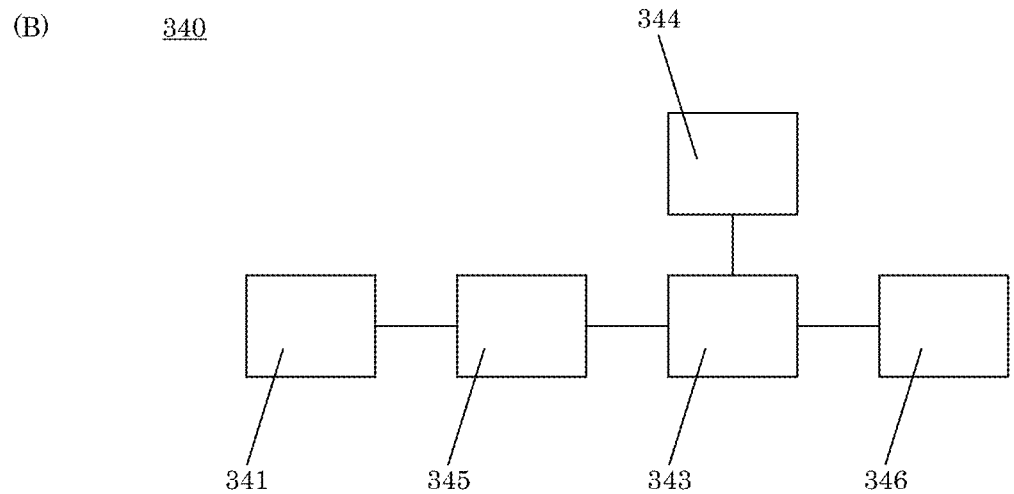
FIG. 16
Figure 34

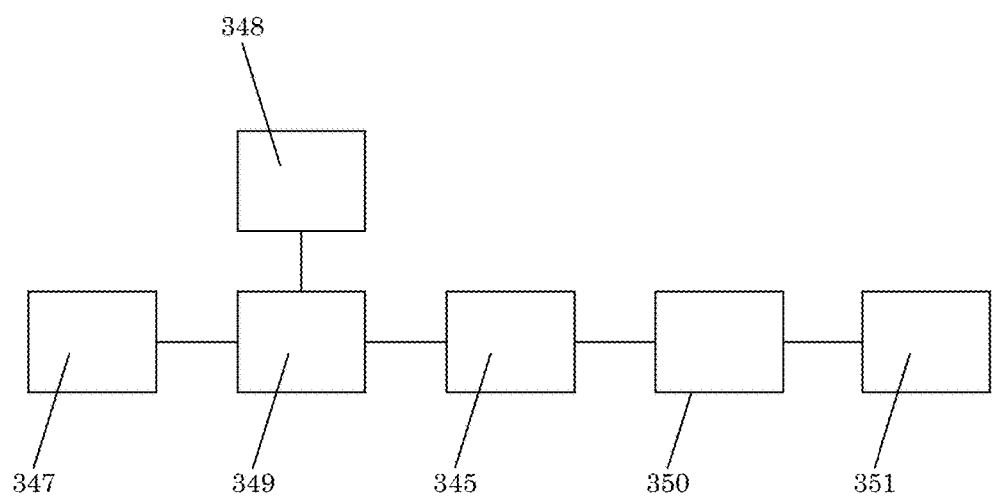
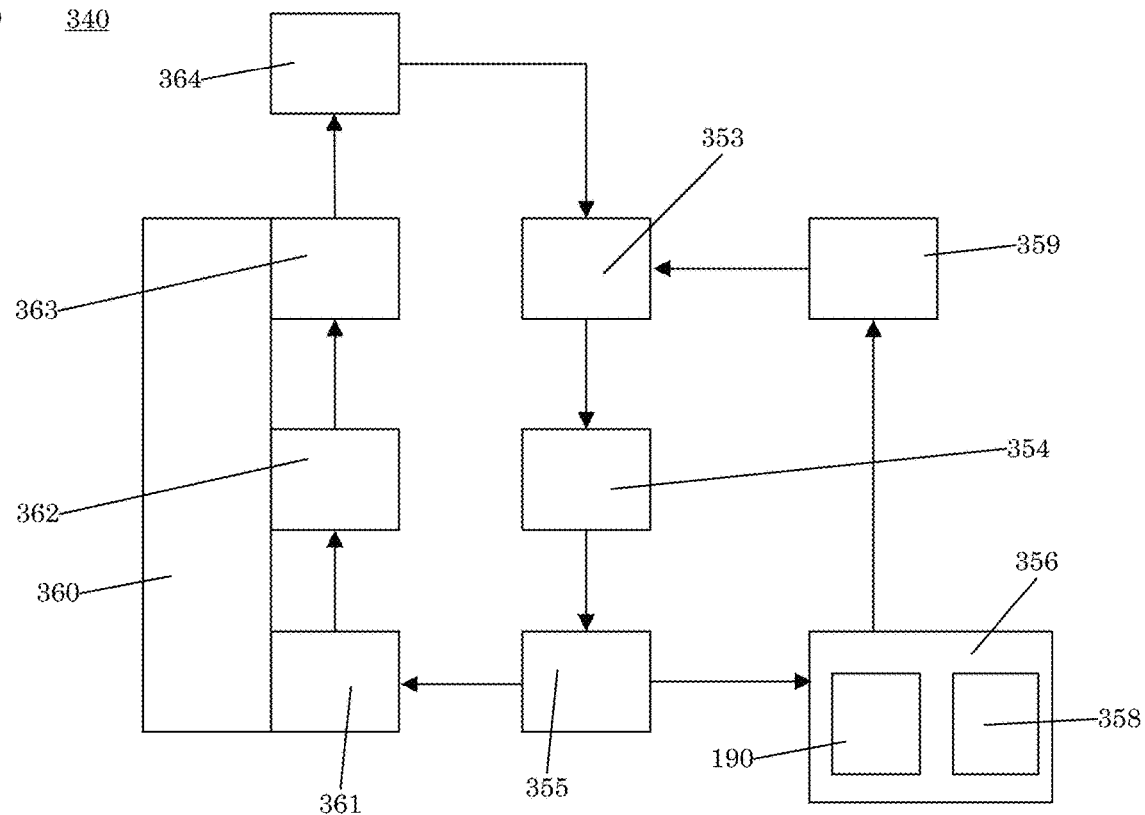
Figure 35

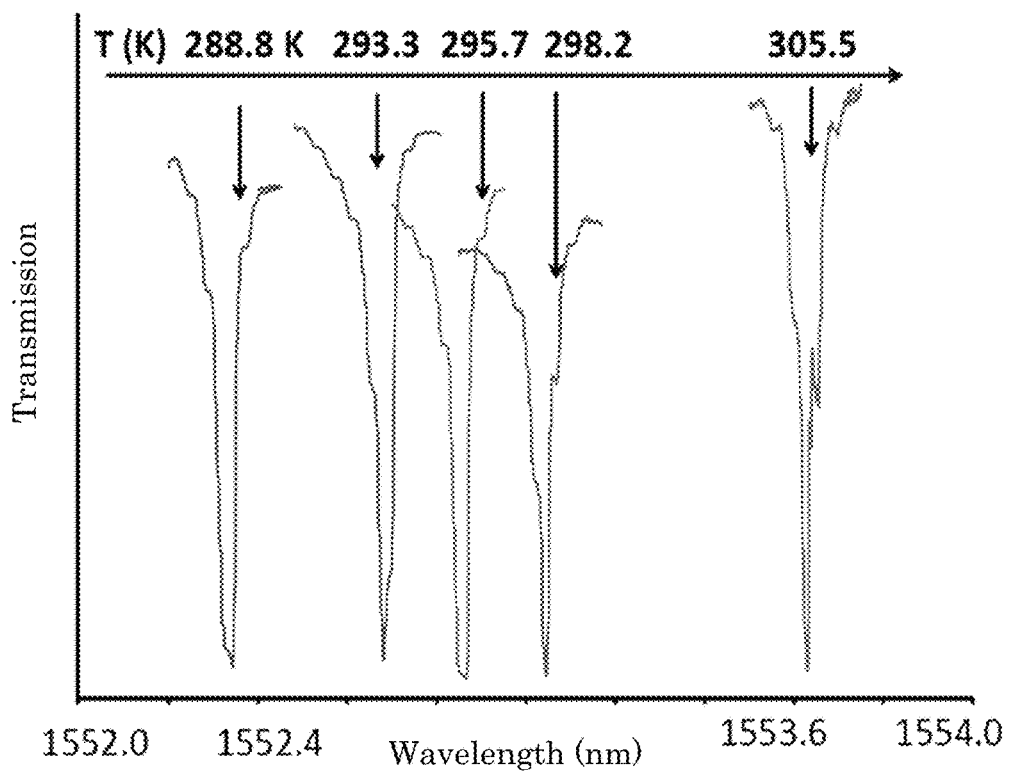
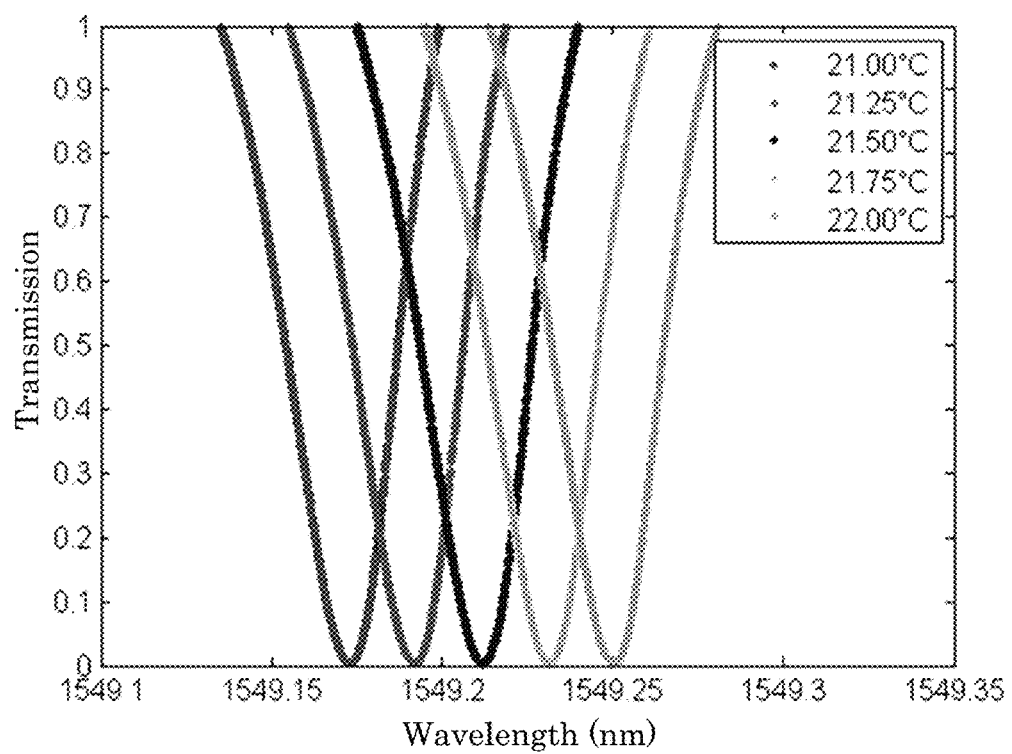
Figure 40

PHOTONIC CALORIMETER AND PROCESS FOR PERFORMING CALORIMETRY

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 17-025US1.

BRIEF DESCRIPTION

Disclosed is a photonic dosimeter to accrue cumulative dose, the photonic dosimeter comprising: a substrate; a waveguide disposed on the substrate and that: receives a primary input light; transmits secondary input light from the primary input light to a dosimatrix; receives a secondary output light from the dosimatrix; and produces primary output light from the secondary output light; the dosimatrix disposed on the substrate and in optical communication with the waveguide and that: receives the secondary input light from the waveguide; produces the secondary output light that is communicated to the waveguide; and comprises an active element that undergoes conversion from a prime state to a dosed state in response to receipt, by the active element, of a dose of radiation; and a cover layer disposed on waveguide and the dosimatrix.

A process for performing dosimetry with the photonic dosimeter, the process comprising: receiving, by the waveguide, primary input light; producing, by the waveguide, secondary input light from the primary input light; receiving, by the dosimatrix, the secondary input light from the waveguide; producing, by the dosimatrix, secondary output light from the secondary input light; receiving, by the waveguide, the secondary output light from the dosimatrix; producing, by the waveguide, primary output light from the secondary output light; subjecting the dosimatrix to ionizing radiation; and changing the active element from the prime state to the dosed state in response to receiving ionizing radiation by the dosimatrix to perform dosimetry.

A photonic calorimeter for converting ionizing radiation dose to heat, the photonic calorimeter comprising: a radiation absorber comprising a radiation absorber and a radiation absorber disposed in the radiation absorber and bounded by the radiation absorber such that the radiation absorber: receives ionizing radiation; and converts the ionizing radiation into heat; a temperature compensator disposed within the radiation absorber and comprising: a compensation waveguide disposed in optical communication with a compensation resonator and that: receives primary compensation input light; communicates a resonant frequency based on the primary compensation input light to the compensation resonator; receives secondary compensation output light from the compensation resonator; and transmits primary compensation output light that is based on the secondary compensation output light; and a compensation resonator disposed in optical communication with the compensation waveguide and that: comprises an optical resonance; receives, from the compensation waveguide, the resonant frequency corresponding to the optical resonance; and produces the secondary compensation output light in response to receipt of the resonant frequency; a thermal isolator on which the radiation absorber is disposed and that thermally isolates the radiation absorber from heat loss by thermal transfer due to physical contact by an object, and the temperature compensator changes the optical resonance of the compensation resonator in response to a change in temperature of the radiation absorber due to absorption of the ionizing radiation by the radiation absorber.

A process for performing calorimetry with the photonic calorimeter, the process comprising: receiving, by the compensation waveguide, primary compensation input light; producing, by the compensation waveguide, resonant frequency from the primary compensation input light; receiving, by the compensation resonator, the resonant frequency from the compensation waveguide; producing, by the compensation resonator, secondary compensation output light from the resonant frequency; receiving, by the compensation waveguide, the secondary compensation output light from the compensation resonator; producing, by the compensation waveguide, primary compensation output light from the secondary compensation output light; subjecting the radiation absorber to ionizing radiation; producing, by radiation absorber, heat from the ionizing radiation; communicating the heat to the compensation resonator; and changing the optical resonance of the compensation resonator in response to producing heat from the ionizing radiation by the ionizing radiation to perform calorimetry.

BRIEF DESCRIPTION OF THE DRAWINGS

The following description should not be considered limiting in any way. With reference to the accompanying drawings, like elements are numbered alike.

FIG. 21 shows a thermometer including a heater disposed on an optical resonator in panels A, B, and C;

FIG. 22 shows a thermometer in panels A, B, and C;

FIG. 23 shows a thermometer including an optical resonator having a conical shape in panels A, B, and C;

FIG. 24 shows a thermometer including a waveguide having a plurality of apertures in panels A, B, and C;

FIG. 25 shows a thermometer including an aperture;

FIG. 28 shows a thermometer including a plurality of optical resonators and a plurality of waveguides in panels A, B, and C;

FIG. 29 shows a thermometer including a waveguide in panels A and B;

FIG. 34 shows a thermometer system in panel A and a thermometer system in panel B;

FIG. 35 shows a thermometer system in panel A and a system to detect temperature of an article in panel B;

FIG. 40 shows a graph of transmission versus wavelength at a plurality of temperatures in panel A and a graph of normalized transmission versus wavelength at a plurality of temperatures in panel B;

DETAILED DESCRIPTION

Figure 1:
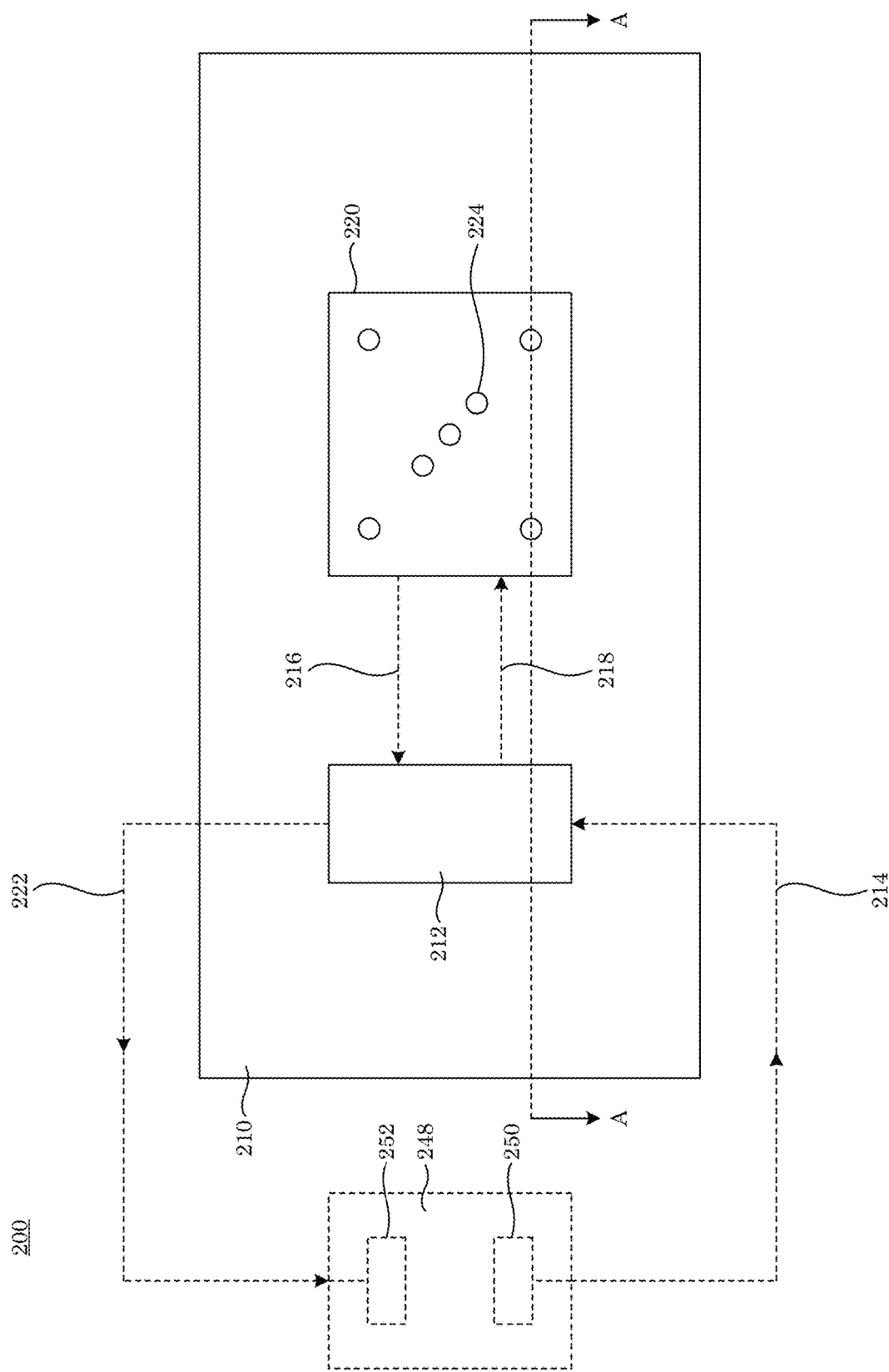
FIG. 1 shows a plan view of a photonic dosimeter.

A detailed description of one or more embodiments is presented herein by way of exemplification and not limitation.

The National Institute of Standards and Technology (NIST) uses water calorimetry as a primary standard for absorbed dose for which the SI unit is the gray (Gy), wherein a radioactive cobalt-60 (Co-60) source irradiates a volume of water, and the energy received is calculated from the rise in water temperature as measured by immersed thermistors to determine an estimated depth-dose profile. However, there is an urgent and growing interest in making dosimetry measurement at a smaller scale than provided by this primary standard. To this point, no conventional method directly measures radiation dose in such dimensions, and this capability is needed for medical and industrial applications such as microbeam therapy, microelectronics, and cellular dosimetry.

The NIST on a Chip (NOAC) program is researching a solution based on silicon chip fabrication and telecommunications technology. The goal is micro-scale calorimetry with photonic thermometers that are in the form of a fiber Bragg grating or silicon ring resonators embedded in a radiation-resistant substrate. These could be arranged to perform real-time dose measurements in a phantom, and eventually even in vivo.

Described here is a photonic dosimeter and photonic calorimeter that overcome limitations of conventional devices and provide photonic dosimetry and photon calorimetry that expand uses of photonic dosimetry and calorimetry. It is contemplated that arrays of miniaturized sensors of the photonic dosimeter and photonic calorimeter are multiplexed in an array separately or together on a chip measure radiation. These chips can be arranged to determine perform real-time absorbed-dose levels in a phantom and provide dosage tailored sensors for individual patients.

The photonic dosimeter and photonic calorimeter herein provide increased sensitivity, spatial resolution, optical readout, and multiplexing in devices. The photonic dosimeter and photonic calorimeter reduce dependence on Co-60 sources, include new portable sensors, and provide measurement articles for quantitative nuclear medicine. The photonic dosimeter and photonic calorimeter independently provide response of thousands of photonic thermometers through a single fiber optic interface. NIST research into fabricating the photonic dosimeter and photonic calorimeter shown that the photonic dosimeter and photonic calorimeter withstand exposure to ionizing radiation so that the photonic dosimeter and photonic calorimeter can be used harsh environments, such as space or energy-generation. Although a more detailed discussion follows, the photonic dosimeter and photonic calorimeter can be a silicon photonic device that can be irradiated with up 1 MGy of gamma radiation and 250 kGy of beta radiation, which is 10,000 times higher than medical radiation treatment levels, with little to no damage to the photonic devices and provide baseline drift in individual exposure over time that is negligible.

The photonic dosimeter and photonic calorimeter can include a photonic thermometer that is highly sensitive and resistant to change in response due to a physical impact. Moreover, the thermometer is useful as self-calibrating or self-diagnosing thermometer. The thermometer has an integrated optical resonator with a resonant frequency that changes with temperature due to thermal expansion or a thermo-optic effect of the optical resonator. The thermometer can include a thermal member to provide a selected temperature change to the optical resonator. Advantageously, the thermometer is to calibrate or determine a performance of an article, e.g., remotely. Further, the thermometer has a robust physical construction and is small, yet scalable. The thermometer also is rugged, does not require frequent, expensive, time-consuming re-calibration, and has a small thermal mass that does not rely upon voltage measurement for temperature determination. The thermometer can be fabricated in bulk quantities in a mass production environment. Beneficially, the thermometer involved temperature dependent light transmission and is resistant to electromagnetic interference. Additionally, the thermometer is deployable in harsh environments and supplants calibration of on-board temperature sensors.

Figure 2:
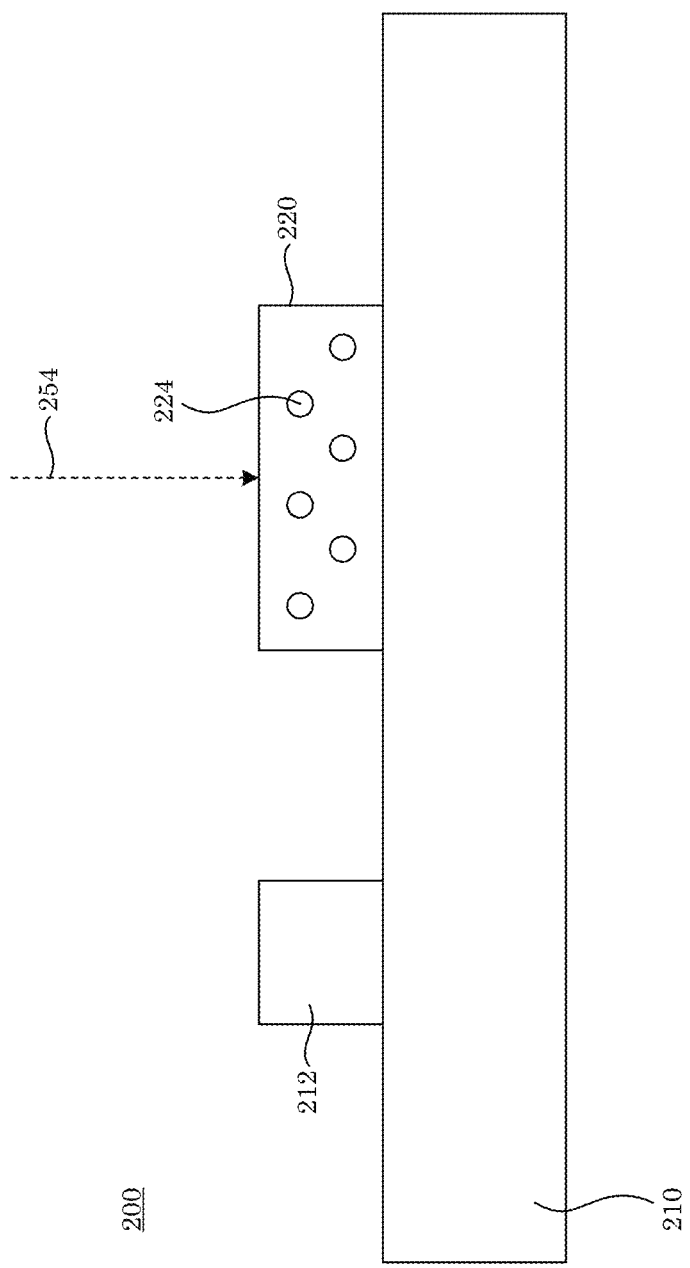
FIG. 2 shows a cross-section along line A-A of the photonic dosimeter shown in FIG. 1.

In an embodiment, with reference to FIG. 1 and FIG. 2, photonic dosimeter 200 accrues cumulative dose and includes substrate 210; waveguide 212 disposed on substrate 210. Waveguide 212 receives primary input light 214, transmits secondary input light 218 from primary input light 214 to dosimatrix 220; receives secondary output light 216 from dosimatrix 220, and produces primary output light 222 from secondary output light 216. Photonic dosimeter 200 also includes dosimatrix 220 disposed on substrate 210 and in optical communication with waveguide 212. Dosimatrix 220 receives secondary input light 218 from waveguide 212 and produces secondary output light 216 that is communicated to waveguide 212. Dosimatrix 220 includes active element 224 that undergoes conversion from prime state 230 to dosed state 232 in response to receipt, by active element 224, of a dose of radiation from being subjected to ionizing radiation 254; and cover layer 228 disposed on waveguide 212 and dosimatrix 220. In an embodiment, light member 248 includes light source 250 that provides primary input light 214 to waveguide 212 and light detector 252 that receives primary output light 222 from waveguide 212. Communication of primary input light 214 or primary output light 222 between light member 248 and waveguide 212 can be propagation through free space or propagation through a condensed optical medium such as a fiber optic cable, wherein a first fiber optical cable can interconnect light source 250 to waveguide 212, and a second fiber optical cable can interconnect light detector 252 to waveguide 212. It should be appreciated that communication of secondary input light 218 from waveguide 212 to dosimatrix 220 and that communication of secondary output light 216 from dosimatrix 220 to waveguide 212 is due to evanescent coupling between waveguide 212 and dosimatrix 220 in a presence of light, e.g., primary input light 214 in waveguide 212.

Figure 3:
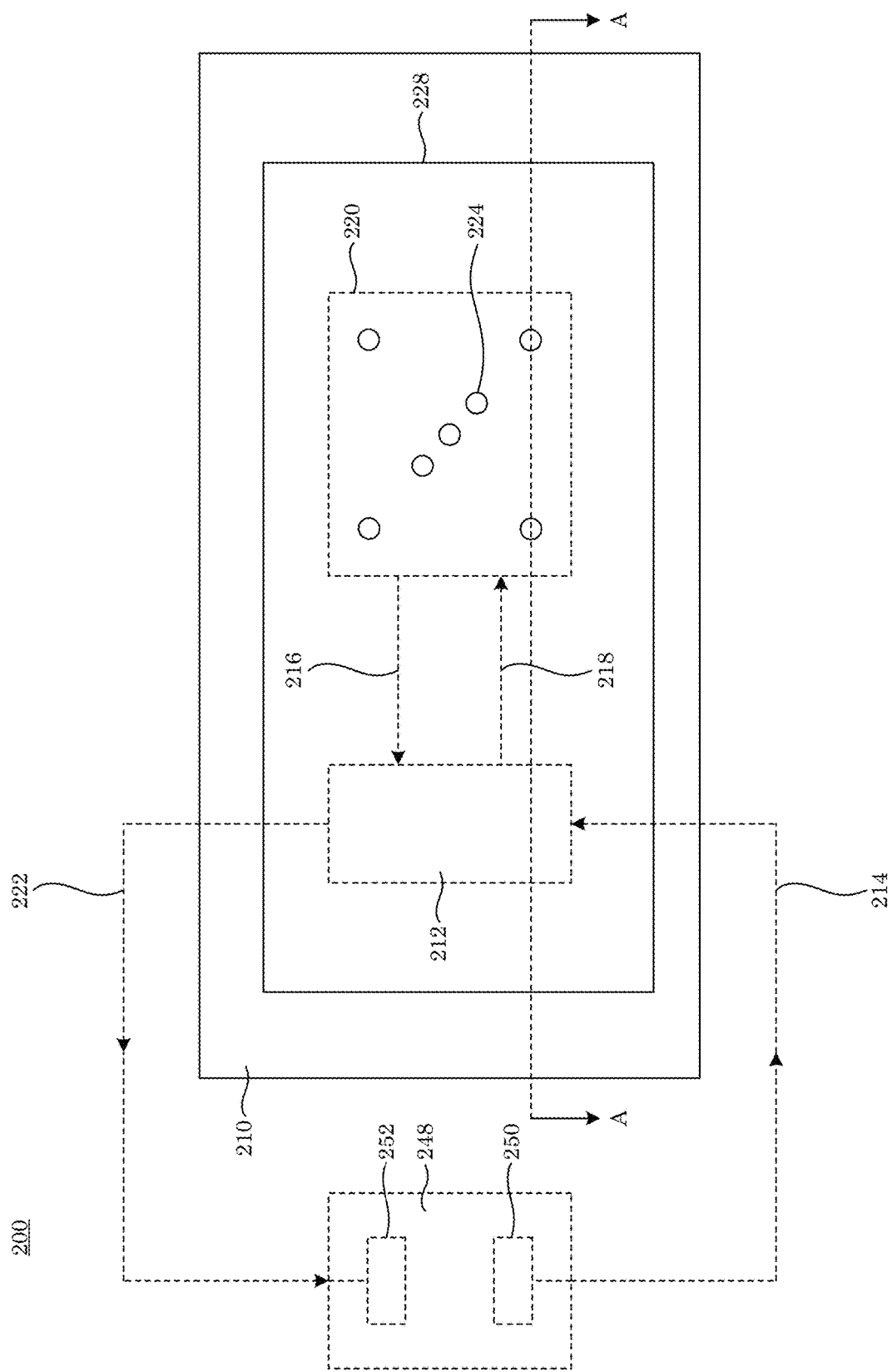
FIG. 3 shows a plan view of a photonic dosimeter.
Figure 4:
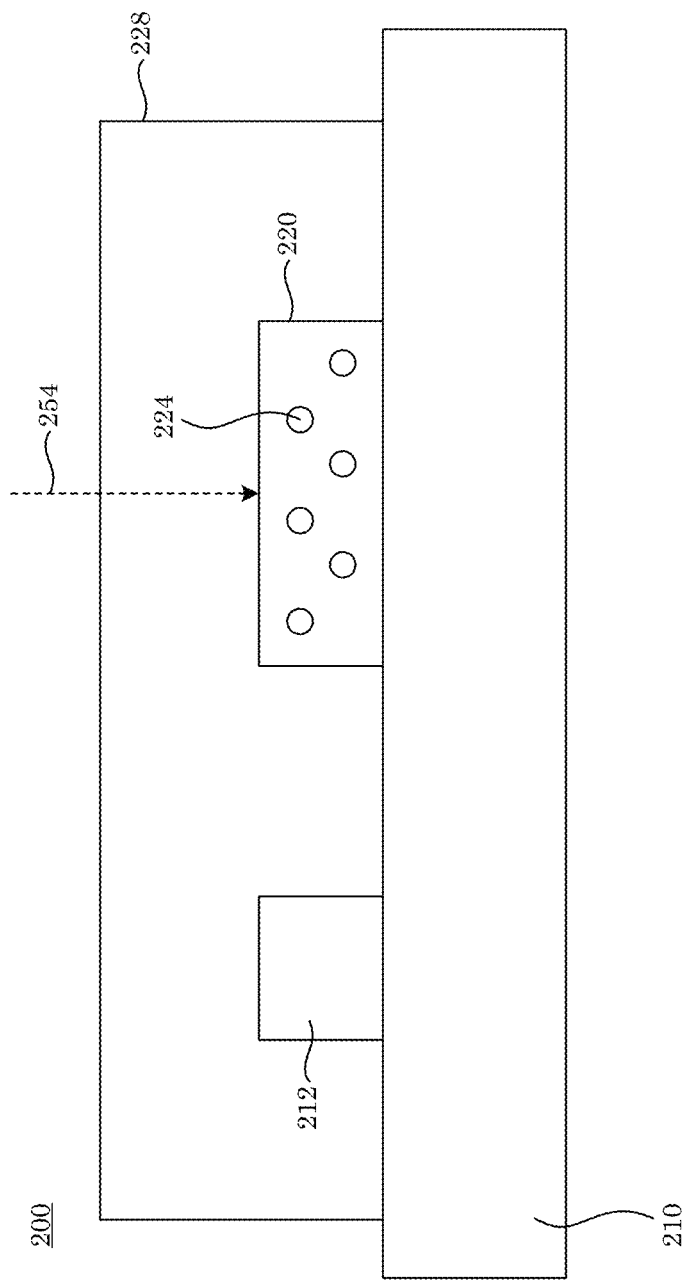
FIG. 4 shows a cross-section along line A-A of the photonic dosimeter shown in FIG. 3.

In an embodiment, with reference to FIG. 3 and FIG. 4, photonic dosimeter 200 includes cover layer 228 disposed on dosimatrix 220 such that dosimatrix 220 and waveguide 212 are interposed between substrate 210 and cover layer 228.

Figure 5:
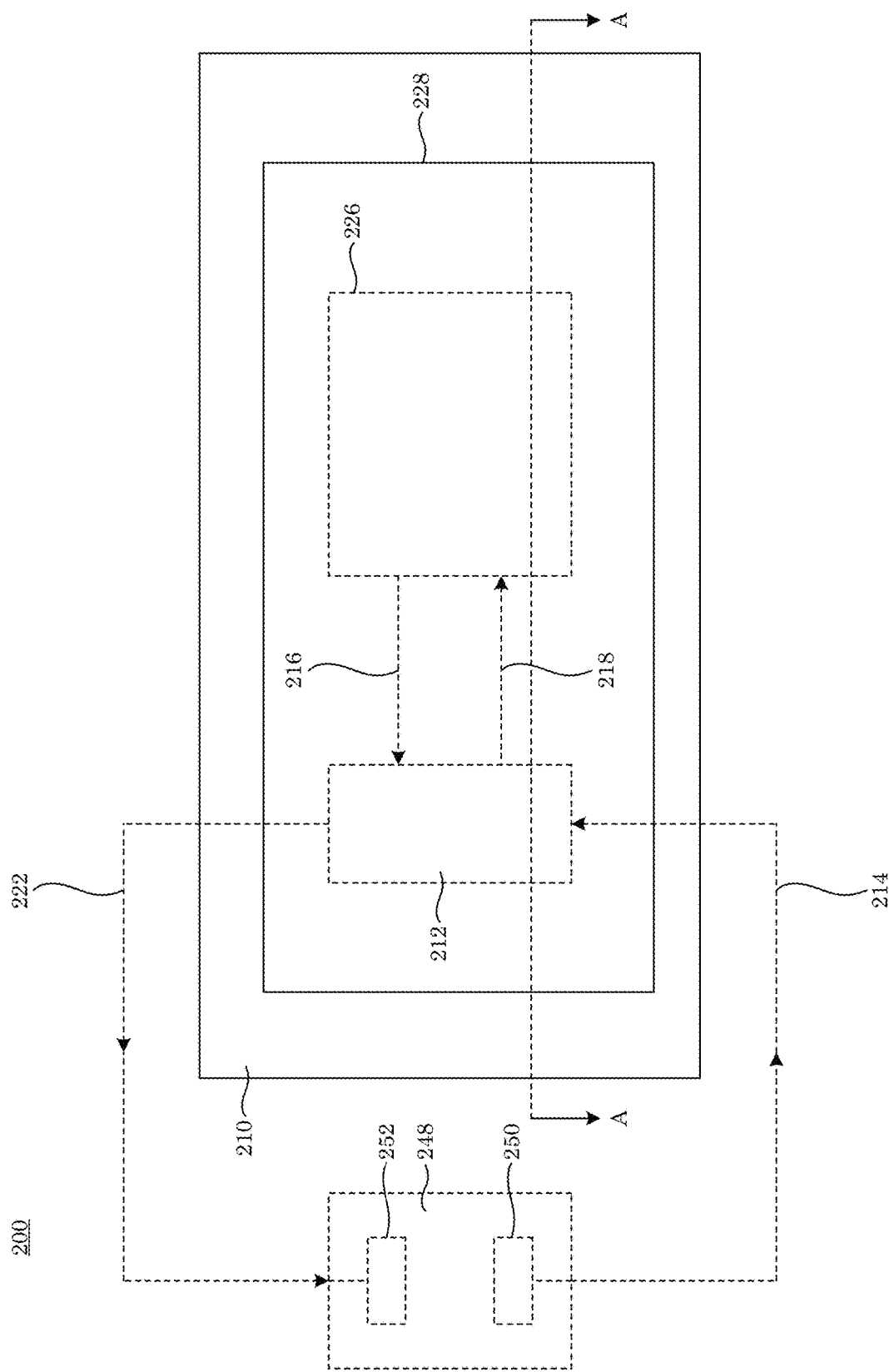
FIG. 5 shows a plan view of a photonic dosimeter.
Figure 6:
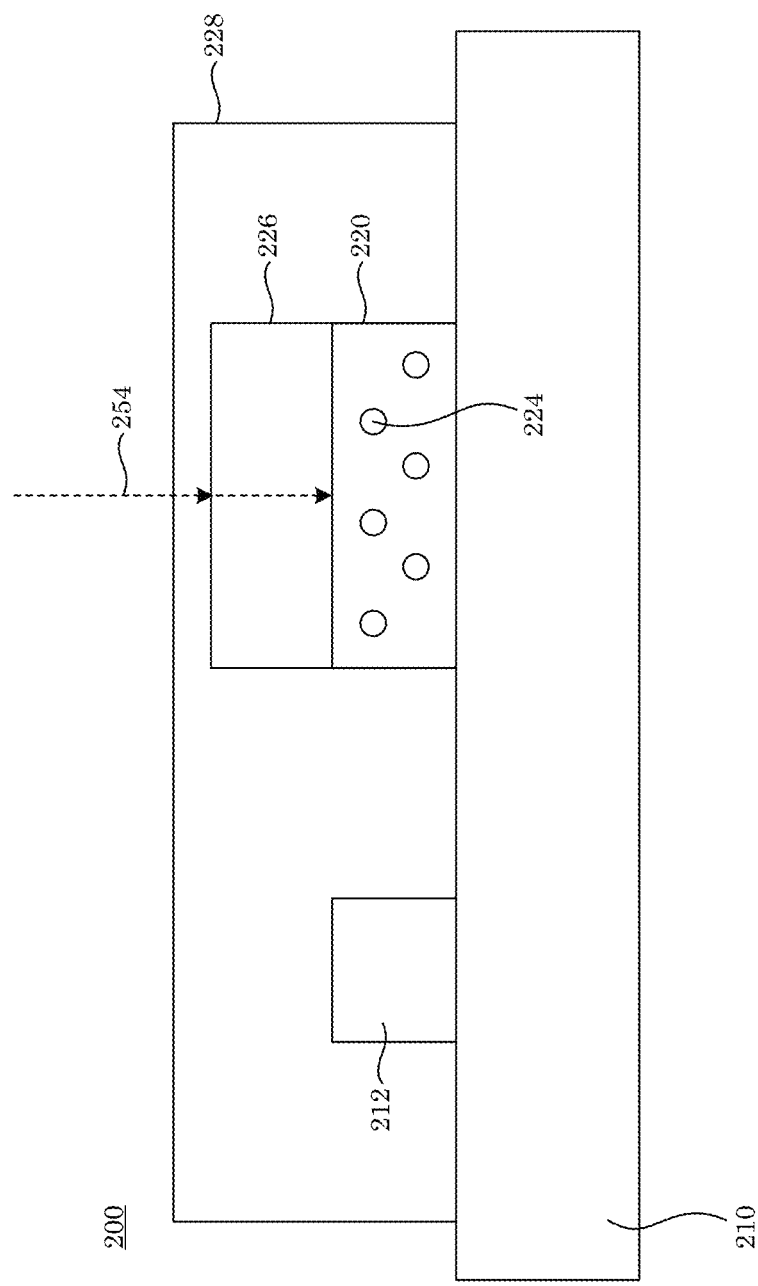
FIG. 6 shows a cross-section along line A-A of the photonic dosimeter shown in FIG. 5.

In an embodiment, with reference to FIG. 5 and FIG. 6, photonic dosimeter 200 includes cladding 226 disposed on dosimatrix 220 such that dosimatrix 220 is interposed between substrate 210 and cladding 226, and cladding 226 is interposed between dosimatrix 220 and cover layer 228.

Figure 7:
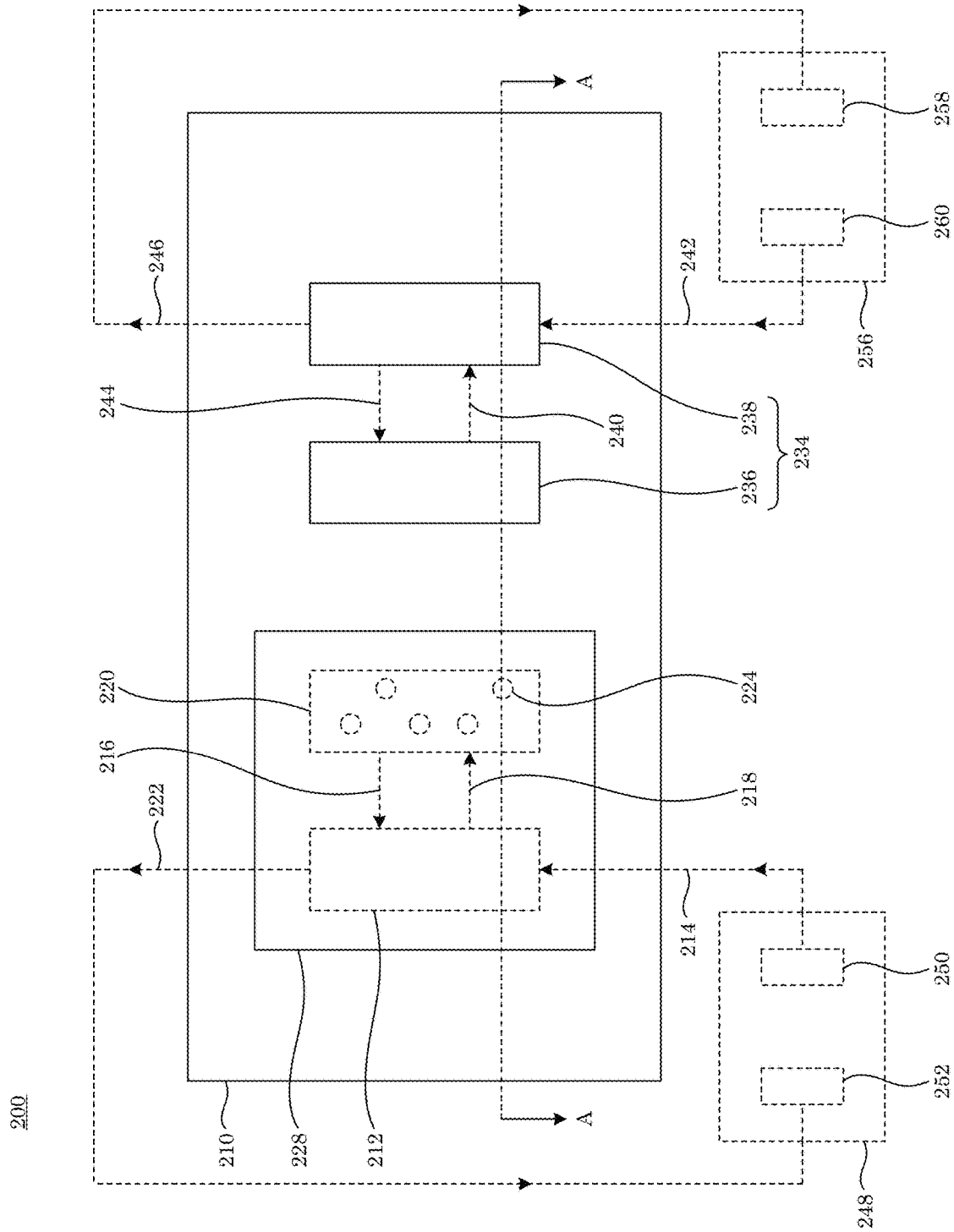
FIG. 7 shows a plan view of a photonic dosimeter.
Figure 8:
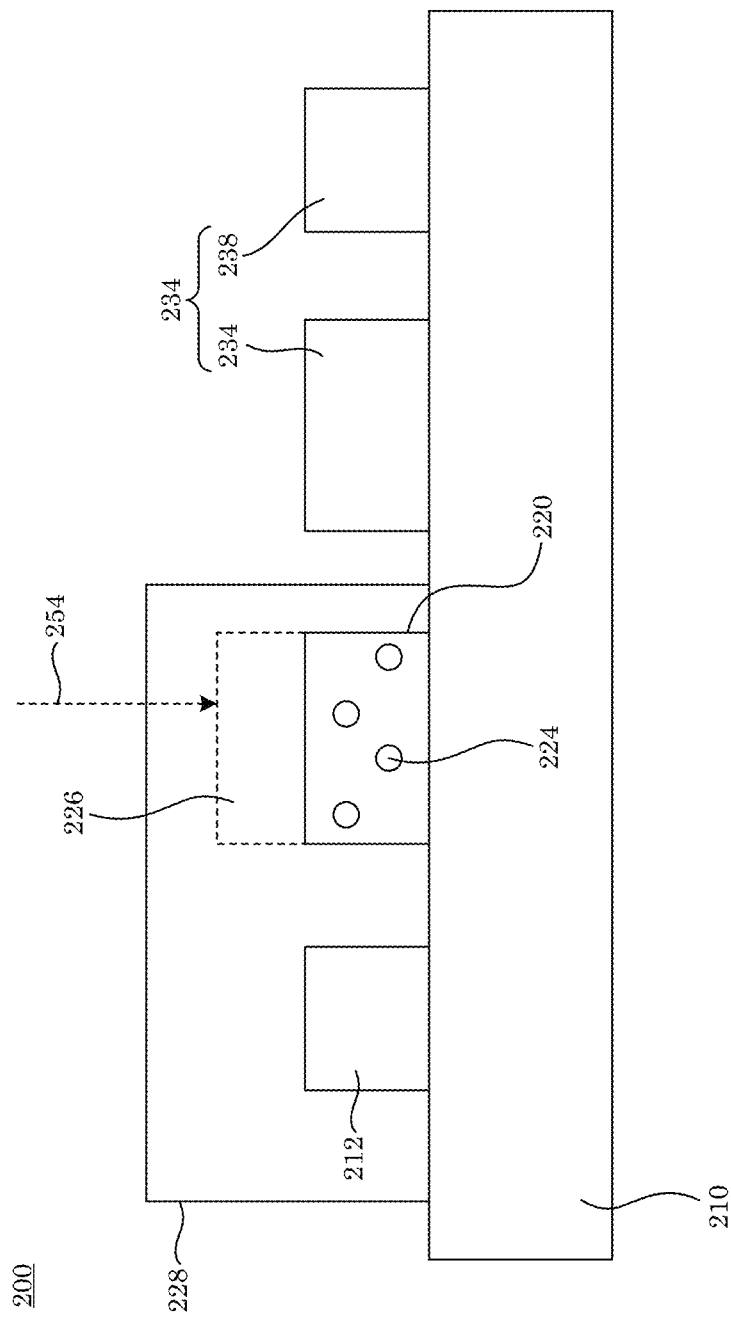
FIG. 8 shows a cross-section along line A-A of the photonic dosimeter shown in FIG. 7.

In an embodiment, with reference to FIG. 7 and FIG. 8, photonic dosimeter 200 includes temperature compensator 234 disposed on substrate 210. Temperature compensator 234 compensates for a temperature change of photonic dosimeter 200 as a function of time during which active element 224 accrues cumulative dose and undergoes conversion from prime state 230 to dosed state 232 in response to receipt, by active element 224, of the dose of radiation from ionizing radiation 254. Temperature compensator 234 includes compensation waveguide 238 disposed on substrate 210 proximate to compensation resonator 236. Compensation waveguide 238 receives primary compensation input light 242, communicates resonant frequency 240 based on primary compensation input light 242 to compensation resonator 236, receives secondary compensation output light 244 from compensation resonator 236, and transmits primary compensation output light 246 that is based on secondary compensation output light 244. Temperature compensator 234 includes compensation resonator 236 disposed on substrate 210 proximate to compensation waveguide 238 and dosimatrix 220 such that compensation resonator 236 and compensation waveguide 238 are in optical communication via evanescent coupling. Compensation resonator 236 has an optical resonance and receives, from compensation waveguide 238, resonant frequency 240 corresponding to the optical resonance and produces secondary compensation output light 244 in response to receipt of resonant frequency 240. Temperature compensator 234 changes the optical resonance of compensation resonator 236 in response to a change in temperature of dosimatrix 220.

In an embodiment, light member 256 includes light detector 260 that provides primary compensation input light 242 to compensation waveguide 238 and light source 258 that receives primary compensation output light 246 from compensation waveguide 238. Communication of primary compensation input light 242 or primary compensation output light 246 between light member 256 and compensation waveguide 238 can be propagation through free space or propagation through a condensed optical medium such as a fiber optic cable, wherein a first fiber optical cable can interconnect light detector 260 to compensation waveguide 238, and a second fiber optical cable can interconnect light source 258 to compensation waveguide 238. It should be appreciated that communication of resonant frequency 240 from compensation waveguide 238 to compensation resonator 236 and that communication of secondary compensation output light 244 from compensation resonator 236 to compensation waveguide 238 is due to evanescent coupling between compensation waveguide 238 and compensation resonator 236 in a presence of light, e.g., primary compensation input light 242 in compensation waveguide 238.

Figure 9:
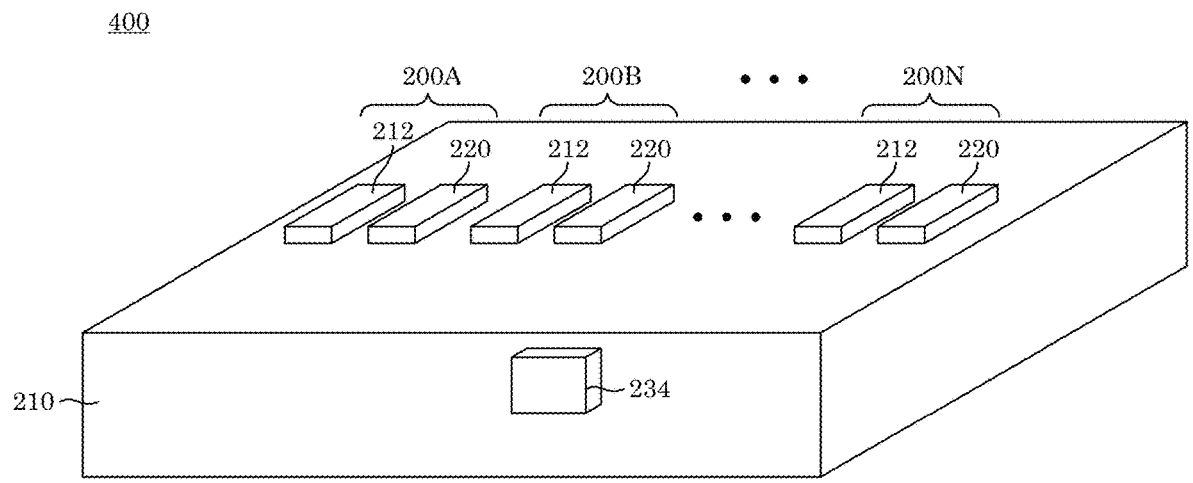
FIG. 9 shows a perspective view of a photonic dosimeter includes a plurality of waveguides and dosimatrixes.
Figure 10:
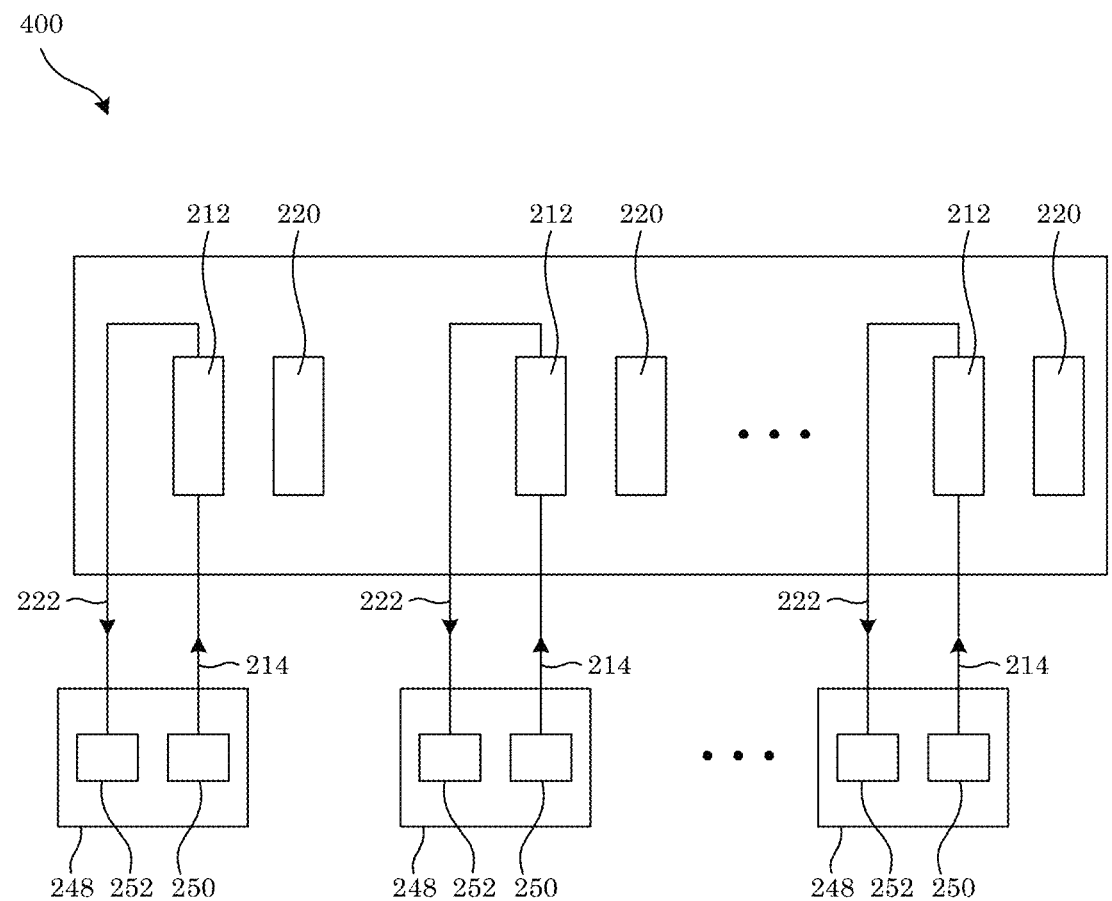
FIG. 10 shows a plan view of the photonic dosimeter shown in FIG. 9.
Figure 11:
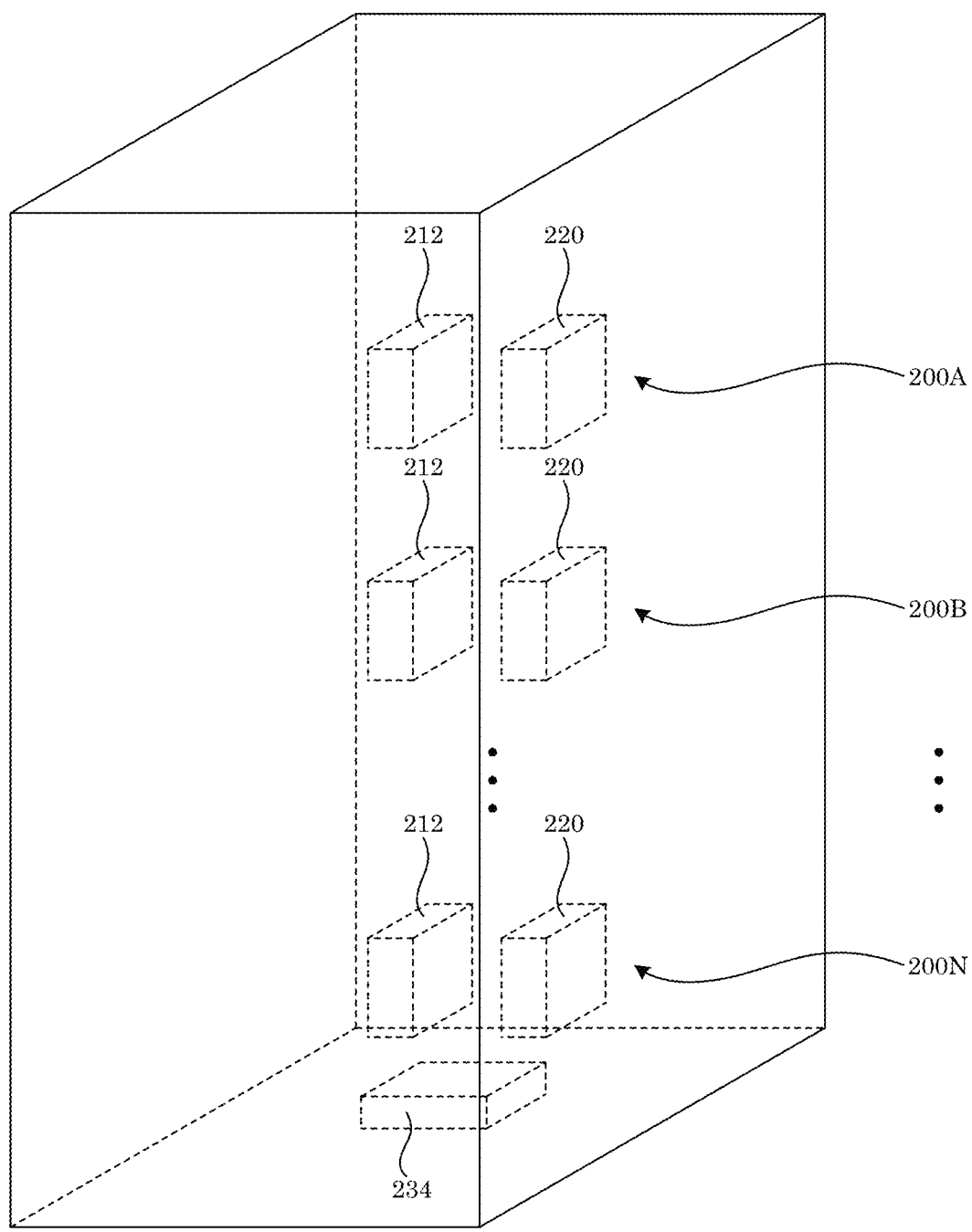
FIG. 11 shows a perspective view of a photonic dosimeter includes a plurality of waveguides and dosimatrixes.
Figure 12:
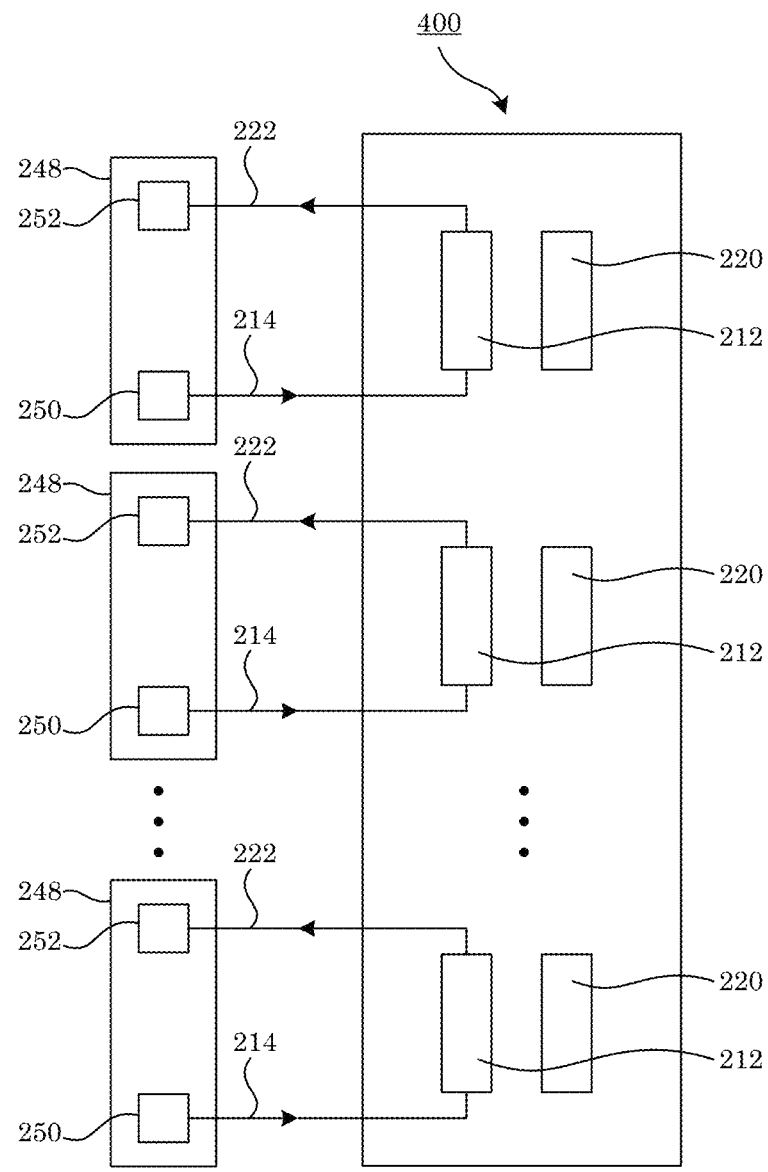
FIG. 12 shows a plan view of the photonic dosimeter shown in FIG. 11.

In an embodiment, with reference to FIG. 9 and FIG. 10, photonic dosimeter array 400 includes a plurality of photonic dosimeter 200 (e.g., 200A, 200B, . . . , 200N, wherein N is an integer number of photonic dosimeters 200 that can be, e.g., thousands of photonic dosimeters 200) and optionally temperature compensator 234. In an embodiment, photonic dosimeters 200 are laterally disposed on substrate 210 as shown in FIG. 9 and FIG. 10. In an embodiment, photonic dosimeters 200 are stackedly disposed on substrate 210 as shown in FIG. 11 and FIG. 12. Moreover, individual photonic dosimeters 200 (e.g., 200A, 200B, . . . , 200N) independently can be addressed and optically communicate with light members 248.

Figure 13:
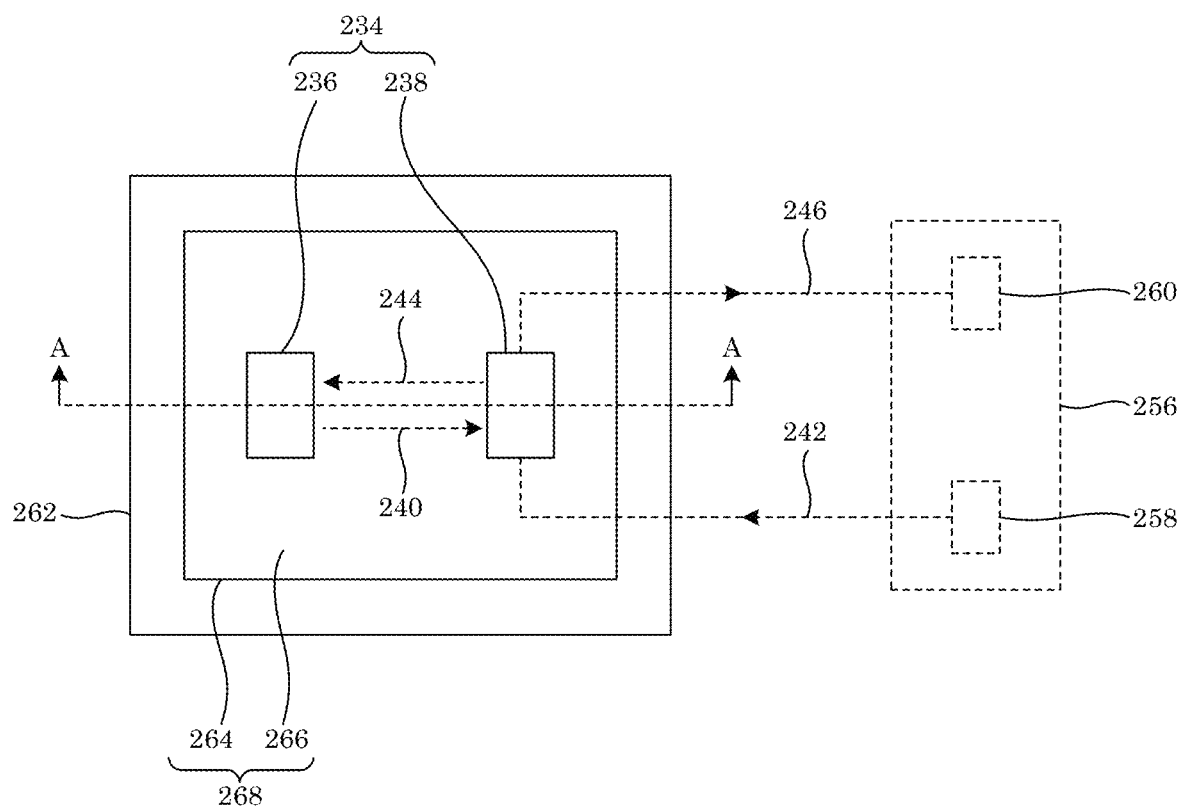
FIG. 13 shows a photonic calorimeter.
Figure 14:
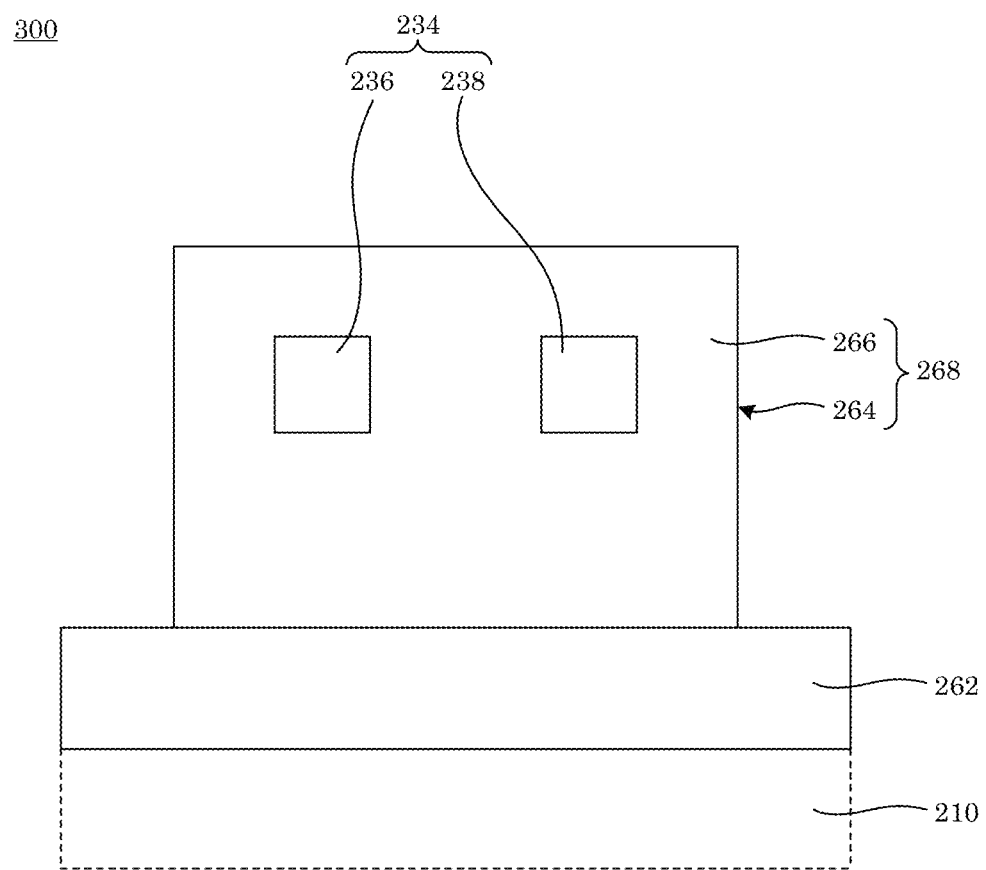
FIG. 14 shows a cross-section along line A-A of the photonic calorimeter shown in FIG. 13

While photonic dosimeter 200 accrues cumulative dose from ionizing radiation 254 for performing dosimetry, photonic calorimeter 300 converts a dose of ionizing radiation 254 to heat for performing calorimetry. In an embodiment, with reference to FIG. 13 and FIG. 14, photonic calorimeter 300 includes radiation absorber 268 that has outer surface 264 and interior material 266 disposed in interior material 266 and bounded by outer surface 264. Radiation absorber 268 receives ionizing radiation 254 and converts ionizing radiation 254 into heat. Photonic calorimeter 300 also includes temperature compensator 234 disposed within radiation absorber 268. Temperature compensator 234 includes compensation waveguide 238 disposed in optical communication with compensation resonator 236. Compensation waveguide 238 receives primary compensation input light 242, communicates resonant frequency 240 based on primary compensation input light 242 to compensation resonator 236, receives secondary compensation output light 244 from compensation resonator 236, and transmits primary compensation output light 246 that is based on secondary compensation output light 244. Compensation resonator 236 is disposed in optical communication with compensation waveguide 238 and includes an optical resonance and receives, from compensation waveguide 238, resonant frequency 240 corresponding to the optical resonance and produces secondary compensation output light 244 in response to receipt of resonant frequency 240. Thermal isolator 262 on which radiation absorber 268 is disposed thermally isolates radiation absorber 268 from heat loss by thermal transfer due to physical contact by an object. Here, temperature compensator 234 changes the optical resonance of compensation resonator 236 in response to a change in temperature of radiation absorber 268 due to absorption of ionizing radiation 254 by radiation absorber 268.

In an embodiment, photonic calorimeter 300 further includes substrate 210 on which thermal isolator 262 is disposed. In this configuration, thermal isolator 262 is interposed between substrate 210 and radiation absorber 268, and radiation absorber 268 is thermally isolated from substrate 210 by thermal isolator 262.

Figure 15:
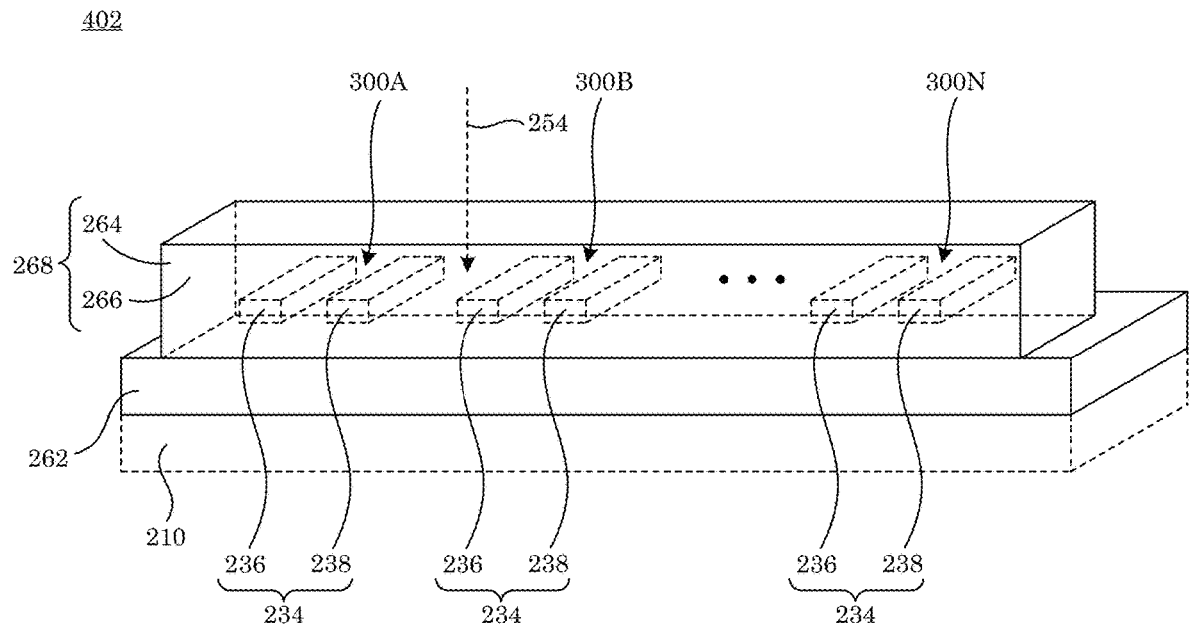
FIG. 15 shows a perspective view of a photonic calorimeter includes a plurality of temperature compensators.

In an embodiment, with reference to FIG. 15, photonic calorimetric array 402 includes a plurality of photonic calorimeter 300, e.g., 300A, 300B, . . . , 300N, wherein N is an integer number of photonic calorimeters 300 that can be, e.g., thousands of photonic calorimeters 300. In an embodiment, photonic calorimeters 300 are laterally disposed on thermal isolator 262 as shown in FIG. 15. In an embodiment, photonic calorimeters 300 are stackedly disposed on thermal isolator 262. Moreover, individual photonic calorimeter 300, e.g., 300A, 300B, . . . , 300N, independently can be addressed and optically communicate with light members 256.

Figure 16:
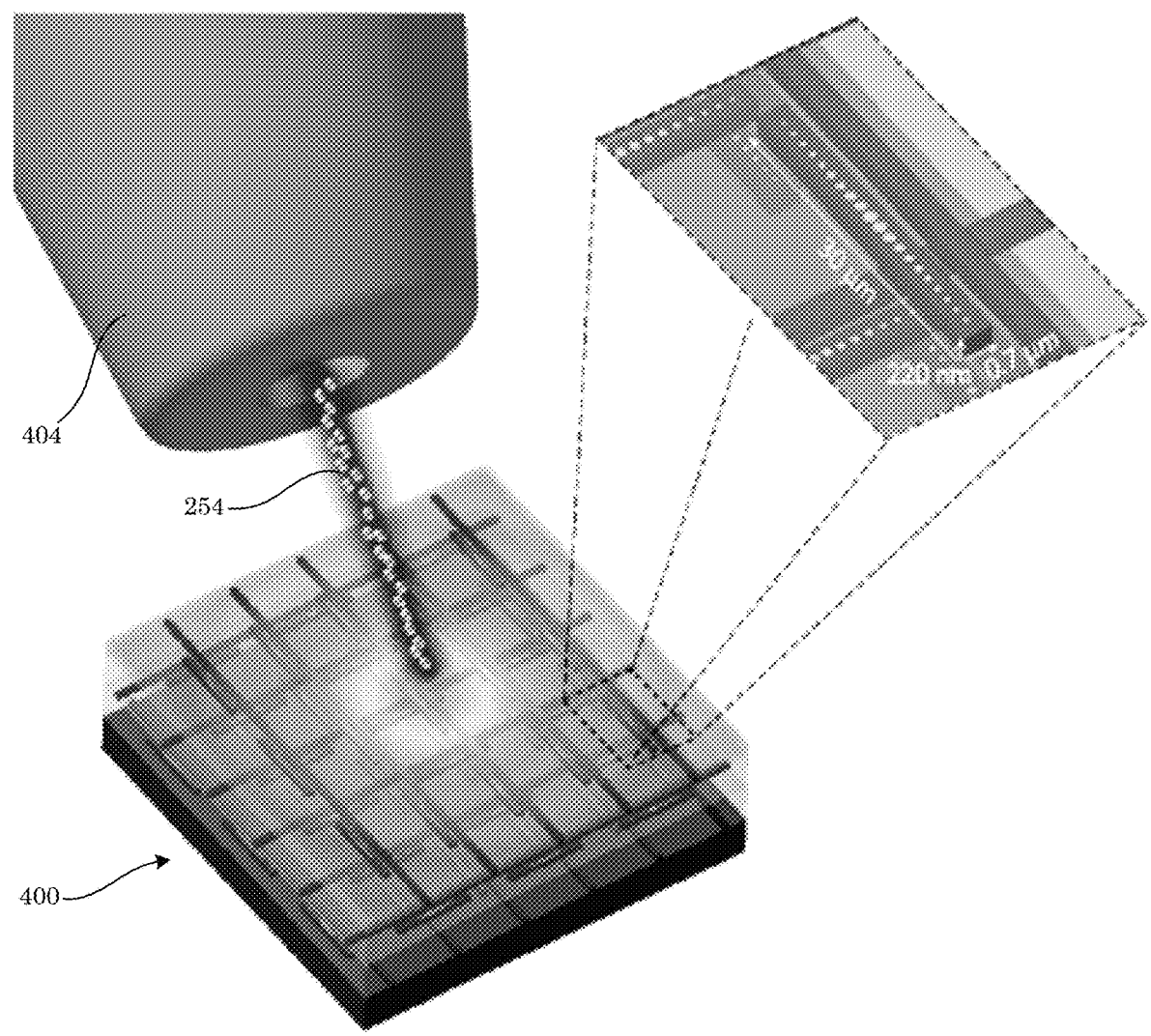
FIG. 16 shows an array of photonic dosimeters subjected to ionizing radiation.
Figure 17:
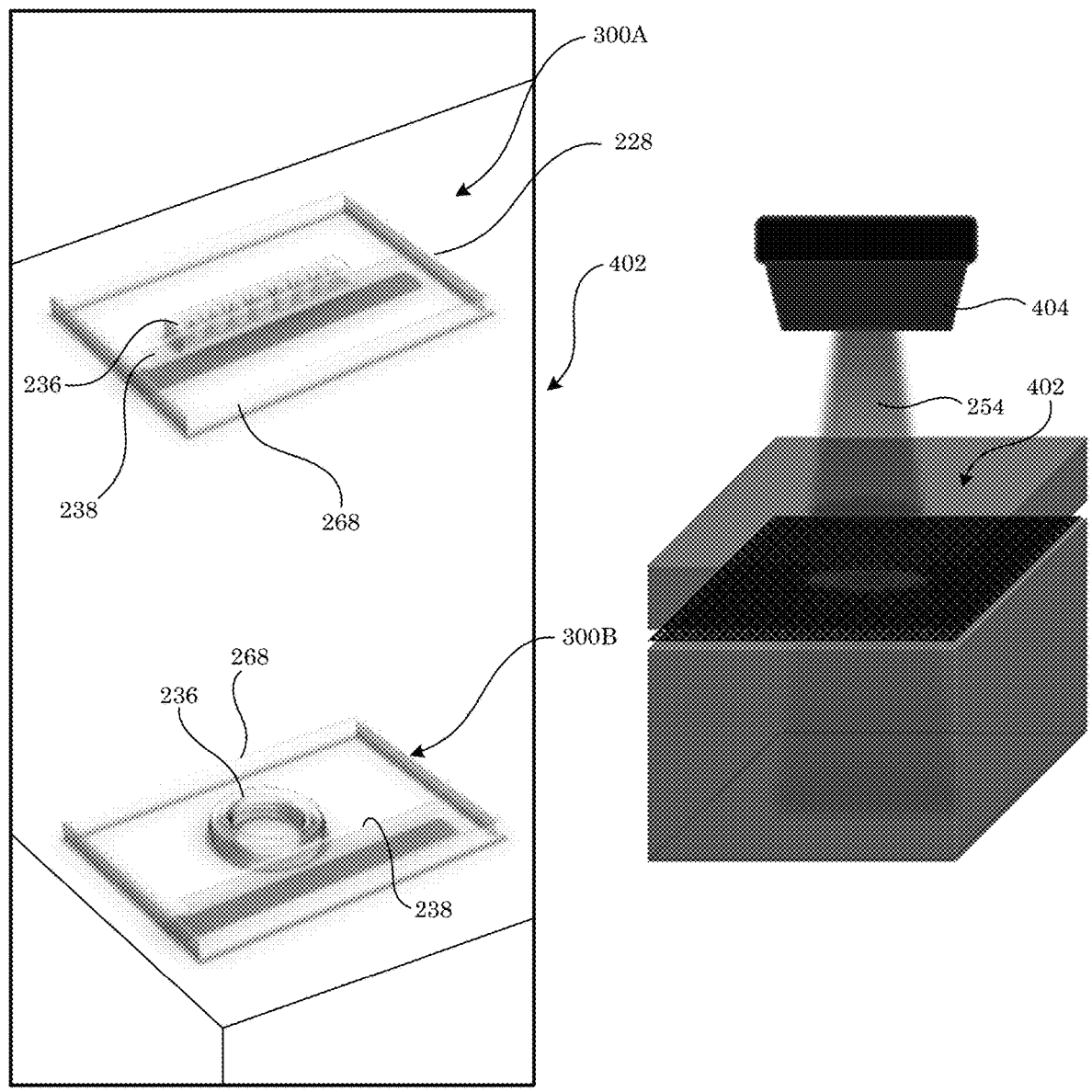
FIG. 17 shows a photonic calorimeter subjected to ionizing radiation.

In an embodiment, with reference to FIG. 16, photonic dosimeter array 400 is subjected to ionizing radiation 254 from radiation source 404. Sensing elements can be 10 micrometers to 100 micrometers length, 500 nanometers to 1000 nanometers width, and 200 nanometers to 500 nanometers depth; the sensing element can be disposed proximate to a waveguide to which it evanescently couples, with a gap separating the two elements of 100 nm to 900 nm; sensing elements are separated by at least 1 micrometer. Accordingly, photonic dosimeter array 400 can be subjected to ionizing radiation 254 in vitro. In some embodiments, photonic dosimeter array 400 is implanted in head 406 of a person, wherein photonic dosimeter array 400 is subjected to ionizing radiation 254 in vivo. In an embodiment, with reference to FIG. 17, photonic calorimeter 300 is subjected to ionizing radiation 254 from radiation source 404, wherein radiation absorber 268 absorbs ionizing radiation 254 and converts ionizing radiation 254 to heat that changes the optical resonance of individual photonic calorimeter 300, e.g., 300A, 300B, . . . , 300N, in photonic calorimetric array 402, wherein an amount of change depends upon a position of the photonic calorimeter 300, e.g., 300A, 300B, . . . , 300N, relative to the an incident position of photonic calorimeter 300, e.g., 300A, 300B, . . . , 300N, in the array as irradiated by ionizing radiation 254. In this manner, photonic dosimeter array 400 or photonic calorimetric array 402 are position sensitive detectors with respect to a position of incidence of ionizing radiation 254 on photonic dosimeter array 400 or photonic calorimetric array 402.

Figure 18:
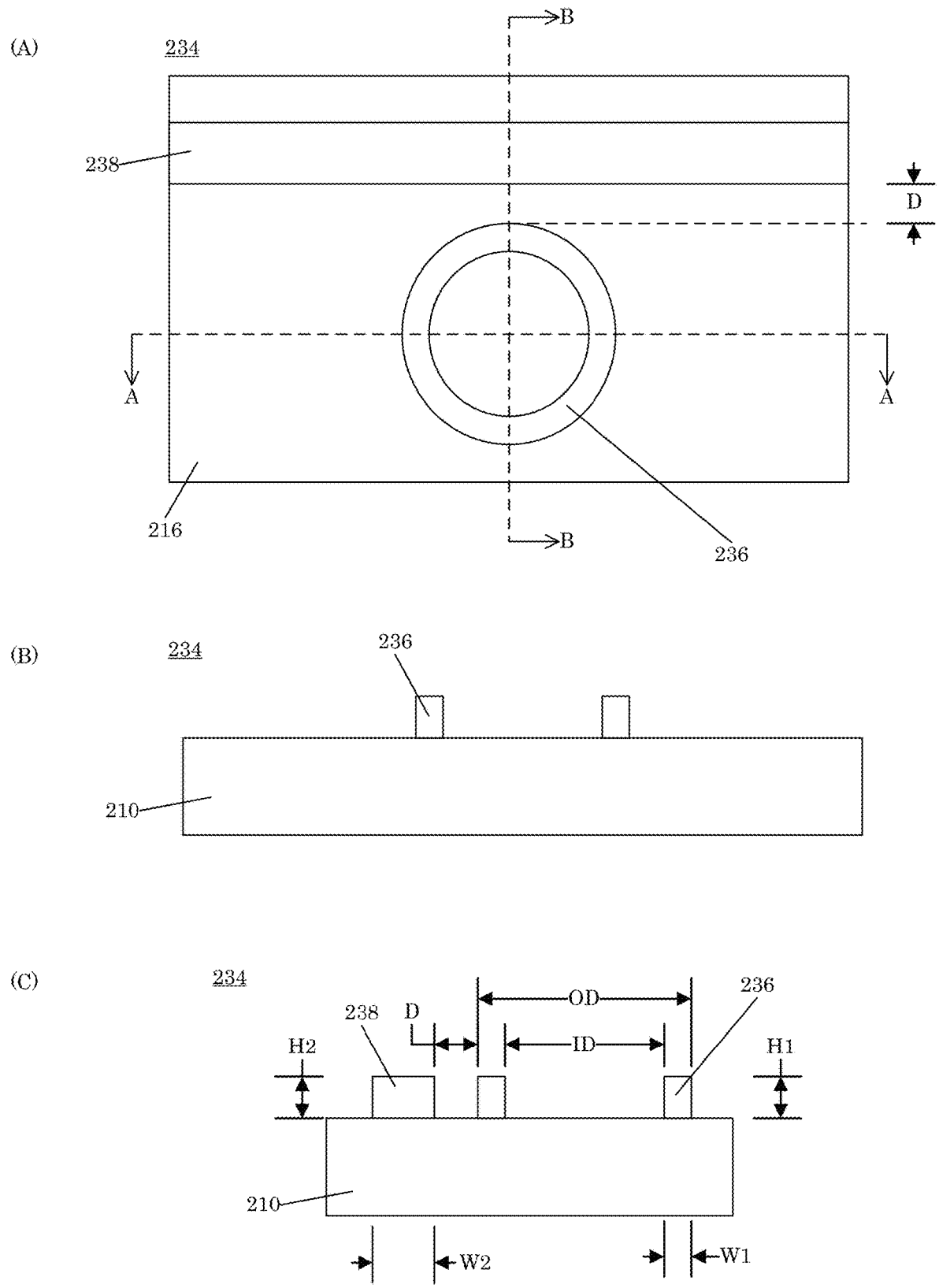
FIG. 18 shows a thermometer in panels A, B, and C.

With reference to FIG. 18A (top view of temperature compensator 234, also referred to as thermometer herein, e.g., thermometer 332 and the like), FIG. 18B (cross-section along line A-A of FIG. 18A), and FIG. 18C (cross-section along line B-B in FIG. 18A), in an embodiment, temperature compensator 234 includes compensation resonator 236 (also referred to herein as optical resonator, e.g., optical resonator 328, that can be, e.g., a ring resonator) disposed on substrate 210. Compensation waveguide 238 (also referred to herein as waveguide, e.g., waveguide 334) is disposed on substrate 210 proximate to compensation resonator 236. Compensation resonator 236 has an optical resonance and is configured to receive resonant frequency 240 corresponding to the optical resonance. Compensation waveguide 238 is configured to receive primary compensation input light 242 (also referred to herein as input light), to communicate the resonant frequency 240 to compensation resonator 236, and to transmit primary compensation output light 246 (also referred to herein as output light). Temperature compensator 234 is configured to change the optical resonance in response to a change in temperature of compensation resonator 236. Distance D separates compensation resonator 236 and compensation waveguide 238. Compensation resonator 236 has outer diameter OD, inner diameter ID, thickness H1, and width W1. Compensation waveguide 238 has thickness H2 and width W2.

Figure 19:
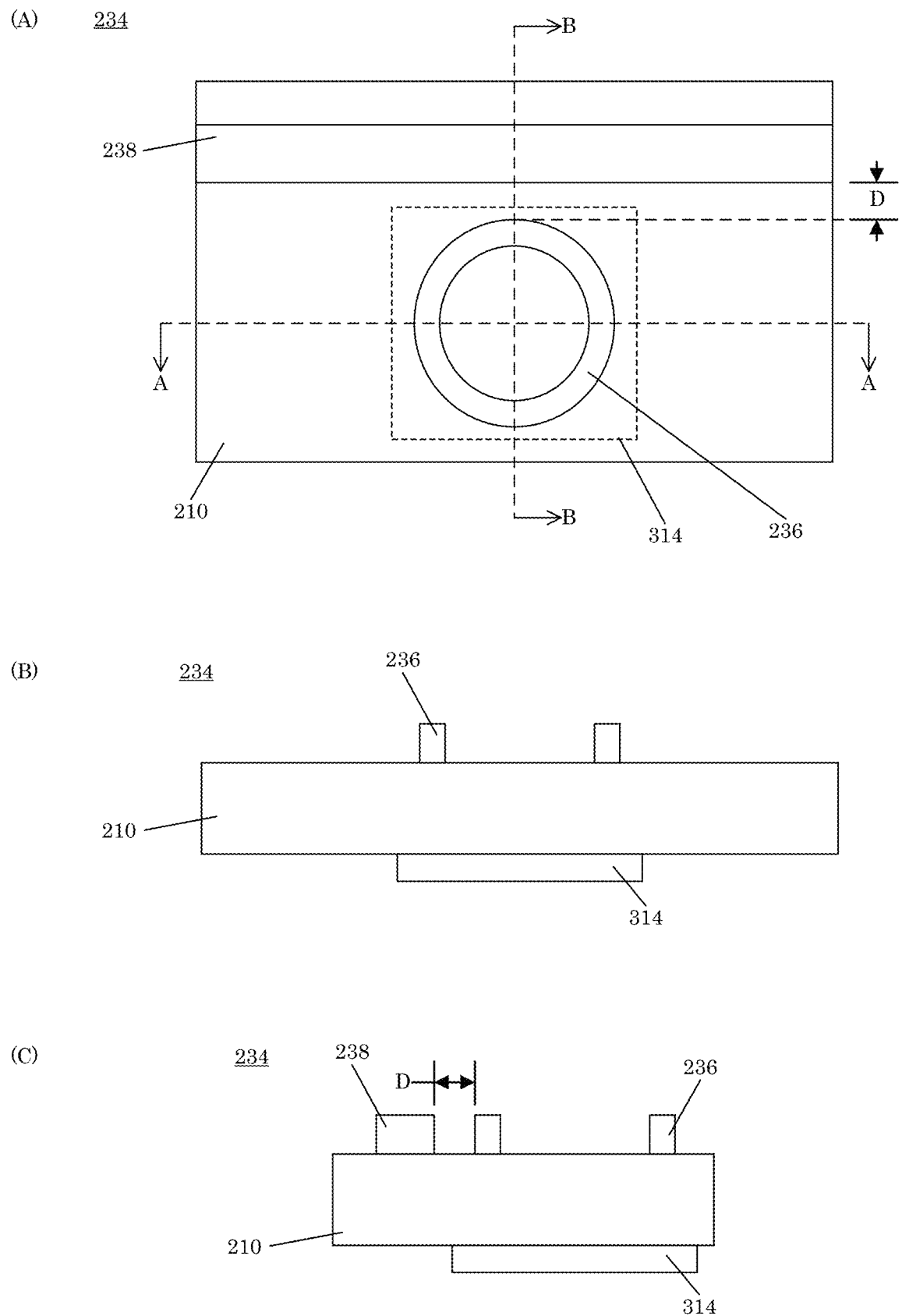
FIG. 19 shows a thermometer including a heater disposed on a substrate in panels A, B, and C.

According to an embodiment shown in FIG. 19A (top view of temperature compensator 234), FIG. 19B (cross-section along line A-A of FIG. 19A), and FIG. 19C (cross-section along line B-B in FIG. 19A), temperature compensator 234 includes thermal member 314 disposed on substrate 210 opposing compensation resonator 236. According to an embodiment shown in FIG. 20A (top view of temperature compensator 234), FIG. 20B (cross-section along line A-A of FIG. 20A), and FIG. 20C (cross-section along line B-B in FIG. 20A), temperature compensator 234 includes thermal member 314 disposed in substrate 210 opposing compensation resonator 236. Thermal member 314 is configured to change or maintain a temperature of compensation resonator 236. In some embodiments, thermal member 314 increases a temperature of compensation resonator 236. In an embodiment, thermal member 314 decreases a temperature of compensation resonator 236.

Figure 20:
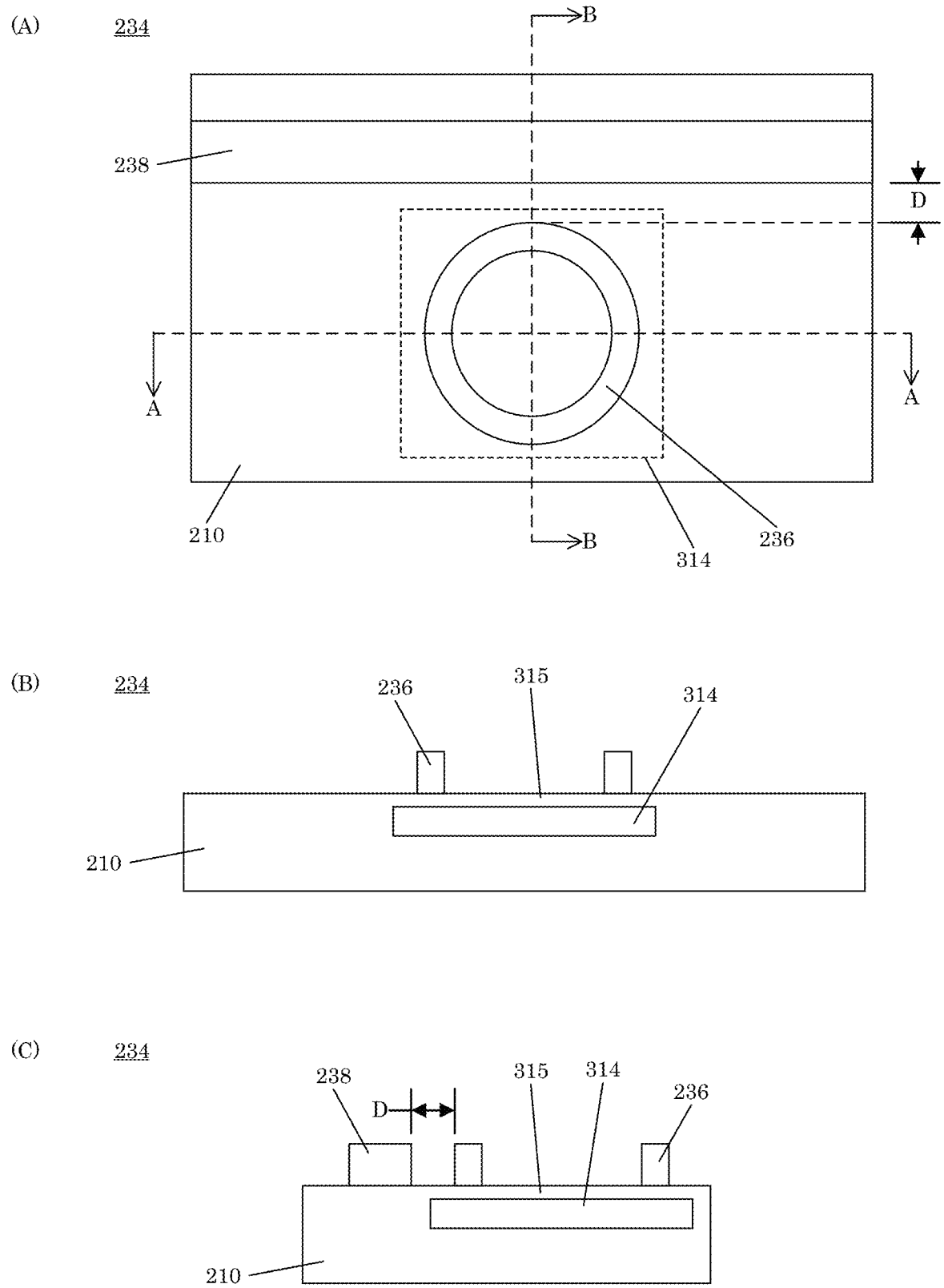
FIG. 20 shows a thermometer including a heater disposed in a substrate in panels A, B, and C.

With reference to FIG. 20B, over layer 315 can be interposed between thermal member 314 and compensation resonator 236. Over layer 315 can be made of a same or different material as substrate 210. In an embodiment, over layer 315 includes a material that efficiently communicates thermal energy between thermal member 314 and compensation resonator 236.

According to an embodiment shown in FIG. 21A (top view of temperature compensator 234), FIG. 21B (cross-section along line A-A of FIG. 21A), and FIG. 21C (cross-section along line B-B in FIG. 21A), temperature compensator 234 includes thermal member 314 disposed on compensation resonator 236 opposing substrate 210. An over layer (e.g., 315, not shown) can be interposed between compensation resonator 236 and thermal member 314.

Besides ring resonator indicated as compensation resonator 236, various other optical resonators can be used in the thermometer. In an embodiment, as shown in FIG. 22A (top view of temperature compensator 234), FIG. 22B (cross-section along line A-A of FIG. 22A), and FIG. 22C (cross-section along line B-B in FIG. 22A), temperature compensator 234 includes first intermediate member 321 interposed between disk resonator 316 and substrate 210. Additionally, second intermediate member 322 is interposed between compensation waveguide 238 and substrate 210. Although first intermediate member 321 and second intermediate member 322 are shown as having a frustoconical shape, first intermediate member 321 and second intermediate member 322 can have any shape (e.g., cylindrical, square, rectangular, ellipsoidal, parallelpiped, and the like) effective to separate substrate 210 from disk resonator 316 or compensation waveguide 238.

In one embodiment, as shown in FIG. 23A (top view of temperature compensator 234), FIG. 23B (cross-section along line A-A of FIG. 23A), and FIG. 23C (cross-section along line B-B in FIG. 23A), temperature compensator 234 includes concave resonator 317 disposed on substrate 210. Concave resonator 317 includes base 319 proximately disposed to substrate 210, concave portion 318, and protuberance 320. Concave portion 318 has width W3 and depth H4, and protuberance 320 has width W4 at a top surface thereof. Thickness H3 is a thickness of concave resonator 317. Width W4 of protuberance 320 optionally can be absent in some embodiments.

According to an embodiment, as shown in FIG. 24A (top view of temperature compensator 234), FIG. 24B (cross-section along line A-A of FIG. 24A), and FIG. 24C (cross-section along line B-B in FIG. 24A), temperature compensator 234 includes compensation waveguide 238 having an aperture 324 disposed therein. In some embodiments, a plurality of apertures 324 is distributed along a length axis of compensation waveguide 238. In certain embodiments, the plurality of apertures 324 have a diameter of the same size. In an embodiment, some of the plurality of apertures 324 have different size diameters. According to one embodiment, the plurality of apertures 324 have different size diameters such that apertures 324 are arranged symmetrically with respect to compensation resonator 236 with largest diameter apertures 324 located distal to compensation resonator 236 and smallest diameter apertures 324 located proximate to compensation resonator 236.

In an embodiment, as shown in FIG. 25A (top view of temperature compensator 234), FIG. 25B (cross-section along line A-A of FIG. 25A), and FIG. 25C (cross-section along line B-B in FIG. 25A), temperature compensator 234 includes aperture 325 interposed between compensation resonator 236 and substrate 210. Aperture 325 has a size in a dimension (e.g., depth, width, or height) effective to mechanically or optically decouple compensation resonator 236 and substrate 210 such that compensation resonator 236 and substrate 210 independently support a mechanical mode or an optical mode. In this manner, without wishing to be bound by theory, it is believed that a mechanical mode or an optical mode of compensation resonator 236 is not quenched by substrate 4.

Figure 26:
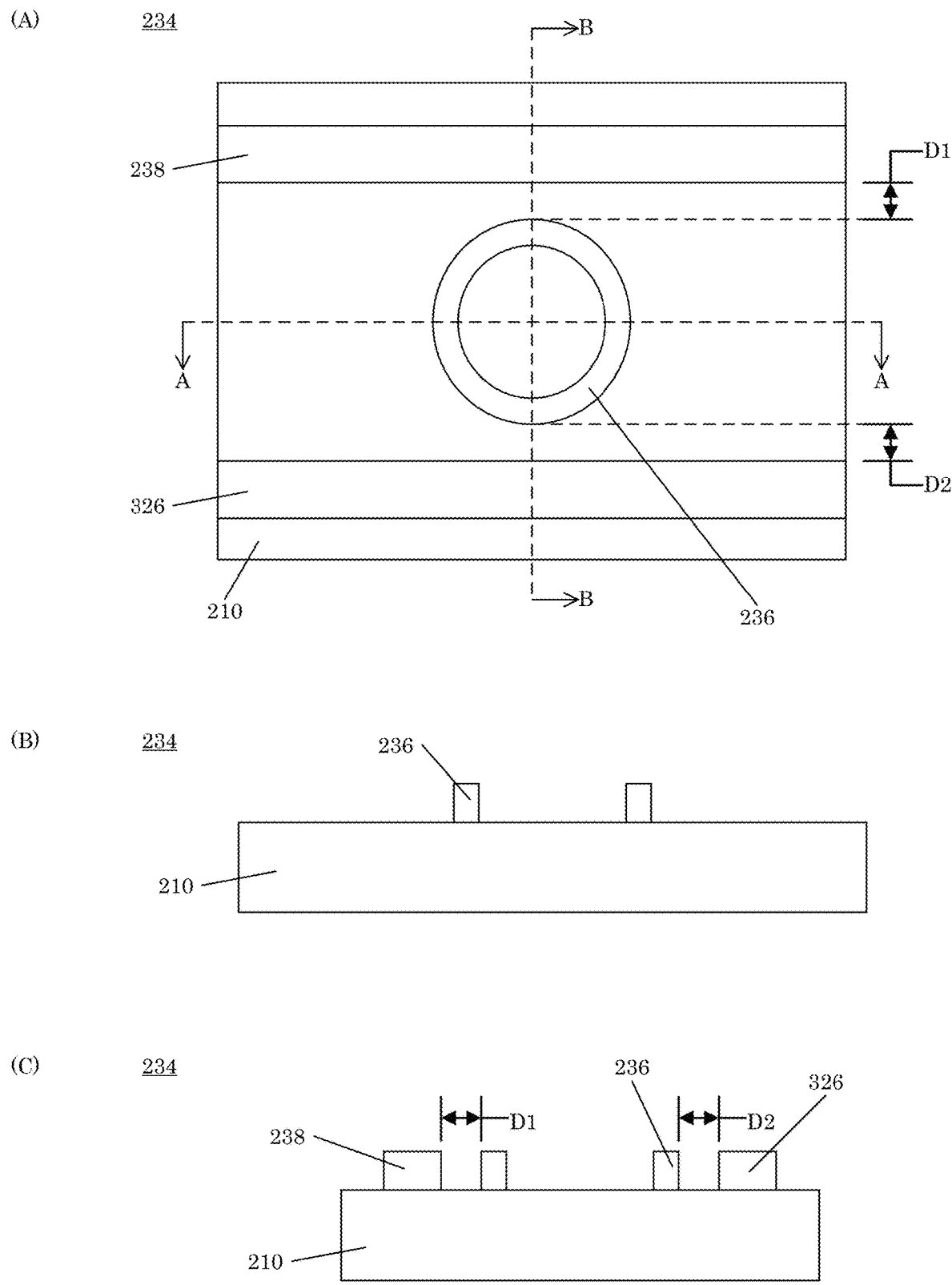
FIG. 26 shows a thermometer including a plurality of waveguides in panels A, B, and C.

According to an embodiment, as shown in FIG. 26A (top view of temperature compensator 234), FIG. 26B (cross-section along line A-A of FIG. 26A), and FIG. 26C (cross-section along line B-B in FIG. 26A), temperature compensator 234 includes auxiliary waveguide 326 disposed on substrate 210 opposing compensation waveguide 238, wherein compensation resonator 236 is interposed between compensation waveguide 238 and auxiliary waveguide 326. Accordingly, temperature compensator 234 includes a drop-add arrangement of compensation resonator 236.

Figure 27:
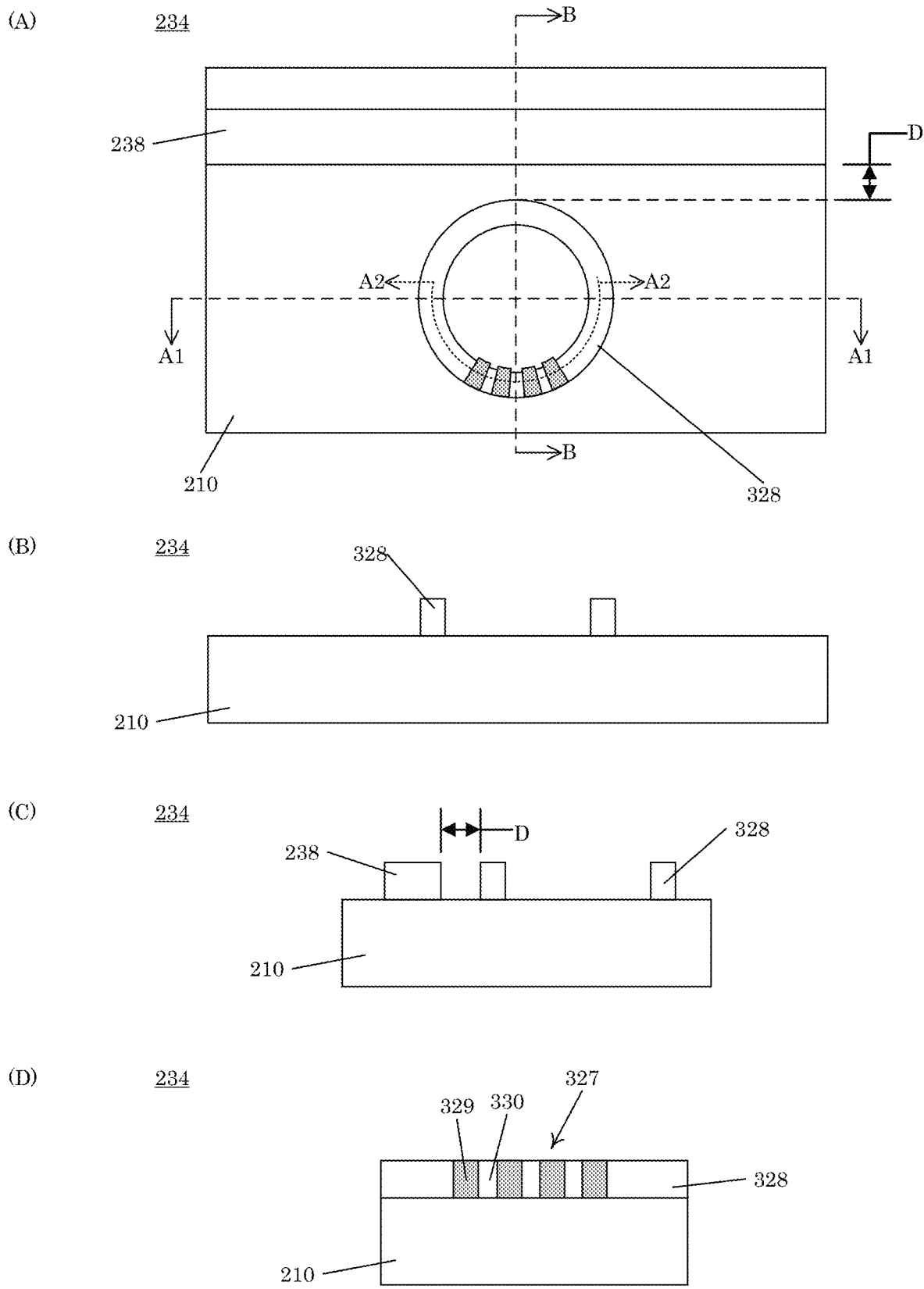
FIG. 27 shows a thermometer including an optical resonator having a Bragg grating in panels A, B, C, and D.

In an embodiment, as shown in FIG. 27A (top view of temperature compensator 234), FIG. 27B (cross-section along line A1-A1 of FIG. 27A), and FIG. 27C (cross-section along line B-B in FIG. 27A), temperature compensator 234 includes optical resonator 328 (e.g., a ring resonator as shown) disposed on substrate 210 proximate to compensation waveguide 238. Optical resonator 328 includes a Bragg grating 327 integrally disposed in optical resonator 328. Bragg grating 327 includes a plurality of regions having a different refractive index from each, e.g., alternating first region 329 (having a first index of refraction) and second region 330 (having a second refractive index). The first or second index of refraction can be the same or different as an index of refraction of a remainder of material of optical resonator 328.

According to an embodiment, Bragg grating 327 is a periodic (as shown in FIG. 27D, which is a cross-section along line A2-A2 of FIG. 27A) or aperiodic perturbation of an effective index of refraction in optical resonator 328. In an embodiment, the perturbation causes reflection of light (propagating in optical resonator 328) for a wavelength of light that satisfies a Bragg condition. Light at other wavelengths that does not satisfy the Bragg condition is substantially unaffected by Bragg grating 327.

In some embodiments, as shown in FIG. 28A (top view of temperature compensator 234), FIG. 28B (cross-section along line A-A of FIG. 28A), and FIG. 28C (cross-section along line B-B in FIG. 28A), temperature compensator 234 includes auxiliary optical resonator 331 (e.g., a ring resonator as shown) disposed on substrate 210 proximate to auxiliary waveguide 326 and spaced apart therefrom by distance D2. Distance D3 separates auxiliary optical resonator 331 and compensation resonator 236. Although, two optical resonators (236, 331) are shown, some embodiments include a plurality of optical resonators coupled and interposed between compensation waveguide 238 and auxiliary waveguide 326. In one embodiment, the plurality of optical resonators includes different types for optical resonators, e.g., a ring resonator, disk resonator, concave resonator, or a combination thereof. Such combination of coupled optical resonators (236, 331) provide a narrow bandwidth of frequencies communicated to auxiliary waveguide 326 from a broader band of frequencies transmitted by compensation waveguide 238 via optical resonators (236, 331).

According to an embodiment, as shown in FIG. 29A (top view of thermometer 332) and FIG. 29B (cross-section along line A-A of FIG. 29A), thermometer 332 includes waveguide 334 disposed on substrate 333. Aperture 335 is present in substrate 333 and is interposed between a portion of waveguide 334 and substrate 333. Aperture 335 has width W and thickness H, a dimension of each of which independently can be varied during formation to form various shapes (e.g., circular, square, polygonal, and the like) and aspect ratios of length L, width W, and thickness H. In some embodiments, waveguide 334 includes a Bragg grating 327 (see FIG. 27C) in a position proximate to aperture 335.

In some embodiments, the thermometer includes the substrate and the waveguide disposed on the substrate to receive input light and to transmit output light such that the aperture is interposed between the substrate and the waveguide. The waveguide is configured to change an intensity of the output light at a wavelength in response to a change of a temperature of the waveguide.

In an embodiment, the thermometer includes a substrate; an optical resonator disposed on the substrate and including an optical resonance. The optical resonator is configured to receive the resonant frequency corresponding to the optical resonance. The thermometer also includes a waveguide disposed on the substrate proximate to the optical resonator to receive input light, to communicate the resonant frequency to the optical resonator, and to transmit output light with an aperture is interposed between the substrate and the optical resonator, the substrate and the waveguide, or a combination comprising at least one of the foregoing. Further, the thermometer is configured to change the optical resonance in response to a change in temperature of the optical resonator.

In some embodiments, the optical resonator includes a ring resonator, a concave disk resonator, a photonic waveguide, disk resonator, a microsphere resonator, a photonic crystal cavity, a photonic array, or a combination comprising at least one of the foregoing. As such, the optical resonator can be a ring, disk, or spherical structure disposed at a selected distance from a waveguide. A radius of the optical resonator is selected so an effective length of a circumference is an integer of a resonant wavelength. In some embodiments, the optical resonator is the ring resonator that has a substantially uniform width with respect to a radial dimension of the ring resonator, e.g., substantially uniform width W1 between outer diameter OD and inner diameter ID as in FIG. 18C.

Figure 30:
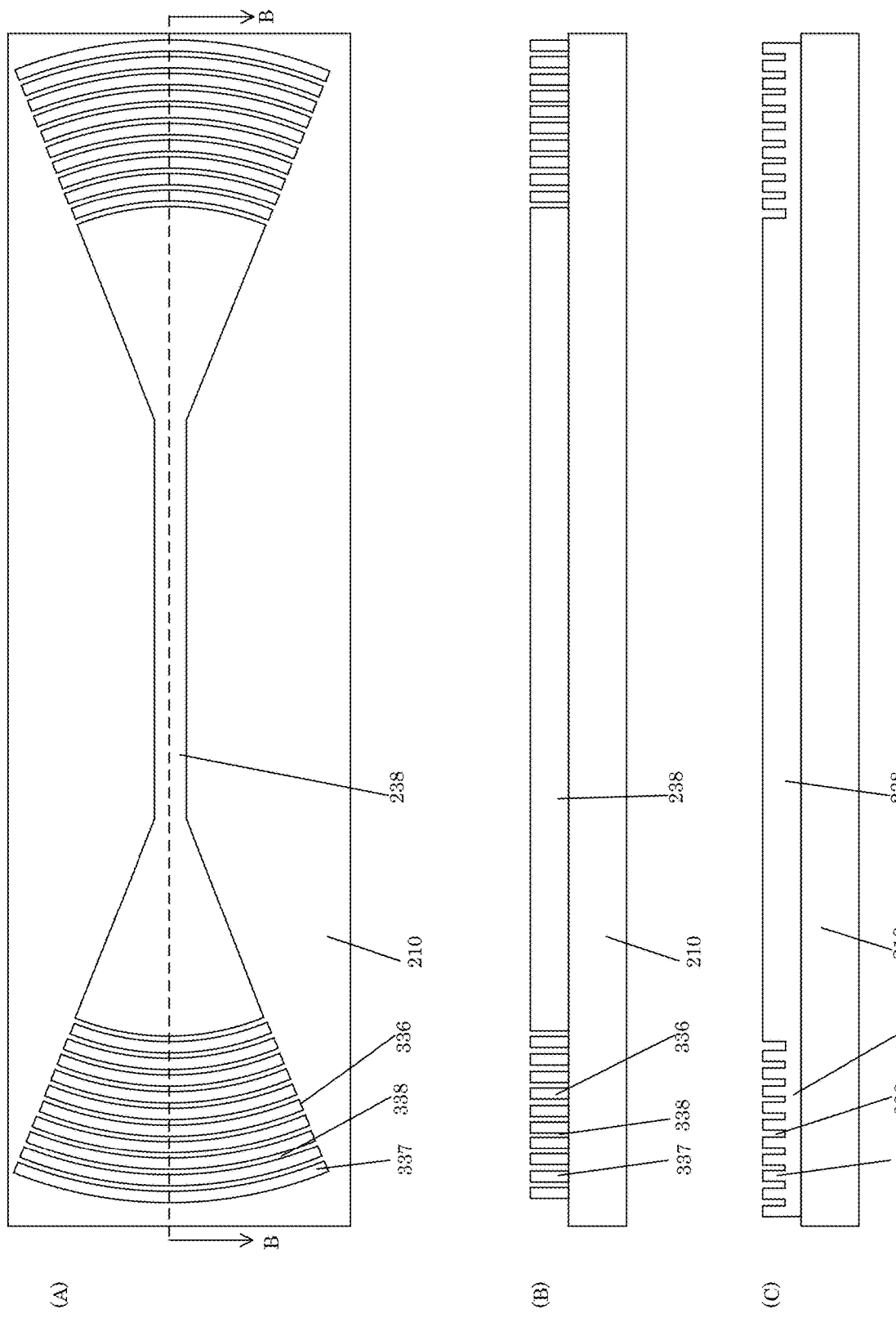
FIG. 30 shows a waveguide including a Bragg grating in panels A, B, and C.

According to an embodiment, input light is coupled into the thermometer from a light source, coupled from the thermometer to a detector, or a combination thereof. In an embodiment, the waveguide comprises a Bragg coupler, an end coupler, or a combination comprising at least one of the foregoing disposed at a terminus of the waveguide. As shown in FIG. 30A (top view of compensation waveguide 238) or FIG. 30B (cross-section along line A-A of FIG. 30A), compensation waveguide 238 includes Bragg coupler 336 disposed at a terminus thereof. Bragg coupler 336 includes a plurality of protrusions 337 and depressions 338 alternatingly disposed on substrate 210. With reference to FIG. 30C (an alternate embodiment for a Bragg coupler corresponding to a cross-section along line B-B in FIG. 30A), depressions 338 are blind with respect to substrate 210 relative to through features as shown in FIG. 30B. In one embodiment, depressions 338 include blind depressions 338, through depressions, or a combination thereof. Here, "through" refers to expose substrate 210 through depressions 338, and "blind" refers to covering substrate 210 by depressions 338 such that substrate 210 is not exposed. It is contemplated that a Bragg coupler uses a grating structure (e.g., protrusions 337 and depressions 338) to couple input light into the thermometer and to couple output light out of the thermometer. In an embodiment, coupling light by compensation waveguide 238 is evanescent coupling via Bragg coupler 336.

Figure 31:
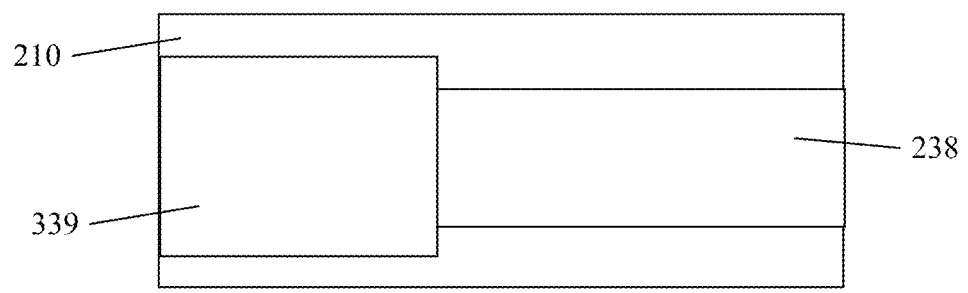
FIG. 31 shows a waveguide including an end coupler.

In an embodiment, as shown in FIG. 31, compensation waveguide 238 includes edge coupler 339 disposed at a terminus of compensation waveguide 238. Edge coupler 339 couples light in and out by, e.g., a pigtailed fiber optic, which is connected, e.g., adhered, to substrate 210.

Temperature compensator 234 includes substrate 210. Substrate can include any material that can effectively be processed (e.g., micromachined, including lithography and the like) to form a support structure for optical resonator (e.g., 236), thermal member 314, waveguide (e.g., 238), or other components thereof.

In a particular embodiment, substrate 210 includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, substrate 210 is a compound semiconductor such as SiC, SiGe, GaN; a group 13-15 (also referred to as a group III-V) semiconductor such as AlSb, AlAs, AlN, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

Substrate 210 also can include a supplemental element such as C, H, N, Li, Na, K, Mg, Ca, Sr, Ba, Bi, B, Al, P, S, O, and the like in an amount typically less than an amount of the semiconductor. In an embodiment, substrate 210 includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, substrate 210 includes an n-dopant. In a particular embodiment, substrate 210 is p-doped Si. In one embodiment, substrate 210 is n-doped Si. Substrate 210 can be produced from, e.g., commercially available semiconductor grade p-doped Si having a particular crystalline orientation, e.g., having Miller indices <111>, <100>, and the like. Substrate 210 can be amorphous, polycrystalline, or a single crystal. In an embodiment, substrate 210 has a stacked structure that includes a plurality of semiconductor layers such as by forming films as SiGe/Si/SiGe/Si on a Si substrate. In some embodiments, substrate 210 includes crystalline domains among amorphous material.

In another embodiment, substrate 210 includes a glass, Pyrex, sapphire, polymer, ceramic, or an electrically conductive material, e.g., a metal. The substrate can be electrically conductive, semiconductive, or electrically insulating.

A thermal conductance of substrate 210 can be selected by choice of a composition of substrate 210 as well as a geometrical shape or size of substrate 210.

A dielectric layer can be disposed on substrate 210 to generally isolate substrate 6 from, e.g., contamination or deterioration during formation of compensation resonator 236. In an embodiment, the dielectric layer electrically insulates substrate 210 from thermal member 314. The dielectric layer can include an oxide of an element in substrate 210 or independently can be an oxide of a semiconductor material such as $SiO_2$. According to an embodiment, the dielectric layer is an oxide such as an oxide that includes an element from substrate 210, e.g., an oxide of the semiconductor (also referred to herein as a semiconductor oxide). In an embodiment, substrate 210 includes Si, and dielectric layer 323 includes silicon dioxide ($SiO_2$). Additional dielectric layer materials include gallium oxide ($GaO_3$), aluminum oxide ($Al_2O_3$), or alloys thereof, oxides of compounds from Groups III and V or alloys thereof, and the like. Exemplary oxides in the dielectric layer also include ZnO, $HfO_2$, $SnO_2$, $In_2O_3$, $Zn_2SnO_4$, $Ga_2O_3$, $Al_2O_3$, and the like. In an embodiment, the dielectric layer is a product of oxidation of a portion of substrate 210 to produce the semiconductor oxide. According to one embodiment, the oxide is a product of rapid thermal oxidation of substrate 210 so that the oxide (the dielectric layer) is derived from substrate 210. In another embodiment, the oxide is a product of low temperature oxidation of substrate 210 to produce an oxide. In a further embodiment, the oxide is a product of depositing the oxide on substrate 210, which may or may not involve oxidation of substrate 210. In a certain embodiment, the dielectric layer includes $SiO_2$ as the oxide, which is a product of oxidation of substrate 210 that includes Si. In some embodiments, the dielectric layer includes a semiconductor oxide, a ceramic (e.g., $ZrO_2$, $Al_2O_3$, SiC, $Si_3N_4$, BN, $BaTiO_3$, and the like), a glass, a polymer, or a combination thereof. In some embodiments, the dielectric layer includes an organic compound such as a polymer, e.g., cellulose, poly(methyl methacrylate), and the like.

Substrate 333 can have the same composition, properties and function as substrate 210.

Photonic dosimeter 200 accrues cumulative dose for performing dosimetry, and photonic calorimeter 300 converting ionizing radiation dose to heat for performing calorimetry. Photonic dosimeter 200 includes waveguide 212. In an embodiment, waveguide 212 guides light along a path; can have dimensions from 300 nm to 1 micrometer width, 200 nm to 500 nm height; can include silicon and similar material; and can be operable at a wavelength from 1 micron to 2.5 microns. The waveguide can contain a coupling element to communicate light into the waveguide. Examplary coupling elements include a Bragg coupler, inverse taper, and the like. The waveguide can include an optical resonator to measure temperature, strain, or radiation dose.

Compensation waveguide 238 guides light along a path; has dimensions of: 300 nm to 1 micrometer width, 200 nm to 500 nm height; is composed primarily of materials like silicon and works over the range of 1 micron to 2.5 microns wavelength of light; the waveguide may contain coupling elements to bring light into the waveguide, such as Bragg couplers or inverse tapers; the waveguide may include optical resonators to enable measurement of temperature.

Aperture 324 has a diameter from 25 nm to 500 nm, more specifically 50 nm to 300 nm, in compensation waveguide 238. In an embodiment, a plurality of apertures 324 have different size diameters. According to one embodiment, the plurality of apertures 324 have different size diameters such that apertures 324 are arranged symmetrically with respect to compensation resonator 236 with largest diameter apertures 324 located distal to compensation resonator 236 and smallest diameter apertures 324 located proximate to compensation resonator 236.

Aperture 325 is an opening interposed between compensation resonator 236 and substrate 210. Aperture 325 has a size in a dimension (e.g., depth, width, or height) effective to mechanically or optically decouple compensation resonator 236 and substrate 210 such that compensation resonator 236 and substrate 210 independently support a mechanical mode or an optical mode.

Auxiliary waveguide 326 is similar in construction and function to the compensation waveguide 238. In a particular embodiment, auxiliary waveguide 326 transmits light from the compensation resonator 236 to light detector 260.

Waveguide 334 is similar in construction and function to compensation waveguide 238.

Aperture 335 is an opening interposed between a portion of waveguide 334 and substrate 333. Aperture 335 has width W and thickness H, a dimension of each of which independently can be varied during formation to form various shapes (e.g., circular, square, polygonal, and the like) and aspect ratios of length L, width W, and thickness H.

Edge coupler 339 is disposed at the terminus of a waveguide. Edge coupler 339 couples light in and out of a waveguide, in a particular embodiment by, e.g., a pigtailed fiber optic, which is connected, e.g., adhered, to substrate 333, brings light into and out of a compensation waveguide 238.

Waveguide 366 is a waveguide that transmits light to (or receives light from) an optical resonator (e.g. optical ring resonator 367). Waveguide 366 has similar construction and function to compensation waveguide 238.

In photonic dosimeter 200, dosimatrix 220 is an array of photonic resonators that changes resonant frequency in response to received dose. Photonic dosimeter 200 includes active element 224. Active element 224 interacts with ionizing radiation 254, whereupon active element 224 undergoes conversion from prime state 230 to dosed state 232 in response to receipt, by active element 224, of a dose of ionizing radiation 254. Active element 224 can include a compound semiconductor that is a group III-V semiconductor. Exemplary group III-V semiconductors include AlN, GaN, InN, TlN, BP, AlP, GaP, InP, TlP, BAs, AlAs, GaAs, InAs, TlAs, BSb, AlSb, GaSb, InSb, TlSb, BBi, AlBi, GaBi, InBi, TlBi, or a combination thereof. It is contemplated that besides active element 224, dosimatrix 220 can include materials mentioned above in addition to silicon dioxide, III-V materials coated in silver, titanium, gold or copper and polymers synthesized using free-radical polymerization. In an embodiment, dosimatrix 220 consists essentially of active element 224.

To determine accrued dose of ionizing radiation 254 by active element 224, active element 224 undergoes conversion from prime state 230 to dosed state 232. Exemplary conversions include frequency change, changes in linewidth or intensity. In undergoing conversion from prime state 230 to dosed state 232, active element 224 experiences a change in refractive index brought on by changes in temperature, stress, chemical or physical characteristics such as density or volume/geometry resulting in frequency change. In undergoing conversion from prime state 230 to dosed state 232, resulting in changes in linewidth or intensity, active element 224 experiences changes in light transmission, reflectivity that results in increased optical losses resulting in lower quality factors or greater linewidths. Accordingly, prime state 230 can be the frequency, linewidth or intensity of the resonance before dosing. Further, dosed state 232 can be the frequency, linewidth or intensity of the resonance after dosing.

In an embodiment, compensation resonator 236 comprises an element from group I of the periodic table (IUPAC group 11), group II of the periodic table (IUPAC group 12), group III of the periodic table (IUPAC group 13), group IV of the periodic table (IUPAC group 14), group V of the periodic table (IUPAC group 15), or group VI of the periodic table (IUPAC group 16) in an absence of a compound semiconductor that includes a group III-V semiconductor.

Disk resonator 316 is an optical resonator that can include materials such as those in optical resonators 328 or compensation waveguide 238. In a particular embodiment, a disk resonator consists of a circular structure with radius R, thickness T, sitting on a pedestal 321 composed of substrate 210.

Concave resonator 317 includes a base 319 proximately disposed to substrate 210, concave portion 318, and protuberance 320. Concave portion 318 has width W3 and depth H4, and protuberance 320 has width W4 at a top surface thereof. Thickness H3 is a thickness of concave resonator 317. Width W4 of protuberance 320 optionally can be absent in some embodiments.

Bragg grating 327 includes a plurality of regions having a different refractive index from each. The first or second index of refraction can be the same or different as an index of refraction of a remainder of material of optical resonator 328. According to an embodiment, Bragg grating 327 is a periodic or aperiodic perturbation of an effective index of refraction in optical resonator 328. In an embodiment, the perturbation causes reflection of light (propagating in optical resonator 328) for a wavelength of light that satisfies a Bragg condition. Light at other wavelengths that does not satisfy the Bragg condition is substantially unaffected by Bragg grating 327.

Bragg coupler 336 an end coupler, or a combination comprising at least one of the foregoing disposed at a terminus of the waveguide. As shown in FIG. 31A (top view of waveguide 238) or 31B (cross-section along line B-B of FIG. 30A), waveguide 238 includes Bragg coupler 336 disposed at a terminus thereof. Bragg coupler 336 includes a plurality of protrusions 337 and depressions 338 alternatingly disposed on substrate 210. With reference to FIG. 30C (an alternate embodiment for a Bragg coupler corresponding to a cross-section along line B-B in FIG. 30A), depressions 338 are blind with respect to substrate 210 relative to through features as shown in FIG. 30B. In one embodiment, depressions 338 include blind depressions, through depressions, or a combination thereof. Here, "through" refers to expose substrate 210 through depressions 338, and "blind" refers to covering substrate 210 by depressions 338 such that substrate 210 is not exposed. It is contemplated that a Bragg coupler uses a grating structure (e.g., protrusions 337 and depressions 338) to couple input light into and output light out of the optical resonator, e.g. optical resonator 328. In an embodiment, coupling light by waveguide 238 is free-space coupling via Bragg coupler 336.

Ring resonator 367 is an optical resonator that includes a ring structure having a 10 µm radius and is separated from waveguide 366 by 130 nm. The ring resonator has a free spectral range of 9.2 nm at 1550 nm, Q-factor of 52000, and estimated group index of 4.2.

The optical resonator and waveguide independently can be made from a same or different material as the substrate. In some embodiments, the optical resonator incudes sapphire, silicon, silica, silicon nitride, aluminum nitride, diamond, silicon carbide or a combination thereof. The material for forming the optical resonator can be selected based on a resonant wavelength for the optical resonator, e.g., silicon for devices a resonant frequency in a near infrared region (e.g., up to 2 µm wavelength), silicon nitride or aluminum nitride for a visible wavelength, sapphire for a terahertz wavelength, and the like.

Cladding 226 includes a dielectric material disposed on photonic elements, such as a waveguide (e.g. waveguide 212) or dosimatrix 220. In an embodiment, cladding 226 is interposed between the dosimatrix 220 and the cover layer 228. In an embodiment, the dielectric layer electrically insulates substrate 210 from thermal member 314. The dielectric layer can include an oxide of an element in substrate 210 or independently can be an oxide of a semiconductor material such as $SiO_2$. According to an embodiment, the dielectric layer is an oxide such as an oxide that includes an element from substrate 210, e.g., an oxide of the semiconductor (also referred to herein as a semiconductor oxide).

Cover layer 228 can include a material to undergo a thermophysical or chemical change (e.g. strain, temperature, density, volume, conductivity, dielectric constant) or alters the ionizing radiation 254. In an embodiment, cover layer 228 communicates or enhances changes to dosimatrix 220 that influence the change from prime state to dose state in dosimatrix 220. In an embodiment, cover layer 228 is composed of polymers (e.g., free-radical polymerization products), water, graphite, $SiO_2$, diamond, SiN, air, Si, and the like.

Thermal isolator 262 thermally isolates radiation absorbers (e.g., radiation absorber 268) from heat loss or gain by thermal transfer due to physical contact by an object (e.g., substrate 210). Thermal isolator 262 can include material with low thermal conductivity, e.g., air, vacuum, or a mechanical element that can include a standoff made of structured materials or partial removal of a substrate, such as substrate 210.

In photonic calorimeter 300, radiation absorber 268 absorbs ionizing radiation 254 and converts ionizing radiation 254 to secondary radiation that is absorbed, thermalized, and conducted as heat to the compensating resonator 236. Radiation absorber 268 includes outer surface 264 and interior material 266 disposed in and bounded by outer surface 264. Interior material 266 can be a solid, fluid, or combination thereof. When interior material 266 includes a fluid, the fluid is contained inside outer surface 264 that is a solid material that entraps the fluid to prevent the fluid from loss out of radiation absorber 268. When interior material 266 is a solid, outer surface 264 can be a same solid as interior material 266 or a different solid than interior material 266. Interior material 266 absorbs ionizing radiation 254 and converts ionizing radiation 254 to heat. outer surface 264 can be transparent to ionizing radiation 254 or can absorb and convert to heat ionizing radiation 254. Exemplary fluids include water, fluoropolymers, blood, blood plasma, alcohols, oils, water, and the like. Exemplary solids include graphite, silicon, silica, sapphire, alanine, diamond, polymers (such as polymethylmethacrylate, polyvinyl alcohol, polydimethylsiloxane), hydroxyapatite, and graphite, and the like.

Thermal member 314 measures temperature. In various embodiments, thermal member 314 includes a metal layer. The metal layer can be disposed on substrate 210, on the dielectric layer, or disposed on substrate 210 and covered by a dielectric layer interposed between thermal member 314 and compensation resonator 236. Exemplary conductive materials include a metal such as a transition metal, alkaline earth metal, alkali metal, rare earth metal, metal carbide, metal oxide, metal sulfide, or a combination thereof. Exemplary metals include Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd, and the like. Thermal member 314 can include the metal layer, a non-metal (e.g., graphene, carbon nanotubes, carbon black, and the like), or a combination thereof.

Cover layer 315 is made of material(s) that may undergo a thermophysical and/or chemical change (e.g. strain, temperature, density, volume, conductivity, dielectric constant) or alters the ionizing radiation 254 and, in an embodiment, communicates and/or enhances changes to the dosimatrix 220 that influence the change from prime state to dose state in the dosimatrix 220. In an embodiment, cover layer 315 is composed of polymers (e.g. free-radical polymerization products), water, graphite, $SiO_2$, diamond, SiN, air, Si.

Intermediate members (321, 322) can include materials described for the substrate, waveguide, or a combination thereof. Dielectric layer 323 includes a dielectric material that provides dielectric separation of elements disposed on dielectric layer 323.

Ionizing radiation 254 is radiation that can include x-rays, gamma rays, or particles. In some embodiments, ionization radiation includes electrons, alpha particles, positrons, or protons that cause ionization when the ionization radiation interacts with a material. Radiation source 404 is a material that produces ionizing radiation 254, e.g., radioactive material such as Co-60 or an accelerator-based source.

Light member 248 contains a light source and a light detector. In an embodiment, it contains light source 250 and light detector 252. Light member 256 contains a light source and a light detector. In an embodiment, it contains light source 260 and light detector 258. Light source 250 is a source of light. In an embodiment, light source 250 is a laser. Light source 258 is a source of light. In an embodiment, light source 258 is a laser. Light source 341 is a source of light. In an embodiment, light source 341 is a laser. First light source 347 is a source of light. In an embodiment, light source 347 is a laser. Second light source 348 is a source of light. In an embodiment, light source 348 is a laser. Light source 354 is a source of light. In an embodiment, light source 354 is a laser. Primary input light 214 is light transmitted from a light member (in an embodiment, light source 250) to a waveguide (in an embodiment, waveguide 212). Secondary output light 216 is light transmitted from dosimatrix 220 to waveguide 212. Secondary input light 218 is light transmitted from waveguide 212 to dosimatrix 220. Primary output light 222 is light transmitted from a waveguide (in an embodiment, waveguide 212) to a light member (in an embodiment, light member 248). Primary compensation input light 242 is light transmitted from a light member (in an embodiment, light source 258) to a waveguide (in an embodiment, temperature-compensating waveguide 238). Secondary compensation output light 244 is light transmitted from a waveguide (in an embodiment, temperature-compensating waveguide 238) to a compensation resonator (in an embodiment, compensation resonator 236). Primary compensation output light 246 is light transmitted from a waveguide (in an embodiment, temperature-compensating waveguide 238) to a light member (in an embodiment, light source 258). Resonant frequency 240 is the frequency of light transmitted from a compensation resonator 236 to compensation waveguide 238.

Light detector 252 produces a measurable voltage or current that can be quantified, in response to incident light. Light detector 260 produces a measurable voltage or current that can be quantified, in response to incident light First detector 344 produces a measurable voltage or current that can be quantified, in response to incident light Second detector 346 produces a measurable voltage or current that can be quantified, in response to incident light Detector 351 produces a measurable voltage or current that can be quantified, in response to incident light. First detector 359 produces a measurable voltage or current that can be quantified, in response to incident light Second detector 364 produces a measurable voltage or current that can be quantified, in response to incident light Optical filter 342 removes a portion of the frequency spectrum of the incident light. Beam splitter 343 divides incident light flux into two or more paths. Combiner 349 combines multiple light paths into one output light path. Optical amplifier 350 increases the intensity of the primary light (an embodiment is an erbium-doped fiber amplifier). Controller 353 is an electronic device that controls other elements such as light members and optical amplifiers. Splitter 355 divides incident light flux into two or more paths.

In an embodiment, thermometer is produced by forming the optical resonator (e.g., a ring resonator) on a silicon-on-insulator substrate (SOI). The substrate can include a stacked structure having a first silicon layer (e.g., 220 nm thick) and a buried silicon dioxide layer (BOX, e.g., 2 µm thick) interposed between the first silicon layer and a bottom silicon layer (e.g., 670 µm thick). The SOI can be a wafer or die. A positive or negative tone electron beam resist is spin coated on the SOI substrate and baked at a temperature above a glass transition temperature of the resist. The substrate is subjected to electron beam to provide the optical resonator. During development of the resist from an exposed resist (e.g., the positive tone electron beam resist) or an unexposed resist (e.g., the negative tone electron beam resist), portions of the first silicon layer are removed by a solvent post lithography to form an etch mask. The resulting structure is subjected to dry etching by, e.g., an inductively coupled plasma reactive ion etch where an unmasked portion of the first silicon layer is etched through to the BOX layer. The etch mask is dissolved in a solvent to provide the thermometer. In some embodiment, the dielectric layer (e.g., silicon dioxide) is disposed on the thermometer by plasma-enhanced chemical vapor deposition to provide, e.g., a 2 µm thick silicon dioxide dielectric layer.

According to an embodiment, the Bragg grating or Bragg coupler can be formed by irradiating the optical resonator or the waveguide with an ultraviolet light (e.g., from an ultraviolet laser such as ArF or KrF) to modify an index of refraction of the illuminated material. An angle between an ultraviolet light beam and optical resonator (or waveguide) can determine a period of protrusions and depressions of the Bragg grating or coupler and thus the Bragg wavelength. A plurality of ultraviolet laser beams can be used to create a periodic phase mask (photomask) in a phase mask technique, e.g., by using two first-order diffracted ultraviolet laser beams. A non-periodic phase mask can be used to obtain other patterns of the Bragg grating or coupling. In another embodiment, a point-by-point Bragg grating or coupler is created by point-by-point writing a pattern with a focused laser beam. In some embodiments, an infrared light having intense femtosecond pulses is used to produce the Bragg grating or coupler.

According to an embodiment Bragg grating is fabricated on a silicon-on-insulator substrate (SOI) that includes the topmost silicon layer (e.g. 220 nm thick), thick buried silicon dioxide layer (BOX) e.g. 3 µm thick, and the supporting bottom silicon layer (e.g. 670 µm thick). The SOI can be wafer or die. A positive or negative tone electron beam resist is spin coated on the SOI substrate, and the resultant structure is baked at a temperature greater than a glass transition temperature of the resist. The substrate is subjected to electron beam exposure to provide the Bragg grating. Electron beam lithography defines the structure of Bragg grating and is an etch mask. A subsequent dry etch process such an inductively coupled plasma reactive ion etch where an unmasked portion of the first silicon layer is etched through to the BOX layer. The etch mask is dissolved in a solvent to provide the thermometer. In some embodiments, the dielectric layer (e.g., silicon dioxide) is disposed on the thermometer by plasma-enhanced chemical vapor deposition to provide, e.g., a 2 µm thick silicon dioxide dielectric layer.

A physical size or material of the thermometer is selected based on a wavelength range of the input light, output light, or resonant frequency of the optical resonator. The optical resonator can have an outer diameter from 9 µm to 900 µm, specifically 9 µm to 700 µm, and more specifically from 9 µm to 150 µm. A distance between the optical resonator and the waveguide can be less than or equal to 300 nm, specifically 10 µm to 200 µm, and more specifically from 20 nm to 150 nm.

In an embodiment, the thermometer is configured to measure a temperature from 300 milliKelvin (mK) to 500 K, specifically 300 mK to 450 K, and more specifically 300 mK to 325 K. According to an embodiment, the thermometer is configured to measure a temperature, wherein an uncertainty in a measured temperature is less than or equal to 10 mK. In certain embodiments, the thermometer has a temperature resolution greater than or equal to 1 mK. The thermometer has a temperature-dependent shift in a resonance wavelength from (picometers per Kelvin (pm/K) to 150 pm/K. According to an embodiment, for resolving a temperature difference, the thermometer has a resolution greater than or equal to 1 mK (i.e., the thermometer resolves a temperature difference of at least 1 mK), specifically greater than or equal to 80 µK, and more specifically greater than or equal to 10 µK.

The thermometer has advantageous optical properties. In an embodiment, the input light to the thermometer includes a wavelength from 200 nm to 10 µm, specifically 400 nm to 3 µm, and more specifically 500 nm to 2 µm. The resonant frequency of the optical resonator includes a wavelength from 200 nm to 10 µm, specifically 400 nm to 3 µm, and more specifically 500 nm to 2 µm. The output light of the thermometer includes a reduced transmission of the resonant frequency with respect to the input light. A free spectral range of the optical resonator is greater than 0.001 nm and specifically from 0.1 nm to 20 nm. A bandwidth of the optical resonator is from 0.0001 nm to 1 nm. A quality factor (Q-factor) of the optical resonator is from 1 to 106 and specifically from 100 to 100,000. It is contemplated that the optical resonator can have an increased Q-factor by including a Bragg reflector.

In an embodiment, a group index is from 1 to 5, specifically from 1.5 to 4.7. The thermometer operates over a wide range of input light power provided the resonant wavelength can be communicated from the waveguide to the optical resonator. Moreover, the power can be as large as a damage threshold of the optical resonator or waveguide, e.g., greater than or equal 10 microwatts (µW), specifically greater than 20 µW, and more specifically 50 µW up to the damage threshold.

The thermometer has numerous advantages and benefits. The thermometer is useful to detect a temperature with a sub-mK resolution. The thermometer has a low noise level and low thermal mass. Moreover, the thermometer is substantially unaffected by electromagnetic interference and has applications wherever a thermometer can be used provided light can be coupled into the thermometer with transmission from the waveguide to the optical resonator. Exemplary areas of application include, but are not limited to, medicine, aerospace, analytical instrumentation, microfluidic, and the like.

The thermometer leverages frequency metrology to achieve mechanical and environmental stability. A silicon-based thermometer that includes the optical resonator resolves temperature differences of 1 mK using, e.g., by scanning the input wavelength over the resonant frequency of the optical resonator, and a noise floor of 80 µK or better is achieved for measuring a temperature difference, e.g., by using a side-of-fringe method where constant power input light is incident at the waveguide as discussed below.

Additionally, while certain conventional thermometers such as a platinum resistance thermometer is sensitive to mechanical shock, the thermometer herein has a response that is substantially independent of mechanical shock such that the thermometer is configured to operate stably in a presence of a perturbing vibration and can be disposed on a plurality of actively vibrating articles, e.g., airplanes, satellites, automobiles, buildings, shoes, and the like. Moreover, the thermometer can be inexpensively manufactured compared to many current commercially available thermometers.

The thermometer beneficially includes an optical resonator that has a periodic notch filter-like thermal response where the resonant wavelength shows a temperature-dependent change due to thermal expansion or thermo-optic effect.

Advantageously, a resonance frequency of the thermometer does not vary over a wide range of relative humidity levels, e.g., a relative humidity greater than 17 percent relative humidity (% RH), and more specifically 26% RH, based on amount of water vapor in a gas surrounding the optical resonator. As such, a change in resonance frequency is due to a temperature change, which does not depend on a change in humidity of an environment in which the thermometer is disposed.

The thermometer has numerous uses. In an embodiment, the thermometer has a temperature response such that the output light from the waveguide depends on a temperature of the optical resonator. For the optical resonator that includes the ring resonator, a change in the resonant frequency (corresponding to resonant wavelength $\lambda_r$) arises from a change in refractive index (n) of the optical resonator or a change of a physical dimension of the optical resonator that occurs in response to a change in temperature of the optical resonator. The resonance wavelength $\lambda_r$ for a mode number (m) of a ring resonator is $\lambda_r(m)=[n_{eff}(\lambda,T_r)\times L(T_r)]/m$, where $\lambda$ is a vacuum wavelength; $n_{eff}$ is an effective refractive index of the ring resonator; m is a mode number; L is a ring perimeter; and $T_r$ is a temperature of the optical resonator. A change in the resonant wavelength of the optical resonator is given by formula (1)

$$\Delta\lambda_r = \Delta T_r \lambda_r \left( \frac{\frac{\partial n_{eff}}{\partial T_r} + n_{eff}\frac{\partial L}{\partial T_r}\frac{1}{L}}{n_g} \right)$$

where group index $n_g$ is given by $$n_g = n_{eff} - \lambda_r \frac{\partial n_{eff}}{\partial \lambda_r}$$

Figure 32:
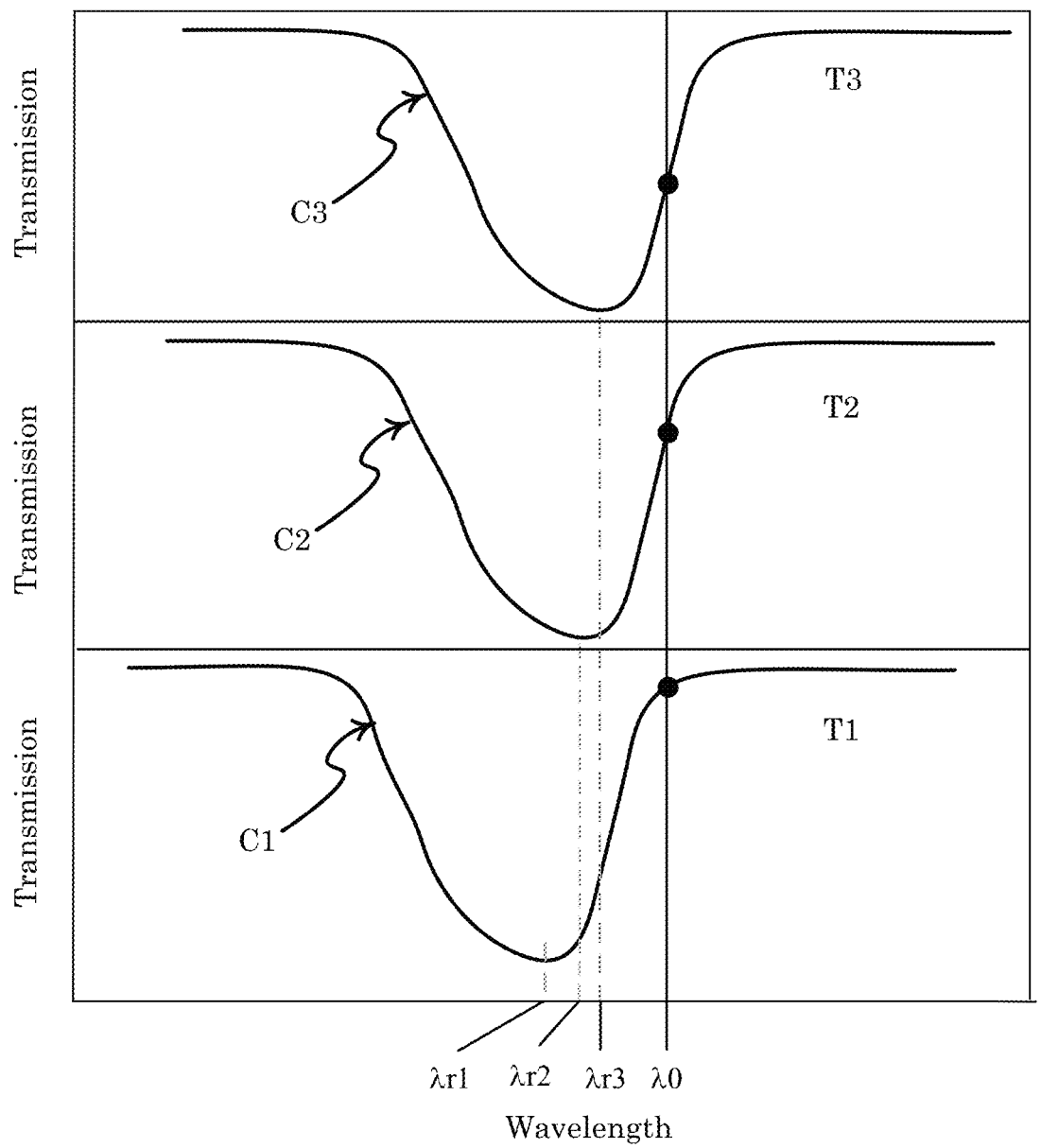
FIG. 32 shows a graph of transmission versus wavelength for a plurality of temperatures.
Figure 33:
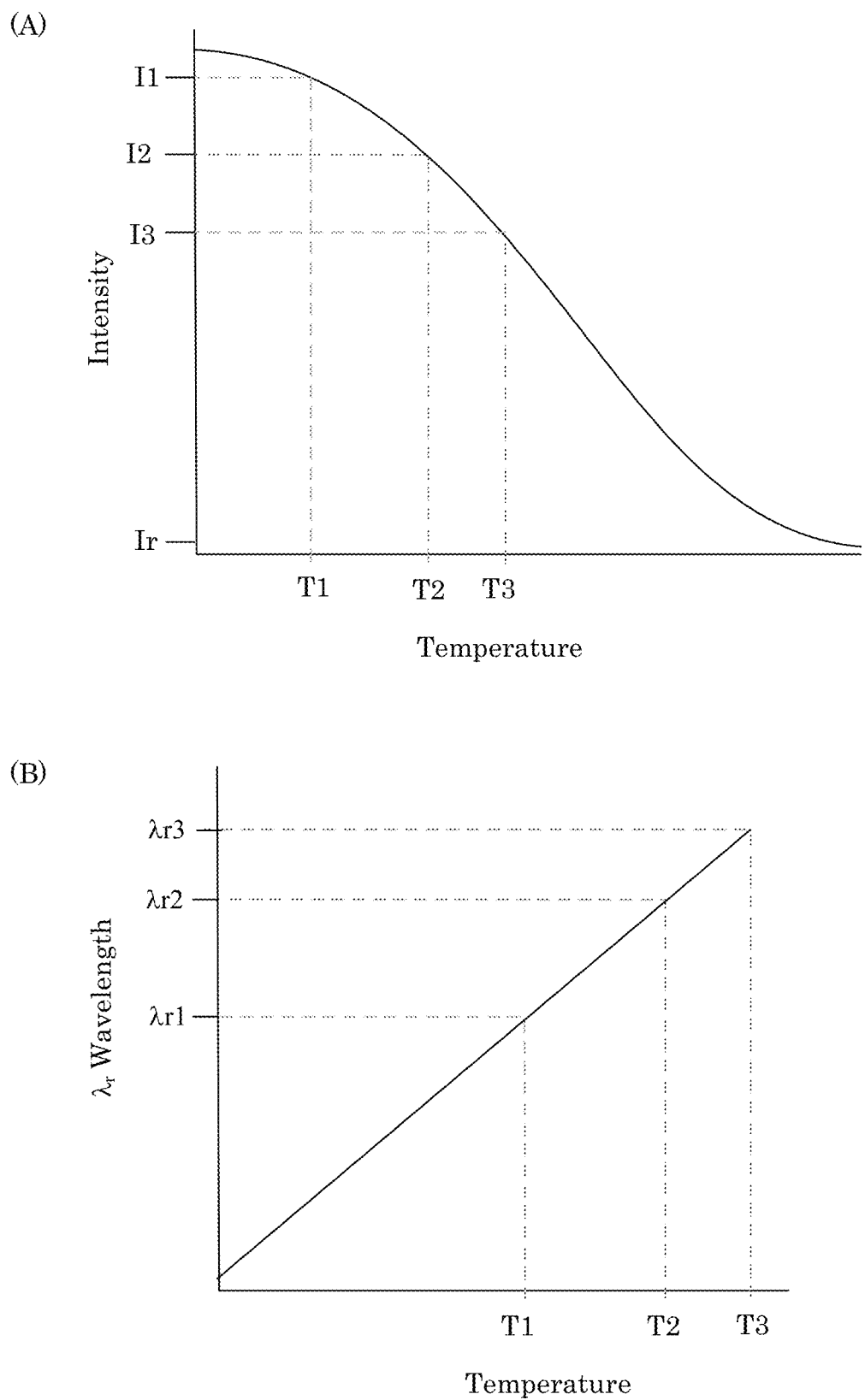
FIG. 33 shows a graph of intensity versus temperature in panel A and a graph of resonant wavelength versus temperature in panel B.

With reference to FIG. 32, in an embodiment, a process for acquiring a temperature from the thermometer includes providing the thermometer that includes the optical resonator and that has first transmission curve C1 at first temperature T1, second transmission curve C2 at second temperature T2, and third transmission curve C3 at third temperature T3. The optical resonator has first resonant wavelength Xr1 at first temperature T1, second resonant wavelength Xr2 at second temperature T2, third resonant wavelength Xr3 at third temperature T3. The input light at wavelength $\lambda 0$ is provided to the waveguide and transmission of the output light at wavelength $\lambda 0$ is detected as the thermometer is subjected to a temperature change that includes first temperature T1, second temperature T2, and third temperature T3. In this manner, the output light detected at wavelength $\lambda 0$ establishes an intensity curve as shown in FIG. 33 for a graph of intensity versus temperature of the thermometer. Here, the output has first transmission intensity I1, second transmission intensity I2, third transmission intensity I3 respectively at first temperature T1, second temperature T2, and third temperature T3.

Furthermore, first resonant wavelength λr1 at first temperature T1, second resonant wavelength λr2 at second temperature T2, third resonant wavelength Xr3 at third temperature T3 can be detected using a detector, e.g., a wavemeter. Such results are shown in FIG. 14C for a graph of resonant wavelength versus temperature. Information in the graph shown in FIG. 14C and knowledge of intensity data provides determination of an unknown temperature of temperature change of the thermometer. According to an embodiment, a process for determining an unknown temperature or change in temperature includes detecting an intensity of output light at a wavelength and comparing an intensity of output light at the wavelength to an intensity curve to determine the temperature, temperature change, or combination thereof.

According to an embodiment, the thermometer includes the thermal member to change a temperature of the thermometer by providing a controlled and defined heat source to the thermometer, e.g., the optical resonator. The change in resonant frequency of the optical resonator is measured and a transmission response of output light is detected to determine if the thermometer is responding as expected based on either a theoretical response curve or a calibration curve for the thermometer.

In an embodiment, a process for determining a thermal property includes providing a thermometer that includes a substrate, an optical resonator disposed on the substrate and comprising an optical resonance and a waveguide disposed on the substrate proximate to the optical resonator. The process also includes subjecting the optical resonator to a first temperature, receiving (by the waveguide) an input light comprising a wavelength having a first transmission intensity through the waveguide at the first temperature, receiving (by the optical resonator from the waveguide) a first amount of the wavelength at the first temperature, subjecting the optical resonator to a second temperature, receiving (by the optical resonator from the waveguide) a second amount of the wavelength at the second temperature, changing the first transmission intensity to a second transmission intensity corresponding to the second amount, and analyzing the first transmission intensity and the second transmission intensity to determine the thermal property that includes the first temperature, the second temperature, a difference between the first temperature and the second temperature, or a combination comprising at least one of the foregoing.

According to an embodiment, the process for determining the thermal property further includes subjecting the optical resonator to a temperature change that includes the first temperature and the second temperature by applying an amount of electrical power to a thermal member disposed on the substrate to achieve the first temperature, the second temperature, or a combination comprising at least one of the foregoing; and comparing a change in the first transmission intensity and the second transmission intensity, the difference between the first temperature and the second temperature, or a combination comprising at least one of the foregoing to a reference value for the amount of electrical power.

In an embodiment, with reference to FIG. 34A, thermometer system 340 includes light source 341 to provide primary compensation input light 242 to thermometer 345. Light source 341 is a broad band source (e.g., a lamp), a laser, or a combination thereof. Optical filter 342 (e.g., a Fabry-Perot cavity) is optionally disposed in a path of the input light to select a narrow bandwidth of input light to be communicated to thermometer 345. Beam splitter 343 is optionally used to provide a portion of the input light to first detector 344, e.g., a wavemeter to measure the wavelength of the input light, a photodiode, a power meter, and the like. It is contemplated that a wavelength of the input is measured using, e.g., a wavemeter, an etalon, a spectrometer, a wavelength cell, a spectrum analyzer, and the like. Output light from thermometer 345 is sent to second detector 346, which is, e.g., a light detector such as a photo-diode, charge coupled device, semiconductor detector (e.g., InGaAs), photomultiplier tube, and the like.

According to an embodiment, with reference to FIG. 34B, thermometer system 340 includes thermometer 345 having an add-drop arrangement of an optical resonator and waveguides. Here, optional optical filter 342 is absent due to the self-filtering behavior of an auxiliary waveguide in combination with the optical resonator.

In an embodiment, with reference to FIG. 35A, thermometer system 340 includes thermometer 345 to receive input light from first light source 347 (e.g., a read-out laser) or second light source 348 (e.g., a cooling laser) via combiner 349 (e.g., a multiplexer or lock-in amplifier). Output light from thermometer 345 is directed to optical amplifier 350 and detected by detector 351 (e.g., a spectrum analyzer). Here, the side bands of second light source 348 are detected, and a ratio of an area of a side band or intensity is determined to calculate phonon occupancy, which is used in a Boltzmann's law calculation to provide temperature of the thermometer.

According to an embodiment, with reference to FIG. 35B, thermometer system 340 includes controller 353 (e.g., a microprocessor, computer, and the like) in communication with light source 354 that provides input light to splitter 355 and control thermometer 356, including a plurality of thermometers, e.g., first thermometer 357 and second thermometer 358 to provide a thermal calibration response for control thermometer 184. Output light from control thermometer 356 is sent to first detector 359 whose output signal is communicated to controller 353. A plurality of test thermometers (including the thermometer herein), e.g., first test thermometer 361, second test thermometer 362, and third test thermometer 363 are disposed in thermal contact with article 360 (e.g., airplane, automobile, surgical patient, desk clock, aquarium, and the like), and input light from beam splitter 355 is directed in series (or parallel) to first test thermometer 361, second test thermometer 362, and third test thermometer 363, which provide output light to second detector 364. An output signal is directed to the controller 353. Output signals from test thermometers (202, 204, 206) can be compared to reference signals from control thermometer 356.

In some embodiments, the thermometer is a self-diagnosing thermometer that includes a thermal member such that the thermometer is remotely interrogated after installation in an article. Here, the thermal member provides a known heat load to the optical resonator and output light is collected to determine if a change in the resonant frequency has occurred with respect to an expected value of change in the resonant frequency for the known heat load.

According to an embodiment, a process for self-diagnosing a thermometer includes disposing a thermal member proximate to an optical resonator of the thermometer, providing an input light to the waveguide, detecting output light from the waveguide, and measuring transmission intensity. The thermometer is at a first temperature, and a wavelength of the input light is changed such that the wavelength is swept over the resonance frequency of the optical resonator. The resonance frequency is determined. The process also includes providing an amount of electrical power to the thermal member, changing the temperature of the optical resonator, and changing the wavelength of the input light, wherein a wavelength range includes the resonance frequency. The resonance frequency is determined by detecting from the output light. In an embodiment, a plurality of heating events delivers a plurality of different amounts of electrical power to the thermal member. For a single measurement, a change in resonance frequency provides a change in the resonant frequency corresponding to a first temperature and a second temperature. For the plurality of heating events, the process also includes determining whether a change in the resonance frequency is linear with respect to a change in temperature. In an embodiment, an alert signal is communicated, e.g., to a user, in response to the change in resonant frequency being nonlinear with respect to temperature change. Such nonlinear behavior may be associated with operation of the thermometer in a non-calibrated fashion. Thus, the self-diagnosing behavior of the thermometer provides a way to perform a self-check service by a user or an automatic drive (e.g., an electronic controller such as programmed computer) to determine if the thermometer is performing within an acceptable parameter.

According to an embodiment, the thermometer is subjected to temperature-wavelength calibration to determine the response (e.g., a wavelength shift) determined at a plurality of temperatures that includes an operation temperature. A mathematical function (e.g., a polynomial) is fit to calibration data to create a conversion for a measured resonant wavelength (or wavelength shift) to a temperature.

In an embodiment, a process for self-calibrating a thermometer includes providing a thermometer (including a waveguide and optical resonator disposed on a substrate), determining the resonant frequency of the optical resonator, and providing a stable input light tuned to a longer wavelength side of the resonant frequency to cool the resonator (e.g., a detuned laser). A spectrum analyzer can be used to determine the frequency and intensity of the output light. Under a laser cooling condition, the spectrum analyzer displays a signal corresponding to the wavelength of the detuned laser (e.g., a frequency and intensity) and a plurality (e.g., two) side bands that occur, e.g., equidistantly from the detuned laser frequency. The self-calibration process further includes determining an area of each side band and determining phonon occupancy number P. Phonon occupancy number P is determined from the data by using a phonon occupancy equation such as $P=1/[(A(LF)/A(HF))-1]$, where P is the phonon occupancy number; $A(LF)$ is an area of a low frequency side band, and $A(HF)$ is an area of a high frequency side band. The temperature of the optical resonator is determined from phonon occupancy number P by applying Boltzmann's law. In a particular embodiment, a thermodynamic temperature is determined from phonon occupancy number P to eliminate a temperature artifact such as a triple point water such as that used in temperature standards, e.g., the International Temperature Scale of 1990 (ITS-90), to approximate a thermodynamic temperature.

Photonic dosimeter 200 can be made in various ways. In an embodiment, a process for making photonic dosimeter 200 includes forming dosimatrix 220 on a silicon-on-insulator substrate (SOI). The substrate can include a stacked structure having a first silicon layer (e.g., 220 nm thick) and a buried silicon dioxide layer (BOX, e.g., 2 μm thick) interposed between the first silicon layer and a bottom silicon layer (e.g., 670 μm thick). The SOI can be a wafer or die. A positive or negative tone electron beam resist is spin coated on the SOI substrate and baked at a temperature above a glass transition temperature of the resist. The substrate is subjected to electron beam to provide the optical resonator. During development of the resist from an exposed resist (e.g., the positive tone electron beam resist) or an unexposed resist (e.g., the negative tone electron beam resist), portions of the first silicon layer are removed by a solvent post lithography to form an etch mask. The resulting structure is subjected to dry etching by, e.g., an inductively coupled plasma reactive ion etch where an unmasked portion of the first silicon layer is etched through to the BOX layer. The etch mask is dissolved in a solvent to provide the dosimeter. In some embodiment, the dielectric layer (e.g., a polymer coating, such as a polyimide or polyvinyl alcohol) is disposed on the dosimeter by spin coating or drop casting to provide, e.g., a 2 μm thick layer of the dielectric polymeric layer.

In an embodiment, a process for making photonic calorimeter 300 includes: embedding temperature compensator 234 in radiation absorber 268 (such as graphite, polymethylmethacrylate, water) thermal isolator 262 (material, removal of material), thermal compensator 234 include compensation resonator 236 and a compensation waveguide 238, embedded in radiation absorber 268 while ensuring thermal isolation achieved by inserting a gap between the radiation absorber 268 and the substrate or other absorbers for a multiplexed embodiment 402.

Figure 36:
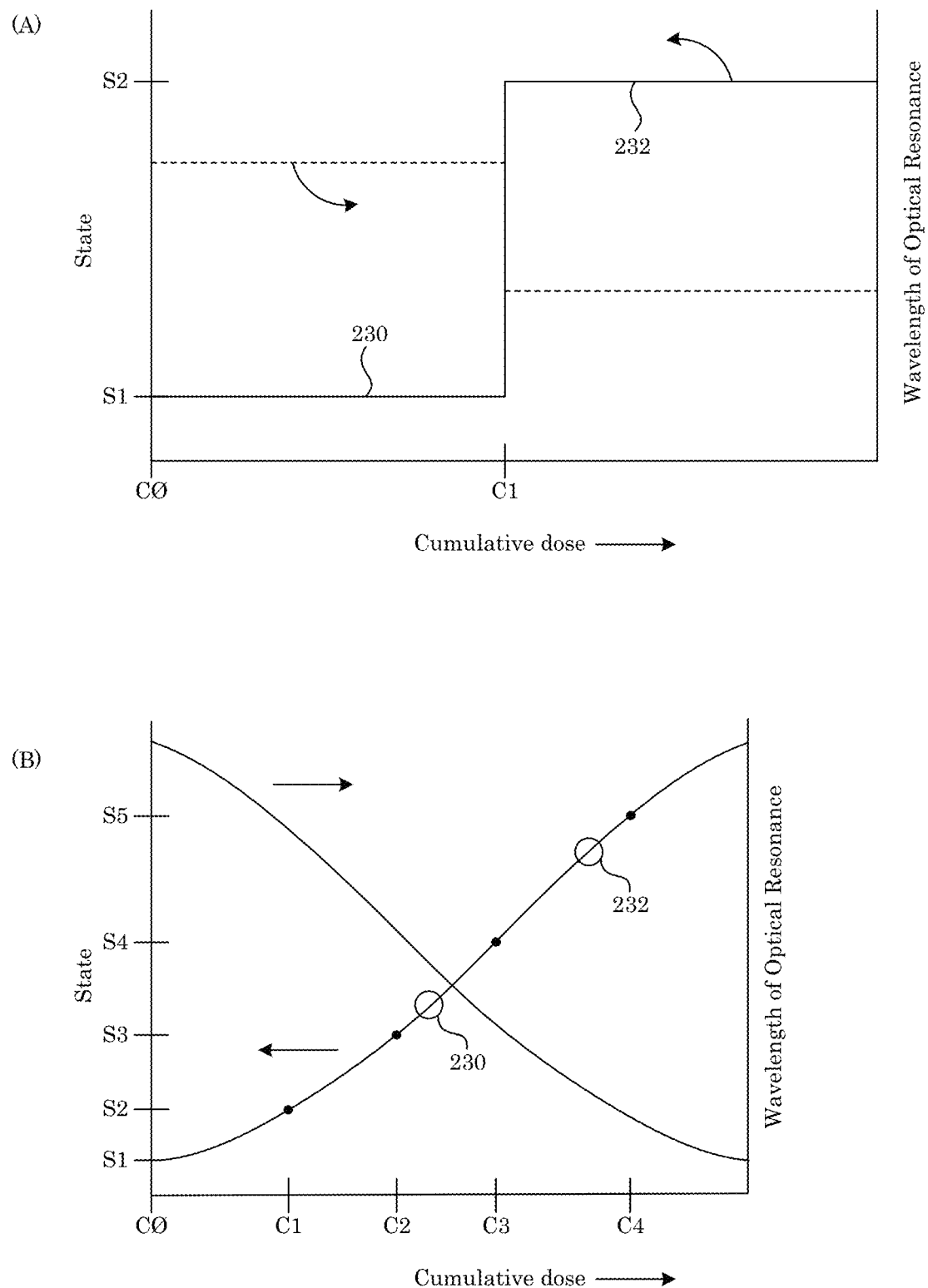
FIG. 36 shows a graph of state versus cumulative dose in panel A and a graph of state versus cumulative dose in panel B.
Figure 37:
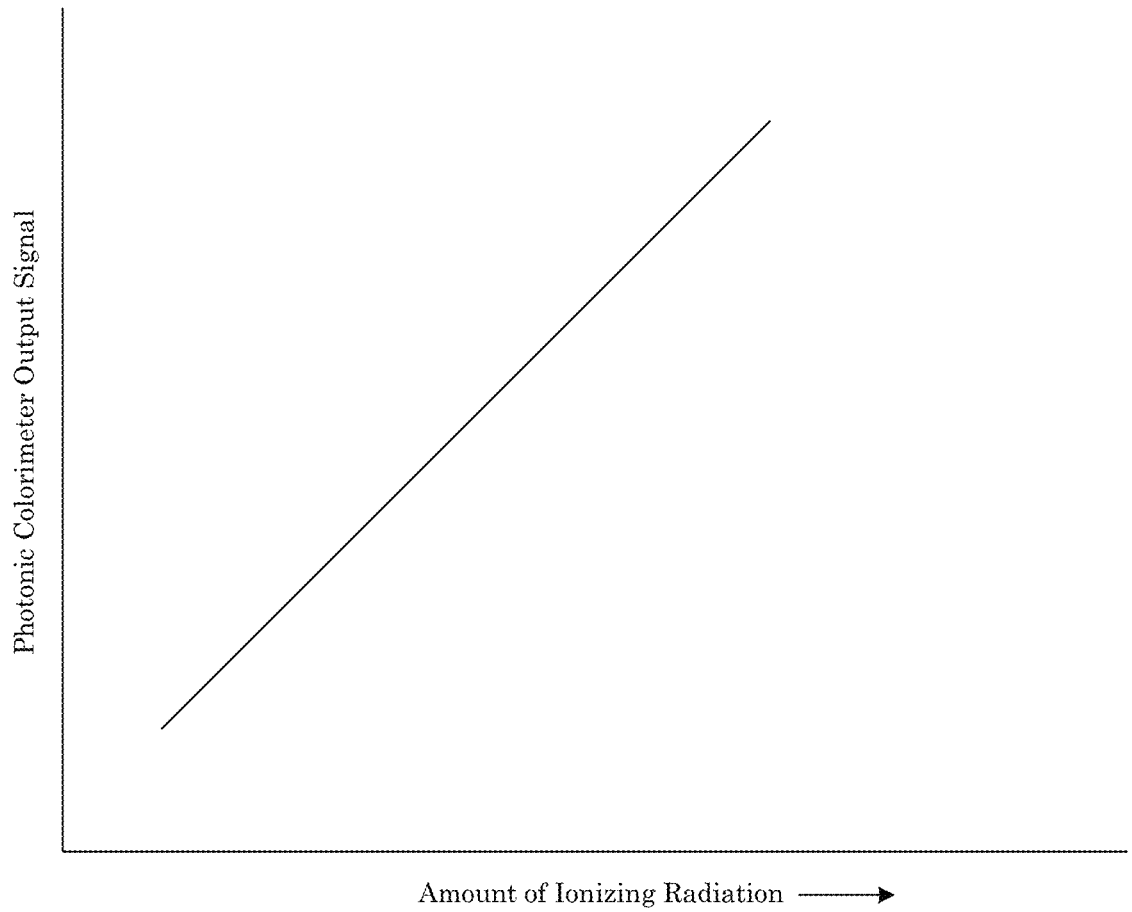
FIG. 37 shows a graph of photonic calorimeter output versus amount of ionizing radiation.

The thermometer provides an optical response as a function of temperature, e.g., as shown in FIG. 32 and FIG. 33. It is contemplated that photonic dosimeter 200 provides a response to cumulative dose of ionizing radiation 254 via conversion from prime state 230 to dosed state 232 as shown in panel A of FIG. 36. Here, at first cumulative dose C1 of dosimatrix 220, active element 224 is in first state S1 corresponding to prime state 230, wherein dosimatrix 220 has an optical resonance at first wavelength L1. As photonic dosimeter 200 is subjected to increasing cumulative dose of ionizing radiation 254, dosimatrix 220 obtains cumulative dose C2, and active element 224 converts from prime state 230 to dosed state 232, wherein dosimatrix 220 has an optical resonance at second wavelength L2. As a result, without changing a wavelength of primary input light 214 received by waveguide 212, primary output light 222 from waveguide 212 changed due to a change in secondary output light 216 because of the shift in wavelength of the optical resonance of dosimatrix 220 caused by increasing cumulative dose of ionizing radiation 254 received by dosimatrix 220 that converted from prime state 230 to dosed state 232. Panel B of FIG. 36 shows a continuous conversion of state of active element 224 from S1 at cumulative dose C1 with wavelength L1 of optical resonance of dosimatrix 220, to S2 at cumulative dose C2 with wavelength L2 of optical resonance of dosimatrix 220, to S3 at cumulative dose C3 with wavelength L3 of optical resonance of dosimatrix 220, to S4 at cumulative dose C4 with wavelength L4 of optical resonance of dosimatrix 220, and to S5 at cumulative dose C5 with wavelength L5 of optical resonance of dosimatrix 220. With regard to prime state 230 and dosed state 232 of dosimatrix 220, any state at a selected cumulative dose (e.g., C2) can be selected as a primary state, and any state at a cumulative dose (e.g., C8, which is not shown in panel B of FIG. 36 but would be greater than C5) greater than the selected cumulative dose can be a dosed state. Accordingly, photonic dosimeter 200 can be used multiple times, can be used over differing amounts of cumulative dose, can be used over an arbitrary period of dosing, or can be subjected to continuous or intermittent dosing with ionizing radiation 254.

Photonic dosimeter 200 has numerous advantageous and unexpected benefits and uses, including performing dosimetry In an embodiment, a process for performing dosimetry with photonic dosimeter 200 includes: receiving, by waveguide 212, primary input light 214; producing, by waveguide 212, secondary input light 218 from primary input light 214; receiving, by dosimatrix 220, secondary input light 218 from waveguide 212; producing, by dosimatrix 220, secondary output light 216 from secondary input light 218; receiving, by waveguide 212, secondary output light 216 from dosimatrix 220; producing, by waveguide 212, primary output light 222 from secondary output light 216; subjecting dosimatrix 220 to ionizing radiation 254; and changing active element 224 from prime state 230 to dosed state 232 in response to receiving ionizing radiation 254 by dosimatrix 220 to perform dosimetry. The process for performing dosimetry further can include determining a first dosimeter response based on secondary output light 216 prior to subjecting dosimatrix 220 to ionizing radiation 254. Additionally, the process for performing dosimetry can include determining a second dosimeter response based on secondary output light 216 after subjecting dosimatrix 220 to ionizing radiation 254. In some embodiment, the process for performing dosimetry includes determining a dose of ionizing radiation 254 absorbed by dosimatrix 220 from first dosimeter response and second dosimeter response. It is contemplated that determining the dose includes performing an inverse radiation-transport simulation; and determining an energy absorbed per unit mass of dosimatrix 220 from changing active element 224 from prime state 230 to dosed state 232. Moreover, the first dosimeter response and the second dosimeter response can differ in a resonance frequency, an amount of transmission, or a combination of the foregoing differences. The process for performing dosimetry also can include logging a temperature history of photonic dosimeter 200 by: receiving, by compensation waveguide 238, primary compensation input light 242; producing, by compensation waveguide 238, resonant frequency 240 from primary compensation input light 242; receiving, by compensation resonator 236, resonant frequency 240 from compensation waveguide 238; producing, by compensation resonator 236, secondary compensation output light 244 from resonant frequency 240; receiving, by compensation waveguide 238, secondary compensation output light 244 from compensation resonator 236; producing, by compensation waveguide 238, primary compensation output light 246 from secondary compensation output light 244; and monitoring primary compensation output light 246 as a function of time to log the temperature history of photonic dosimeter 200. Here, primary compensation output light 246 changes as a function of temperature of compensation resonator 236. According to an embodiment, in the process for performing dosimetry, changing prime state 230 to dosed state 232 includes changing a physical property or a chemical property of active element 224 by ionizing radiation 254.

In the process for performing dosimetry, primary light 214 is transmitted from a light member 248 and can originate from a light source 250 and receiving, by waveguide 212, primary input light 214 can include is transmitted into dosimeter 200. In a particular embodiment, primary light from a laser is swept over a wavelength range and transmitted to the waveguide on a dosimeter via fiber optic.

In the process for performing dosimetry, producing, by waveguide 212, secondary input light 218 from primary input light 214 can be transmitted to the dosimatrix 220. In a particular embodiment, light in the waveguide is coupled to the optical resonator.

In the process for performing dosimetry, receiving, by dosimatrix 220, secondary input light 218 from waveguide 212 can interact with the dosimatrix 220 and the active element 224. In a particular embodiment, frequencies of light resonant with the optical resonator are trapped in the resonator; transmitted light will show intensity changes around the resonant frequencies.

In the process for performing dosimetry, producing, by dosimatrix 220, secondary output light 216 from secondary input light 218 can be transmitted to the waveguide 212. In a particular embodiment, light in the optical resonator is coupled into the waveguide.

In the process for performing dosimetry, producing, by waveguide 212, primary output light 222 from secondary output light 216 can be transmitted to a light member 248, and subsequently transmitted to a light detector 252. In an embodiment, light is transmitted from the waveguide to the detector by fiber optic cable.

In the process for performing dosimetry, subjecting dosimatrix 220 to ionizing radiation 254 can change the state of dosimatrix 220 from the prime state to the dosed state. In an embodiment, the dosimatrix is placed under a source of ionizing radiation and exposed to ionizing radiation.

In the process for performing dosimetry, changing active element 224 from prime state 230 to dosed state 232 in response to receiving ionizing radiation 254 by dosimatrix 220 can include changes in resonance frequency, intensity and linewidth that are transmitted to the secondary light.

In the process for performing dosimetry, determining a first dosimeter response based on secondary output light 216 prior to subjecting dosimatrix 220 to ionizing radiation 254 can include measuring and recording spectral characteristics of output light 216. In an embodiment, the frequency characteristics of the output light are measured.

In the process for performing dosimetry, determining a second dosimeter response based on secondary output light 216 after subjecting dosimatrix 220 to ionizing radiation 254 can include measuring and recording spectral characteristics of output light 216. In an embodiment, the frequency characteristics of the output light are measured.

In the process for performing dosimetry, determining a dose of ionizing radiation 254 absorbed by dosimatrix 220 from first dosimeter response and second dosimeter response can include determining differences in the responses. In an embodiment, the frequency responses before and after exposure to ionizing radiation are compared; changes to frequency characteristics are functionally correlated to absorbed dose.

In the process for performing dosimetry, performing an inverse radiation-transport simulation (e.g., using Monte Carlo methods) can include modeling of electromagnetic interactions of radiation (e.g. photons, charged particles and neutrons) with the dosimeter for multiple input parameters of ionizing radiation using a radiation transport Monte Carlo software (e.g., Geant4) by inputting the dosimeter physical characteristics into the model and running the model for multiple (e.g., millions) of ionizing radiation particles or photons, producing model results for the absorbed energy in the dosimatrix and temperature increase in the active element.

In the process for performing dosimetry, determining an energy absorbed per unit mass of dosimatrix 220 from changing active element 224 from prime state 230 to dosed state 232 can include combining the results of the inverse radiation-transport with the change in response of dosimeter from prime state to dosed state to convert dosimeter response to the energy absorbed per unit mass can include combining the absorbed energy predicted by the Monte Carlo model with the absorber mass input into the model to determine absorbed energy per unit mass corresponding to various responses of the temperature compensator.

In the process for performing dosimetry, logging a temperature history of photonic dosimeter 200 by receiving, by compensation waveguide 238, primary compensation input light 242 and can include monitoring the frequency response of a compensation resonator that can be located near the dosimatrix.

In the process for performing dosimetry, producing, by compensation waveguide 238, secondary compensation output light 244 which can be transmitted to the compensation resonator 236. In a particular embodiment, light in the waveguide is evanescently coupled to the optical resonator.

In the process for performing dosimetry, receiving, by compensation resonator 236, resonant frequency 240 can be transmitted to the compensation waveguide 238. In a particular embodiment, light in the optical resonator is evanescently coupled to the waveguide.

In the process for performing dosimetry, producing by compensation waveguide 238, primary compensation output light 246 is communicated to light detector 258. In an embodiment, output light is communicated to a detector using a fiber optic cable.

In the process for performing dosimetry, monitoring primary compensation output light 246 as a function of time to log the temperature history of photonic dosimeter 200 can include measuring peak frequency, linewidth, intensity. In an embodiment, this involves locking a laser to the optical resonator, and its frequency can be monitored using a wavemeter.

In the process for performing dosimetry, in changing prime state 230 to dosed state 232, changing a physical property or a chemical property of active element 224 by ionizing radiation 254 can include changes in temperature, strain, density, oxidation and refractive index. In an embodiment, dosing will result in frequency changes in the resonator, and these changes are combined with the response of a dosimatrix to improve the calculation by accounting for temperature-induced frequency changes.

Figure 38:
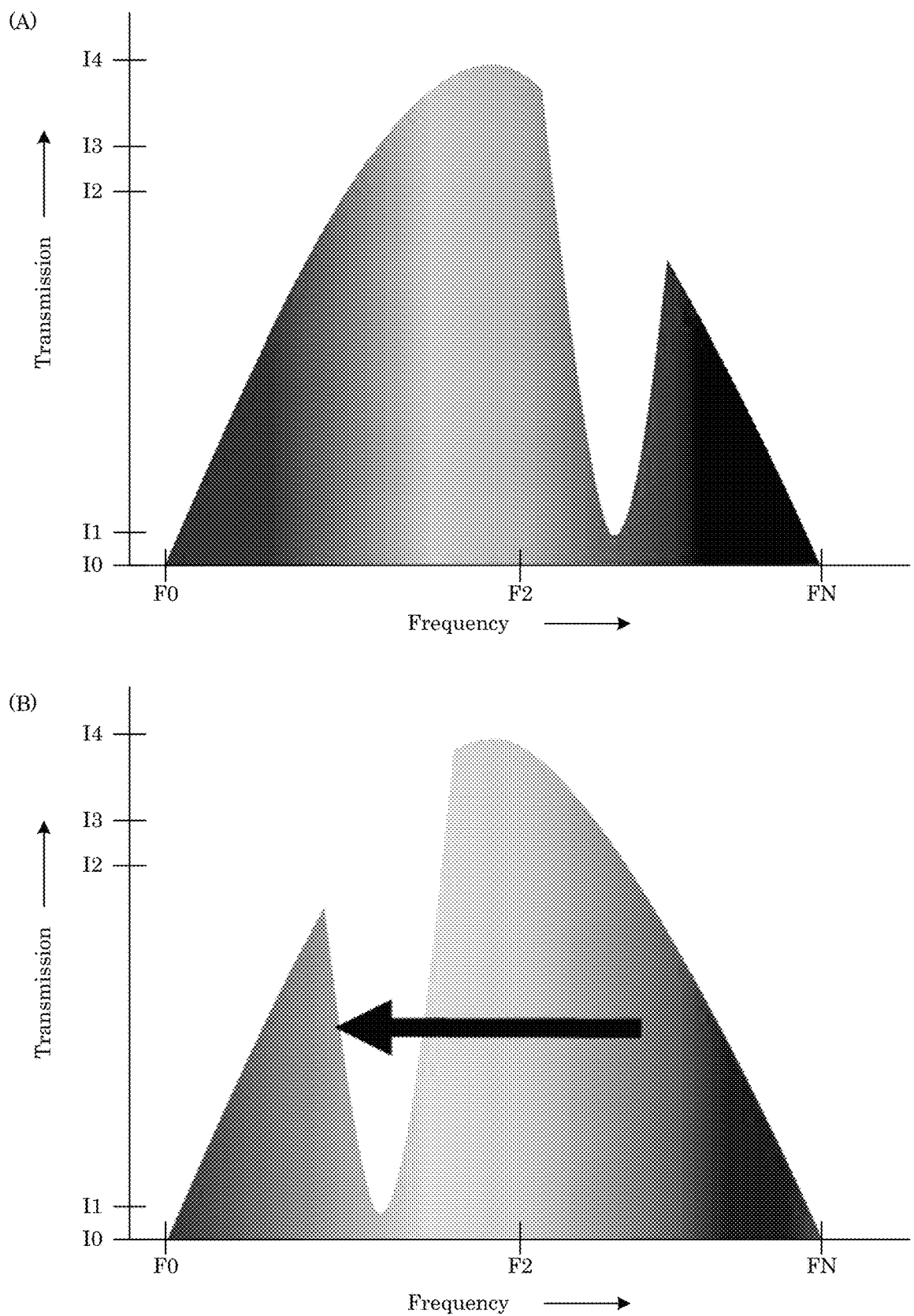
FIG. 38 a graph of transmission versus frequency prior to subjecting a photonic dosimeter to ionizing radiation in panel A and after subjecting the photonic dosimeter to ionizing radiation in panel A.

In an embodiment, photonic calorimeter 300 provides a response to receipt of ionizing radiation 254, wherein radiation absorber 268 produces heat from absorption of ionizing radiation 254 as shown in FIG. 36. Here, photonic calorimeter output signal (e.g., primary compensation output light 246) changes as a function of an amount of ionizing radiation 254 received by radiation absorber 268. Accordingly, photonic calorimeter 300 can be used multiple times, can be used over differing amounts of ionizing radiation 254, can be used over an arbitrary period, or can be subjected to continuous or intermittent presence of ionizing radiation 254. With reference to FIG. 38, panel A shows an optical transmission of compensation resonator 236 versus frequency of resonant frequency 240 at a first temperature of radiation absorber 268. Here, compensation resonator 236 has optical transmission I0 at frequency F0 that increases to optical transmission I4 at frequency F2. At the first temperature, compensation resonator 236 has an optical resonance at first resonant frequency FR1 with intensity I1. Compensation resonator 286 has optical transmission I0 at final frequency FN. When subjected to ionizing radiation 254, radiation absorber 268 absorbs ionizing radiation 254 and converts ionizing radiation 254 to heat. Accordingly, the temperature of radiation absorber 268 increases from the first temperature to a second temperature, wherein the second temperature is greater than the first temperature. With reference to panel B of FIG. 38, at the second temperature, the optical resonance of compensation resonator 286 decreases to second resonance frequency FR2. In this manner, photonic calorimeter 300 optically associates a shift in optical resonance of compensation resonator 236 with heat produced by radiation absorber 268 in response to absorption of ionizing radiation 254 by radiation absorber 268. Moreover, since the optical resonance of compensation resonator 236 changes as a function of temperature, secondary compensation output light 244 and primary compensation output light 246 likewise change as a function of temperature so that detector 258 outputs a signal indicative of an amount of ionizing radiation 254 received by radiation absorber 268, an amount of heat produced by radiation absorber 260, or a temperature of radiation absorber 268.

Photonic calorimeter 300 has numerous advantageous and unexpected benefits and uses, including performing calorimetry. In an embodiment, a process for performing calorimetry with photonic calorimeter 300 includes: receiving, by compensation waveguide 238, primary compensation input light 242; producing, by compensation waveguide 238, secondary compensation light 244 from primary compensation input light 242; receiving, by compensation resonator 236, secondary compensation light 244 from compensation waveguide 238; producing, by compensation resonator 236, resonant frequency 240 output light; receiving, by compensation waveguide 238, resonant frequency 240 output light from compensation resonator 236; producing, by compensation waveguide 238, primary compensation output light 246 from secondary compensation output light 244; subjecting radiation absorber 268 to ionizing radiation 254; producing, by radiation absorber 268, heat from ionizing radiation 254; communicating the heat to compensation resonator 236; and changing the optical resonance of compensation resonator 236 in response to producing heat from ionizing radiation 254 by radiation absorber 268 to perform calorimetry. The process for performing calorimetry further can include determining a first calorimeter response based on primary compensation output light 246 prior to subjecting radiation absorber 268 to ionizing radiation 254. The process for performing calorimetry further can include determining a second calorimeter response based on primary compensation output light 246 after subjecting radiation absorber 268 to ionizing radiation 254. The process for performing calorimetry further can include determining an amount of ionizing radiation 254 absorbed by radiation absorber 268 from the first calorimeter response and the second calorimeter response. It is contemplated that determining the amount of ionizing radiation 254 absorbed by radiation absorber 268 can include performing an inverse Monte Carlo conversion from a temperature change of radiation absorber 268 due to absorption of ionizing radiation 254; and determining an energy absorbed per unit mass of radiation absorber 268 from heating with the inverse Monte Carlo conversion. In the process for performing calorimetry, the first calorimeter response and the second calorimeter response can differ in a resonance frequency, an amount of transmission, or a combination including at least one of the foregoing differences.

In the process for performing calorimetry, receiving, by compensation waveguide 238, primary compensation input light 242 can include physical or evanescent coupling of input light 242 with compensation waveguide 238.

In the process for performing calorimetry, producing, by compensation waveguide 238, secondary compensation light 244 from primary compensation input light 242 can include transmission of light through waveguide 238.

In the process for performing calorimetry, receiving, by compensation resonator 236, secondary compensation light 244 from compensation waveguide 238 can include physical or evanescent coupling of secondary compensation light 244 to compensation resonator 236.

In the process for performing calorimetry, producing, by compensation resonator 236, resonant frequency 240 output light can include transmission of light through compensation resonator 236.

In the process for performing calorimetry, receiving, by compensation waveguide 238, resonant frequency 240 output light from compensation resonator 236 can include physical or evanescent coupling of light to compensation waveguide 238.

In the process for performing calorimetry, producing, by compensation waveguide 238, primary compensation output light 246 from secondary compensation output light 244 can include transmission of light through waveguide 238.

In the process for performing calorimetry, subjecting radiation absorber 268 to ionizing radiation 254 can produce secondary radiation, which can include photons and electrons, that transfer energy to the radiation absorber 268 in the form of heat can include placing radiation absorber 268 in the path of a radiation beam.

In the process for performing calorimetry, producing, by radiation absorber 268, heat from ionizing radiation 254 can be communicated from the radiation absorber 268 to the compensation resonator 236 by processes including thermal thermalization of electrons and thermal conduction to compensation resonator 236.

In the process for performing calorimetry, communicating the heat to compensation resonator 236 can change its optical resonance by processes including thermal variation of index of refraction of the compensator resonator 236.

In the process for performing calorimetry, changing the optical resonance of compensation resonator 236 in response to producing heat from ionizing radiation 254 by radiation absorber 268 can indicate a temperature change in the temperature compensator 234 by processes including the thermal variation of index of refraction of the temperature compensator 234.

In the process for performing calorimetry, determining a first calorimeter response based on primary compensation output light 246 prior to subjecting radiation absorber 268 to ionizing radiation 254 can indicate temperature of the temperature compensator 234 for the prime state by methods including determining the calorimeter response without ionizing radiation 254 incident.

In the process for performing calorimetry, determining a second calorimeter response based on primary compensation output light 246 after subjecting radiation absorber 268 to ionizing radiation 254 can indicate temperature of the temperature compensator 234 for the dosed state by methods including determining the calorimeter response after ionizing radiation 254 has been incident on radiation absorber 268 for a finite amount of time.

In the process for performing calorimetry, determining an amount of ionizing radiation 254 absorbed by radiation absorber 268 from the first calorimeter response and the second calorimeter response can include determining differences in the responses by subtracting the second calorimeter response from the first calorimeter response.

In the process for performing calorimetry, in determining the amount of ionizing radiation 254 absorbed by radiation absorber 268, performing an inverse Monte Carlo conversion from a temperature change of radiation absorber 268 due to absorption of ionizing radiation 254 can include modeling of electromagnetic interactions of radiation (e.g. photons, charged particles and neutrons) with the calorimeter 300 for multiple likely input parameters of ionizing radiation 254 using a radiation transport Monte Carlo software by inputting the photonic calorimeter 300 physical characteristics into the model and running the model for multiple (e.g. millions) of ionizing radiation 254 particles or photons, producing model results for the absorbed energy in the radiation absorber 268 and temperature increase in the compensation resonator 236.

In the process for performing calorimetry, determining an energy absorbed per unit mass of radiation absorber 268 from heating with the inverse Monte Carlo conversion can combining the results of the inverse radiation-transport with the change in response of temperature compensator from prime state to dosed state to convert temperature compensator response to the energy absorbed per unit mass can include combining the absorbed energy predicted by the Monte Carlo model with the absorber mass input into the model to determine absorbed energy per unit mass corresponding to various responses of the temperature compensator.

In the process for performing calorimetry, with regard to the first calorimeter response and the second calorimeter response, differing in a resonance frequency can include change in resonance frequency due to heating of the temperature compensator 234. It is contemplated that differing in an amount of transmission can include differing in the transmission of the temperature compensator 234.

The process for performing calorimetry further can include calibration of the temperature compensator 234 by comparing its response to temperature to the response of a calibrated temperature compensator or thermometer.

Photonic dosimeter 200, photonic calorimeter 300 and processes disclosed herein have numerous beneficial uses, including imaging of dose for industrial and medical applications. Advantageously, photonic dosimeter 200 or photonic calorimeter 300 can measure absorbed dose over a wide range of spatial scales down to 100 nm, radiation types (photons, particles), intensities and energy scales. Further, individual or groups of devices can be embedded in photonic and electronic devices, construction materials, soft materials (such as polymerics), composite materials, additively manufactured materials.

Moreover, photonic dosimeter 200 and processes herein have numerous advantageous properties. In an aspect, photonic dosimeter 200 provides real-time data acquisition with ca. microsecond time resolution.

Photonic dosimeter 200 unexpectedly overcomes problems with conventional technologies and testing, wherein the size of the conventional dosimeter is too large to resolve dose from low-energy radiation sources. Photonic dosimeter 200 overcomes this limitation by providing sub-millimeter-resolution dosimetry, with the option of embedding networks of photonic dosimeters.

Moreover, photonic calorimeter 300, and processes herein have numerous advantageous properties. In an aspect, photonic calorimeter 300 provides real-time data acquisition with ca. microsecond time resolution.

Photonic calorimeter 300 unexpectedly overcomes problems with conventional technologies and testing, wherein the size of the conventional dosimeter is too large to resolve dose from low-energy radiation sources. Photonic calorimeter 300 overcomes this limitation by providing sub-millimeter-resolution dosimetry, with the option of embedding networks of photonic calorimeters.

The articles and processes herein are illustrated further by the following Examples, which are non-limiting.

EXAMPLES

Example 1

Radiation Hardness of Fiber Bragg Grating Thermometers

Photonic sensing is tolerant to harsh environments where conventional sensing technologies fail. With regard to tolerance to radiation, the impact of gamma-ray exposure on the temperature response of fiber Bragg gratings is described. At 25° C., exposures leading to an accumulated dose of up to 600 kGy result in complex dose-dependent drift in Bragg wavelength, increasing uncertainty in temperature measurements obtained if appreciable dose is delivered over the measurement interval. Temperature sensitivity is not severely impacted by integrated dose, wherein devices measure relative changes in temperature.

Photonic sensing involves exploiting sensitivity of the device to changes in the refractive index of the host material. For example, in a fiber Bragg grating (FBG), the resonant condition is directly proportional to the refractive index of the waveguide. A small change in the refractive index e.g., due to a rise in temperature, leads to a significant change in resonance wavelength which has been exploited for photonic thermometry. Radiation induced damage causes local point defects, dislocations, and formation of color centers that contribute to local changes in refractive index that might degrade measurement sensitivity and accuracy of a sensor.

In radiation environments, with dose rates ranging from a few Gy/h to a few kGy/h, devices function over years of exposure to radiation and aggregate dose accumulations exceeding 1 MGy. Optical fibers show increased attenuation with accumulated dose, and drifts in Bragg resonances occur, wherein resonance wavelength redshifts with increasing dose rate for accumulated doses below about 25 kGy. A blue shift of magnitude (<0.1 nm) might occur at aggregate doses approaching 0.5 MGy. Many industrial irradiation processes deliver doses ranging from 10 Gy to 1 MGy, and dose-related shifts in Bragg wavelength contribute ≈10 K systematic uncertainty to in situ temperature measurements. Devices herein correlate the shift with dose and dose rate over irradiation conditions.

FBG thermometers were exposed to gamma (γ)-rays, and the thermometers were systematically exposed for FBG thermometers that included Ge-doped silica fibers with two cladding materials—polyimide and ORMOCER (Organic Modified Ceramics)-to varying levels of radiation, leading up to 600 kGy of absorbed dose. A dose-dependent change occurred in the Bragg resonance, wherein a magnitude and direction of wavelength shift vary over the dose range. The experimental measurement apparatus includes the FBG sensors that were probed with a C-band laser that was swept over the sensor resonance. Ten percent of the laser power was immediately picked up from the laser output for wavelength monitoring (absolute accuracy=0.16 pm) while the rest, after passing through an optical circulator, was injected in the FBG. Six FBG devices (three with polyimide cladding, labelled FBG 1-3, and three with ORMOCER cladding, labelled FBG 4-6) were exposed to multiple dose fractions of γ-radiation to achieve dose levels ranging from 0.1 Gy to 600 kGy (1 Gy=100 rad) in the NIST high dose irradiation facility. The absorbed dose to $SiO_2$ in the FBG core was calculated from dose-to-water standards by Monte Carlo simulation of the FBG irradiation geometry.

Figure 39:
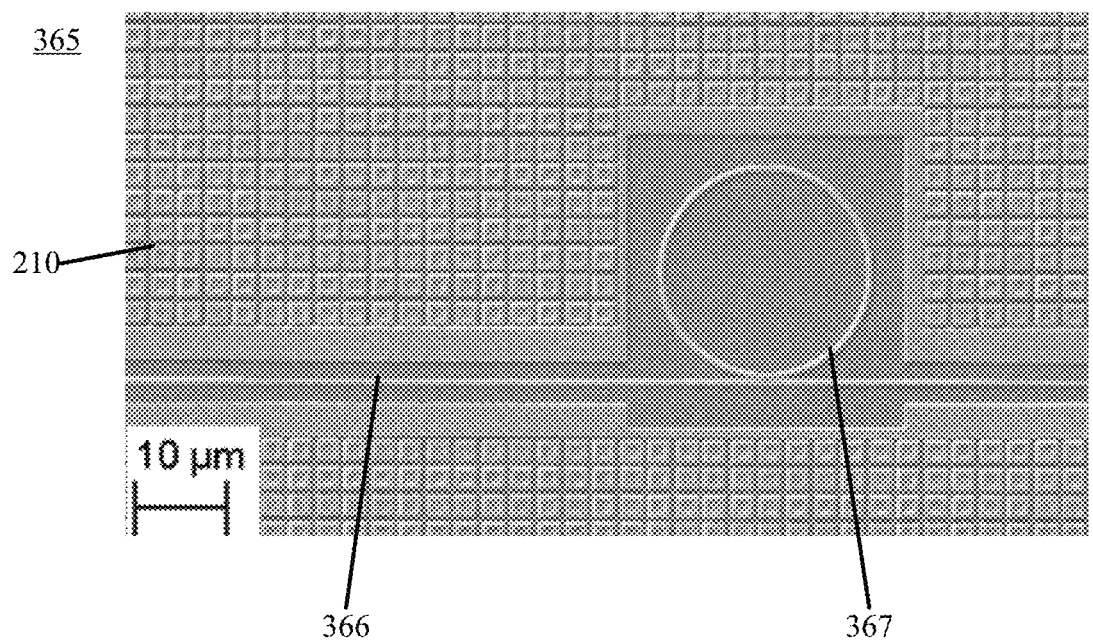
FIG. 39 shows a micrograph of a thermometer.

The impact of dose on resonance peak position is shown in FIG. 39 for FBGs 1 through 6, in which wavelength shift vs. absorbed dose is determined relative to the peak position obtained at an absorbed dose of 0.1 kGy. Our results indicate a distinct difference in response of the two groups of FBGs within the initial 0.1 kGy of absorbed dose, with the ORMOCER-coated devices (FBGs 4-6) showing a dramatic redshift of ≈0.75(15) nm, whereas the polyimide-coated fibers (FGBs 1 through 3) exhibit small shifts that are comparable in magnitude to experimental uncertainties (1 standard deviation) as determined by reproducibility of measurements (for which representative error bars are provided on a few of the data points). For absorbed doses above 0.1 kGy, clear differences in response of the two groups of fibers are no longer discernible—all six fibers exhibited a weak tendency to blueshift with absorbed doses between 0.1 kGy and 1 kGy, while all but one showed a tendency to redshift as the accumulated dose grows to 300 kGy. The total shift in peak center for the two fibers that received 300 kGy dose, 135 pm and 165 pm, is the equivalent of ≈13.5° C. and ≈16.5° C. spurious increase in temperature, respectively (i.e. as would be registered by each device in normal thermometric monitoring). However, when FBG 3 was exposed to another 300 kGy dose, for a total integrated dose of 600 kGy, the peak center blue-shifted by 119 pm. The origins of this non-linear dose dependence of the peak center are not presently understood.

Figure 43:
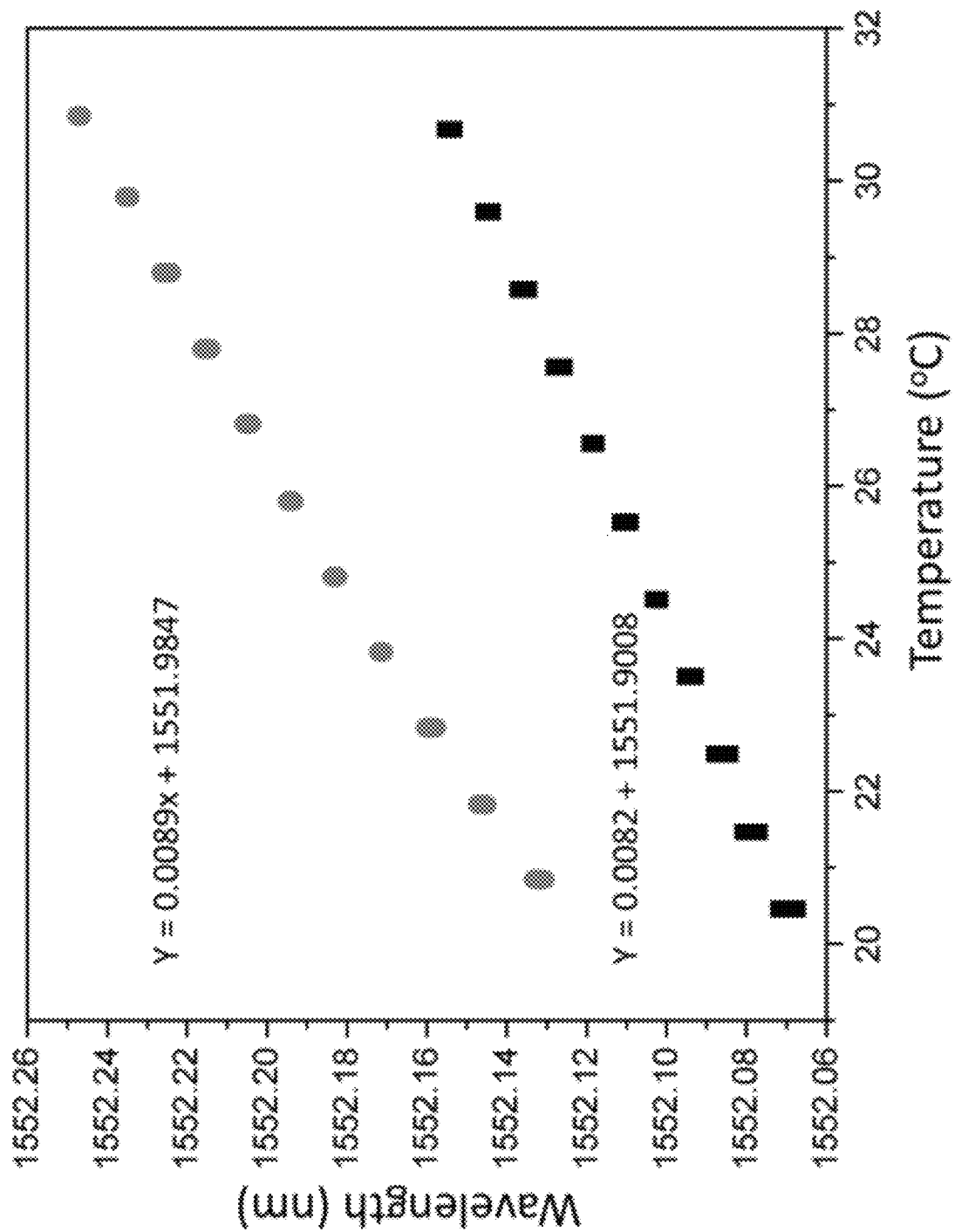
FIG. 43 shows a graph of wavelength versus temperature.

We also investigated the effect of radiation dose on temperature sensitivity of three other FBGs by measuring temperature dependence of the resonance wavelength before and after delivering a single dose fraction of 250 kGy. As shown in FIG. 43, temperature scans acquired after radiation exposure exhibit a net redshift of ≈120 pm, comparable to what is shown for FBGs 1, 3 and 6 in FIG. 1 (i.e., all FBGs in the initial batch of six which had received as much dose), but the temperature sensitivity (slope of plots in FIG. 2) of the FBG is not as significantly impacted by radiation dose. Hence, in view of accumulated dose, such devices provide for relative temperature measurements such as tracking temperature rise while a reactor is operating.

Example 2

Assessing Radiation Hardness of Silicon Photonic Sensors

Silicon photonic platforms provide optical communication. It is contemplated that such devices can be deployed in photonics-based communication and science instruments in harsh environments such as outer space, where radiation damage can occur. The impact of cobalt-60 γ-ray radiation up to 1 megagray (MGy) absorbed dose on silicon photonic devices is described, wherein systematic impact of radiation on passivated devices is absent such that passivated silicon devices were durable under harsh conditions.

Silicon photonic sensors are sensitive to external stimuli that produce changes in refractive index of a host material. In photonic devices, small changes in temperature can produce measurable changes in resonance peak wavelength for photonic thermometry and similar applications. This sensitivity to refractive index is geometrically increased in resonant devices such as a ring resonator or photonic crystal cavity, where refractive index sensitivity grows with quality factor. Radiation induced damage produces dislocations and other defects in crystalline structure that affect refractive index.

In silicon-on-insulator (SOI) based electronic devices, trapped charges and local changes in bond structure are a cause of device failure. Here, changes in the refractive index due to changes in free carrier population and damage to the Si lattice can significantly degrade the measurement sensitivity and accuracy of a photonic sensor. Unpassivated Si ring resonator devices exposed to relatively low levels of ionizing radiation (<9 kGy) show a blue shift in resonance wavelength that was not observed for passivated devices exposed to ≈1.5 kGy of ionizing radiation. A photonic sensor operating in a high radioactivity environment such as a nuclear power plant is expected to receive about 1 MGy of dose per year. Under such conditions, sensor performance can be negatively impacted by changes in refractive index, covalent bond breaking, radiation induced densification, or changes in surface chemistry that can result in increased propagation losses, resulting in lower quality factors and drift in resonance wavelength of resonant devices.

Impact of γ-radiation up to a cumulative dose of 1 MGy (1 Gy=100 Rad) from $^{60}$Co γ-ray radiation on silicon ring resonators and Bragg waveguides across multiple devices and chips was studied. Dose absorbed by such chips was modelled using a radiation transport Monte Carlo simulation based on engineering drawings of the source and previous measurements of the radiation field. Silicon photonic devices withstood high cumulative doses without degradation in performance.

Figure 44:
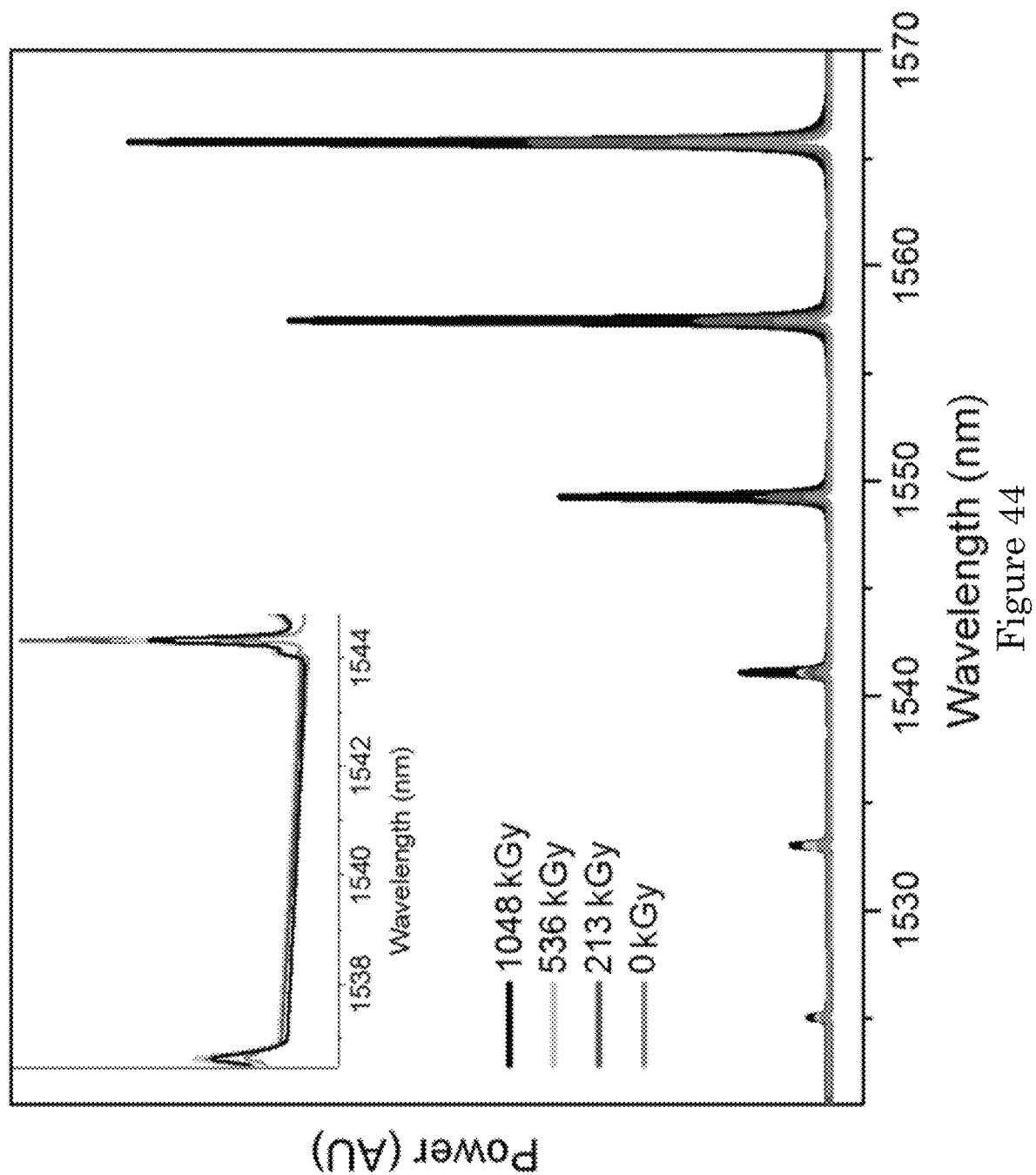
FIG. 44 shows a graph of power versus wavelength.

Bragg waveguides and ring resonators were exposed to levels of γ-ray radiation and did not show changes in spectral characteristics. A typical Bragg waveguide transmission spectrum, shown in FIG. 44, does not show any systematic changes in either the peak center or the bandwidth of the Bragg waveguide rejection window. Here, the Si ring resonator and Bragg waveguide (insert) showed no significant changes in spectral characteristics as absorbed dose is increased from 0 Gy to 1048 kGy. The variation in peak center observed between the different dose spectra is found to be 8 pm and was not correlated with dose ($R^2$=0.28). Similarly, variation in linewidth (2.6 pm) was poorly correlated with dose ($R^2$=0.54) and was within the measurement uncertainty of ±7 pm. The linewidth in a Bragg device was directly proportional to the refractive index contrast between the waveguide and etched step regions (where the evanescent field interacts with the surrounding oxide material, sampling an effectively lower refractive index than the unetched waveguide region). A lack of change in Bragg linewidth indicated the oxide layer immediately next to the Si does not suffer any significant changes such as bond breaking or densification of the oxide layer due to radiation exposure. Similarly, a lack of significant change in peak isolation indicated the devices did not have damage to the Si surface or lattice.

Figure 45:
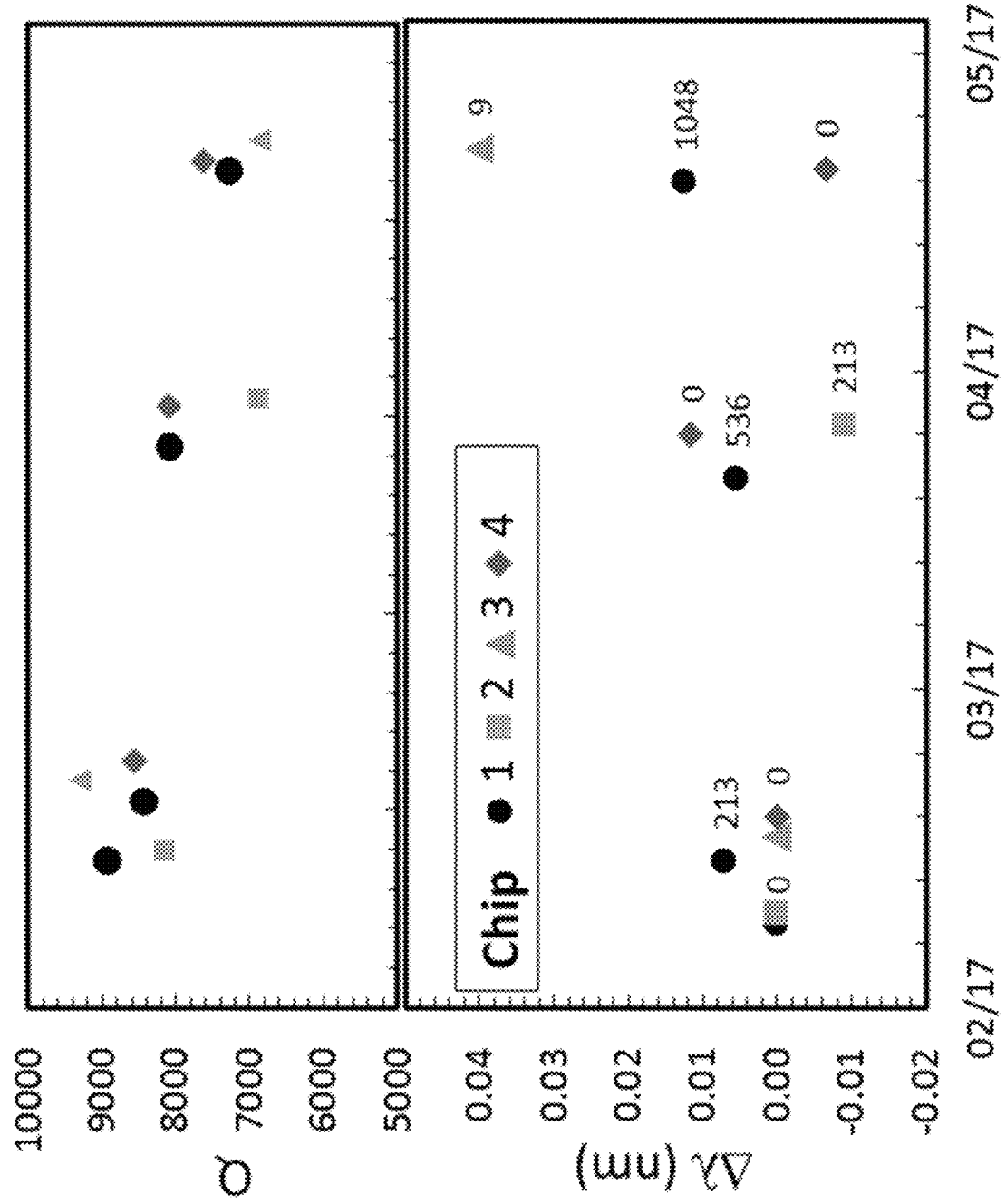
FIG. 45 shows a graph of Q and change in wavelength versus date.
Figure 46:
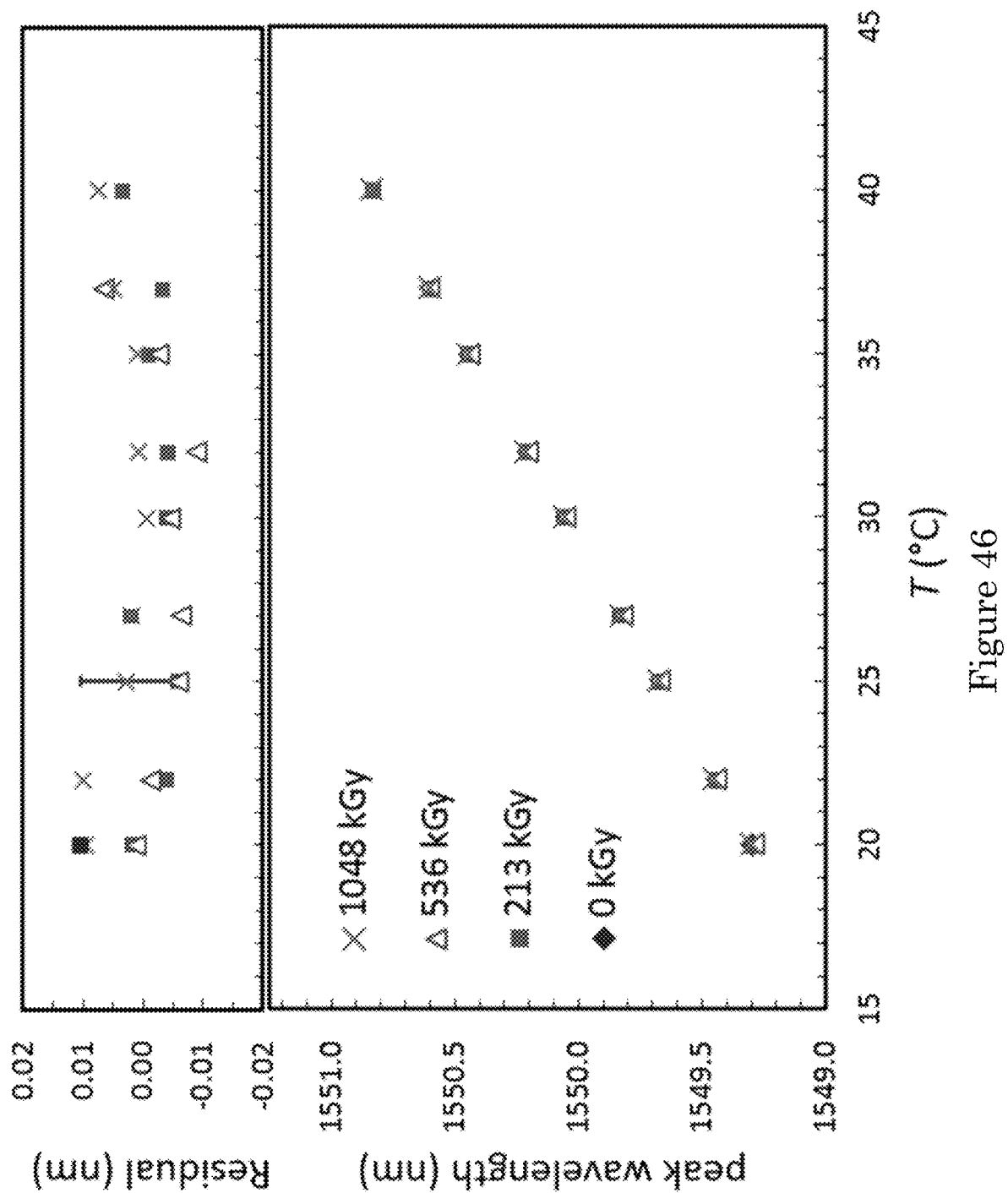
FIG. 46 shows a graph of residual and peak wavelength versus temperature.

In ring resonators, where spectral consequences of small changes in device characteristics, such as refractive index, can increase due to recirculation of light in the ring structure, significant dependence on absorbed dose was not observed. We examined impact of radiation in several ring resonator devices with quality factors (Q-factors) ranging from 5,000 to 30,000 at room temperature. As shown in FIG. 45 and FIG. 46, ring resonator devices did not show dose-dependent change in the free spectral range (FSR), Q-factor, and peak position. The FSR was uncorrelated with dose ($R^2$=0.08), with a standard deviation for the 4 doses of 2.5 pm (0.031%).

FIG. 45 shows Q-value (top) and peak position (bottom) of a ring resonance across three different irradiated chips (plus control chip #4) was not significantly impacted by radiation dose, wherein a number next to the symbols refer to dose (kGy) delivered on that particular date. The Q-factor decreased over time, but the decrease was the same for the control chip as for the irradiated chips and thus cannot be unambiguously ascribed to dose (see top of FIG. 45). The observed decrease of 12% in Q-factor was correlated with peak input power and was reproduced when input power was doubled and indicated the observed effect was due to the device undergoing self-heating during the laser scan, not radiation damage. The small variation in absolute peak position observed for Chips 1-3 between irradiations (average standard deviation of [13±13] pm) was statistically indistinguishable to changes observed in the control chip. This small variability was found to be random, with the most stringent test coming from the peak position at 20° C. (measured at 0 Gy dose), which was found to be uncorrelated to dose, with $R^2$=0.01. The four chips were made in the same batch and contained the same devices. The control chip traveled with other chips to and from the photonics lab to the radiation facility but was never exposed to radiation itself.

FSR of the devices did not show any significant changes and indicated that neither the group index nor the dispersion (parameters important in communication systems) was affected by radiation exposure. Examination of the temperature-dependent response of ring resonator devices showed temperature sensitivity was not impacted by radiation dose. FIG. 46 shows temperature response of silicon ring resonator, wherein a top plot shows residuals from a common fit to all the data, and propagated uncertainty due to temperature measurement is shown for one point. For the data shown in FIG. 46, the average and standard deviation of the three responses was (76.9±0.2) pm/° C. A linear regression of response as a function of dose returned a slope of $$(-4 \pm 2) \cdot 10^{-4} \frac{pm}{°C. \cdot Gy},$$

which was not significant at the 95% level (t=−1.8, p=0.32). The slight offset variability observed between doses (residuals shown in FIG. 46 insert) was within the limited precision of the thin film resistance thermometer (±0.1° C.) when employed using nominal coefficients.

Regarding, impact of ionizing radiation on silicon photonics devices, devices were irradiated within a self-contained, commercially produced $^{60}$Co irradiator, and delivered doses were estimated using Monte Carlo analysis. Measurement of device characteristics such as peak center, peak width, FSR and temperature sensitivity did not show dose-dependent changes and indicated that the characteristic group index, dispersion and thermo-optic coefficient remained constant for aggregate doses up to 1 MGy (the maximum absorbed dose delivered in this study). These results contrasted with those of FBG-based sensors, where radiation induced changes in Bragg resonance result in significant drift in device characteristics. Accordingly, silicon photonics can be used to develop communication and sensor platforms for operating in harsh environments, such as industrial sterilization of health care products or radiation processing systems where doses can be in the range 15 kGy to 300 kGy, or nuclear power plants where dose rates of 10 kGy/h occur. Precision photonic sensors can be used in instrumentation used in radiotherapy clinics or space-based systems, where much lower aggregate doses (<100 Gy) are more commonplace but high reliability and accuracy are involved.

A C-band laser was swept over the sensor resonance. Ten percent of laser power was immediately picked up from the laser output for wavelength monitoring while the rest was evanescently coupled to the photonic device under test using an optical fiber held within a few microns of the chip surface. The photonic chip was mounted on a Peltier assembly atop a 3-axis stage. Input from a platinum resistance thermometer (measurement accuracy ±0.1° C.) was communicated to a proportional-integral-derivative controller that controlled a thermoelectric cooler and maintained the temperature to within 0.02° C. of the set value. Photonic chips were fabricated using complementary metal-oxide-semiconductor (CMOS) technology. Three of the representative chips from the batch were systematically exposed to varying levels of γ-ray radiation at the NIST high-dose dosimetry laboratory, while a fourth chip, used as a control, was never exposed to radiation, though it traveled with the other three chips between the photonics testing facility and the radiation facility.

Photonic sensors were irradiated with γ-rays in the NIST high-dose dosimetry laboratory. Three $^{60}$Co irradiators were used with dose rates between 0.2 kGy/h and 3.9 kGy/h. Most of the irradiations were done using irradiator number GC207, which contained a nominal activity of $1.76*10^{14}$ Bq on a reference date and delivered an absorbed dose rate to water, determined using alanine dosimetry, of R=1.08 Gy/s on the reference date, with an expanded uncertainty of about 2%. This amounts to a dose rate per $^{60}$Co activity of D=$6.12*10^{-15}$ Gy/s/Bq.

Monte Carlo simulations were performed and calculated dose to the silicon devices based on measured dose to alanine calibration pellets. A geometry for the GC 220 was created based on the irradiator specification sheet. The 1 cm diameter $^{60}$Co rods were simulated as a single cylindrical shell. Aluminum and steel shells of 2 mm thickness were implemented between sources and exposure chamber. The $^{60}$Co emission spectrum included two 1.25 MeV γ-rays.

Figure 47:
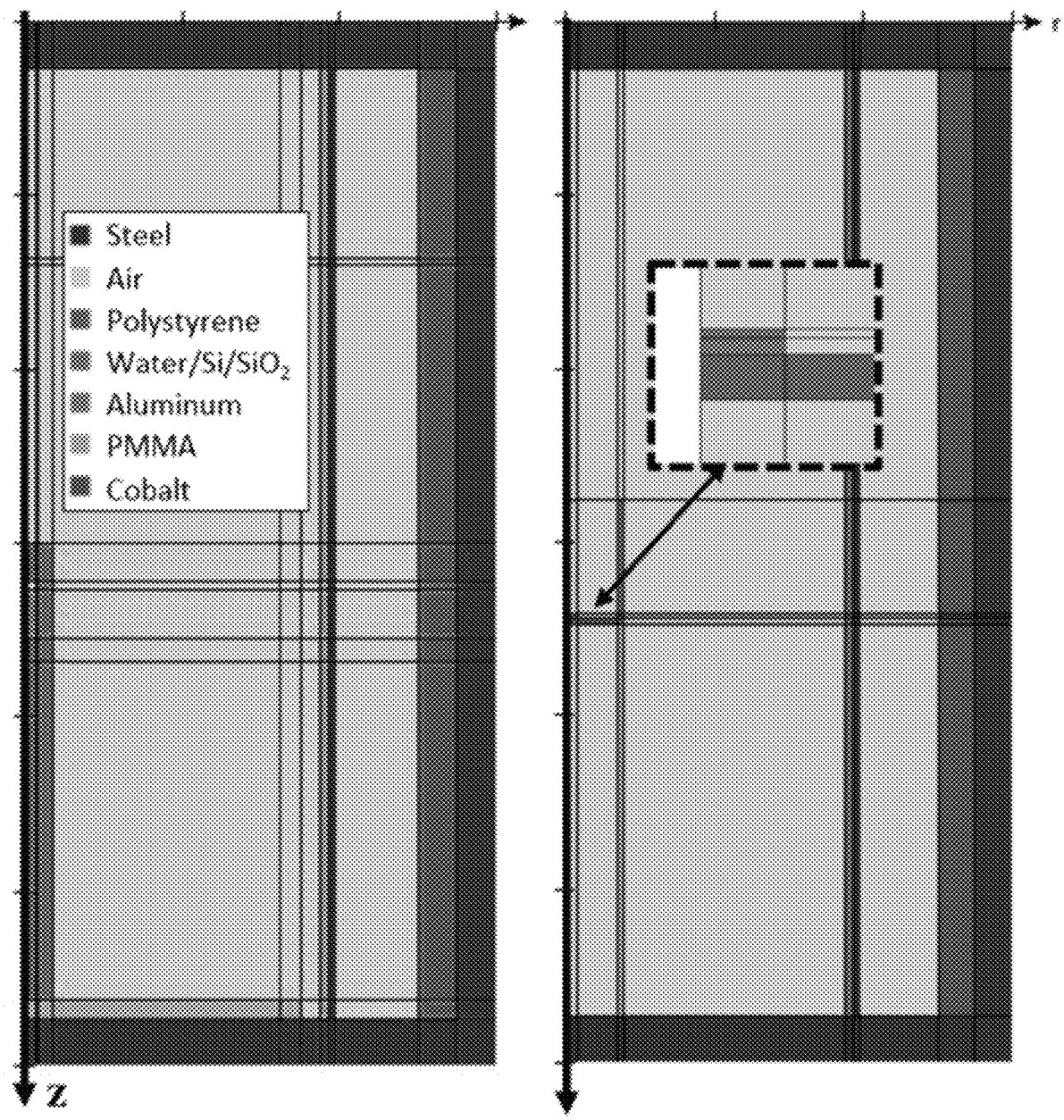
FIG. 47 shows cross-sections of pedestal and chip.

Two irradiation geometries were simulated—the chamber calibration and chip irradiation, shown in FIG. 47, a cross-sectional side-view of the simulated geometry for the calibration pedestal (left) and chip in beaker geometry (right). The radiation absorber material in the model was varied among water, silicon, and silica. The calibration geometry used to transfer calibration from the primary standard of absorbed dose to water included 5-mm diameter alanine pellets stacked inside a polystyrene cylinder (pedestal) of wall thickness 3.7 mm. For the chip irradiation, one chip at a time was placed inside a glass beaker of diameter and wall thickness of 30.5 mm and 1.3 mm, respectively. Although the chip device layer was only a few μm thick, the simulated dose to the chip was averaged over the top 100 μm of the chip, to achieve adequate Monte Carlo statistics.

For the calibration geometry, the simulated result was D=$6.23 \cdot 10^{-15}$ Gy/s/Bq, which is 2% higher than the nominal calibrated value. For the chip geometry, the result was D=$5.42 \cdot 10^{-15}$ Gy/s/Bq. The ratio of the calculated dose for the chip geometry to the calibration geometry was 0.870, with a total Monte Carlo uncertainty of about 3%.

Scaling the calibrated value for R by the ratio of the calculated D values for the chip geometry to the calibration geometry resulted in a dose rate to the chip of 0.94 Gy/s with an expanded uncertainty of 7% (k=2).

Figure 48:
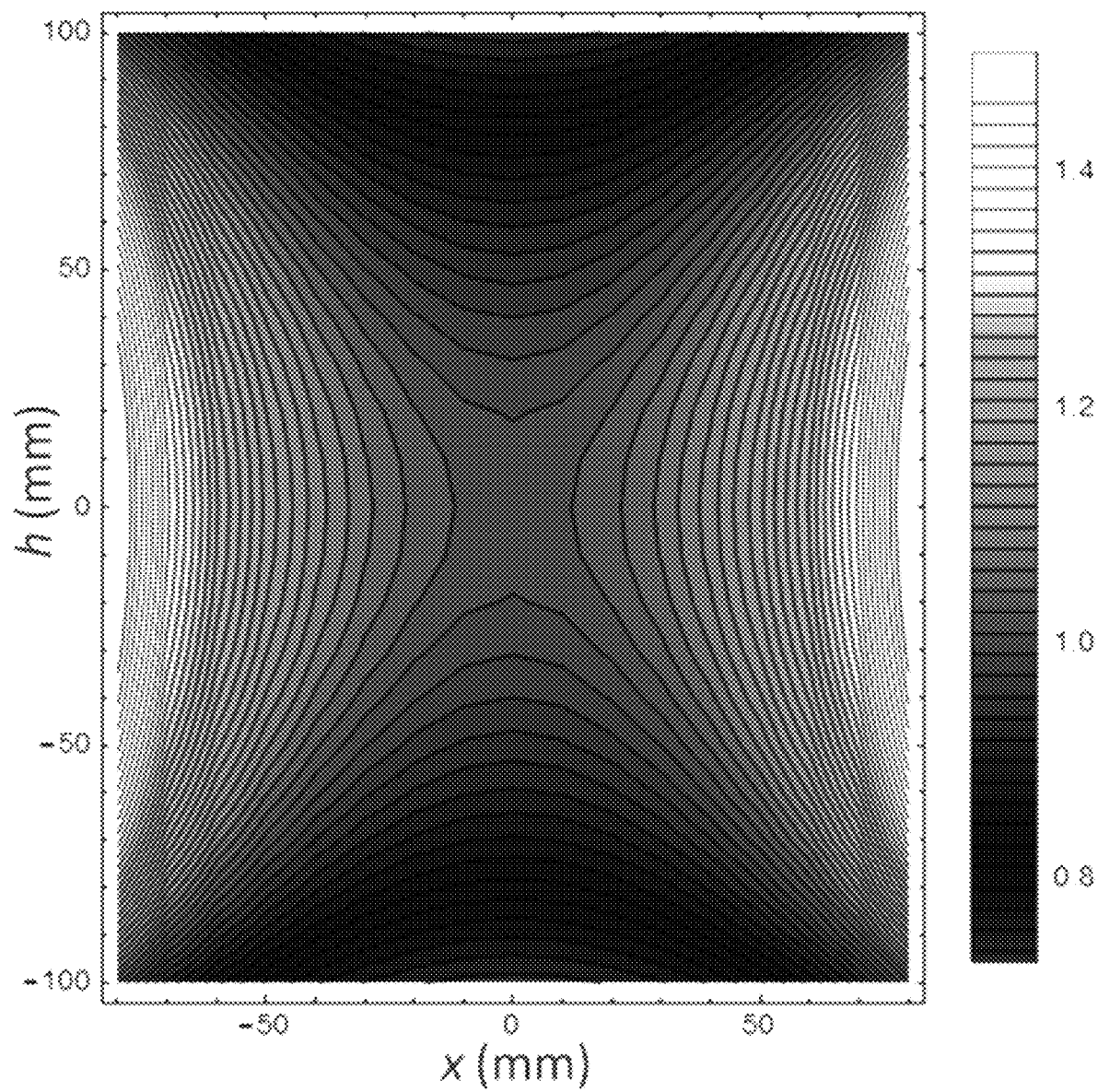
FIG. 48 shows a graph of positions for a gamma-ray field.

An approximate gamma-ray field map was calculated by numerically solving an integral representing the γ-ray flux, F, inside a chamber consisting of a thin, radiating, cylindrical shell, $$F(x, h) = \int_{-(\frac{L}{2}+h)}^{L/2-h} \int_{0}^{2\pi} \frac{r}{(r\cos(\theta) - x)^2 + (r\sin(\theta))^2 + z^2} d\theta dz \quad (1)$$

wherein L=210 mm is the shell length, r=105 mm is the shell radius, and (x, h) is the test position within the chamber. No interactions were considered. The field map, relative to the value in the center of the chamber, is shown in FIG. 48 that shows normalized, simulated gamma-ray field, F (x, h)/F (0,0) for cylindrical shell source. Contours represent a change in field of about 2% of the central value. Along the vertical axis of the chamber (x=0), the field changes by −1% at z=±18 mm. Along the midplane of the chamber (h=0), the field changed by +1% at x=±14 mm. The 5 mm positioning accuracy of the chip did not affect absorbed dose beyond the Monte Carlo and calibration accuracy.

Regarding transient charged particle equilibrium (TCPE), a Monte Carlo model was constructed for a version of the chip geometry. A 1.25 MeV γ-ray source was incident from the side of the chip, aligned with the center of the top layer, which was 200 μm thick and was thicker than the actual device layer, but not thick enough to achieve TCPE. Only about 1 out of 50 γ-rays interact with the chip. Of those that do, about 80% produced Compton-scattered electrons that escaped into the air from the top layer. Since there was not an equal energy flux of electrons produced in the air that pass into the top Si layer, TCPE was not achieved. Therefore, the absorbed dose to the chip was not calculated based on the relative linear-energy transfer and density of silicon relative to water. Rather, full Monte Carlo simulations were performed.

Example 1

Thermometer

A thermometer was fabricated using CMOS techniques on a silicon on insulator (SOI) wafer with a 220 nm thick layer of silicon on top of a 2 μm thick buried oxide layer that isolates an optical mode and prevents loss to the substrate. The fabrication of silicon devices was performed through microfabrication and nanofabrication. Masks were made using ultraviolet light at 193 nm for photolithography and were etched to from a waveguide and Bragg coupler. The Bragg coupler provided free space coupling of light in or out of the thermometer at, e.g., 4 dB per Bragg coupler. The thermometer was subjected to thermal oxidation to form a 10 nm thick $SiO_2$ layer thereon to reduce a surface roughness.

FIG. 39 shows a micrograph of the thermometer 365 that included ring resonator 367 and waveguide 366. The micrograph was acquired by a scanning electron microscope. Ring resonator 367 had 10 μm radius and was separated from waveguide 366 by 130 nm. The thermometer had a free spectral range of 9.2 nm at 1550 nm, Q-factor of 52000, and estimated group index of 4.2.

Example 2

Temperature Response of Thermometer

The thermometer from Example 1 was subjected to thermal response testing. A tunable laser provided input light to the ring resonator. A portion of the input light was picked up from the laser output for wavelength monitoring while the balance of the input light, after passing through the thermometer, was detected by a power meter. The thermometer was mounted on a two-axis stage in a two-stage temperature-controlled enclosure. Input from a platinum resistance thermometer from each stage was fed to an input channel of a proportional-integral-derivative controller that drove a thermoelectric cooler. The first stage minimizes global temperature fluctuations inside the enclosure to ±1 K, and the second stage minimized temperature variations at the thermometer to less than 17 mK over 24 hours. A relative humidity (% RH) inside the enclosure was monitored by a humidity meter. Relative humidity levels were changed inside the enclosure by varying a flow rate of air saturated with water.

The wavelength of the input light from the laser was scanned, and the transmission spectrum was recorded. A center frequency of the transmission spectrum was determined. From a calibration curve, the center frequency was converted to temperature. Thereafter, the temperature of the thermometer was changed from 288 K and 306 K.

As shown in FIG. 40B, the thermometer had a resonant frequency that changed with temperature at 77 pm/K, and the thermometer resolved a temperature difference of 1 mK. FIG. 22 shows a graph of resonance wavelength versus temperature for the thermometer.

A second thermometer having a ring resonator with a radius of 11 μm was prepared per Example 1 and subjected to testing. For the second thermometer, a graph of transmission versus wavelength is shown in FIG. 40B with a graph of resonance wavelength versus temperature being shown in FIG. 40B.

Example 3

Figure 41:
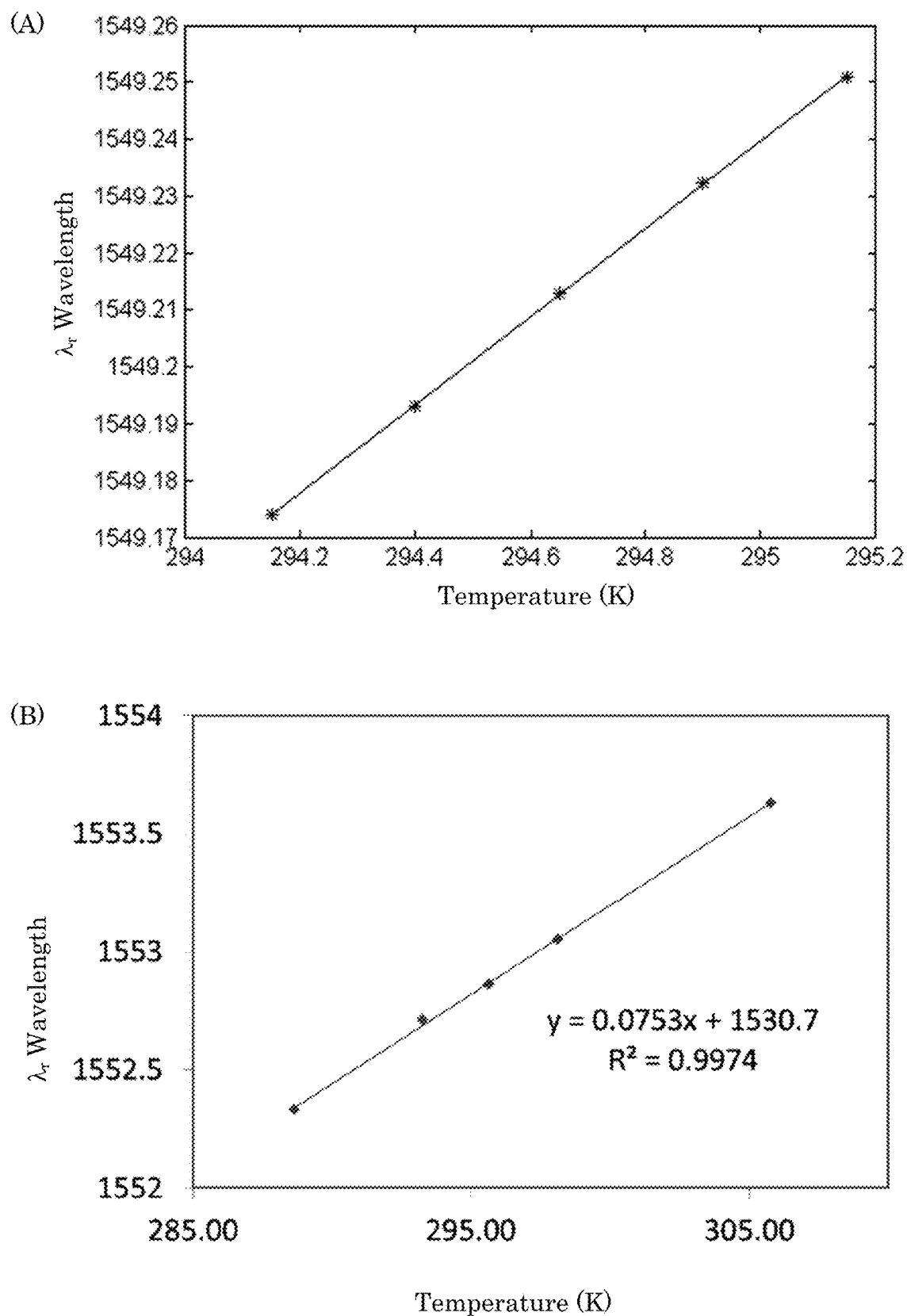
FIG. 41 shows a graph of wavelength versus temperature in panel A and a graph of wavelength versus temperature in panel B.
Figure 42:
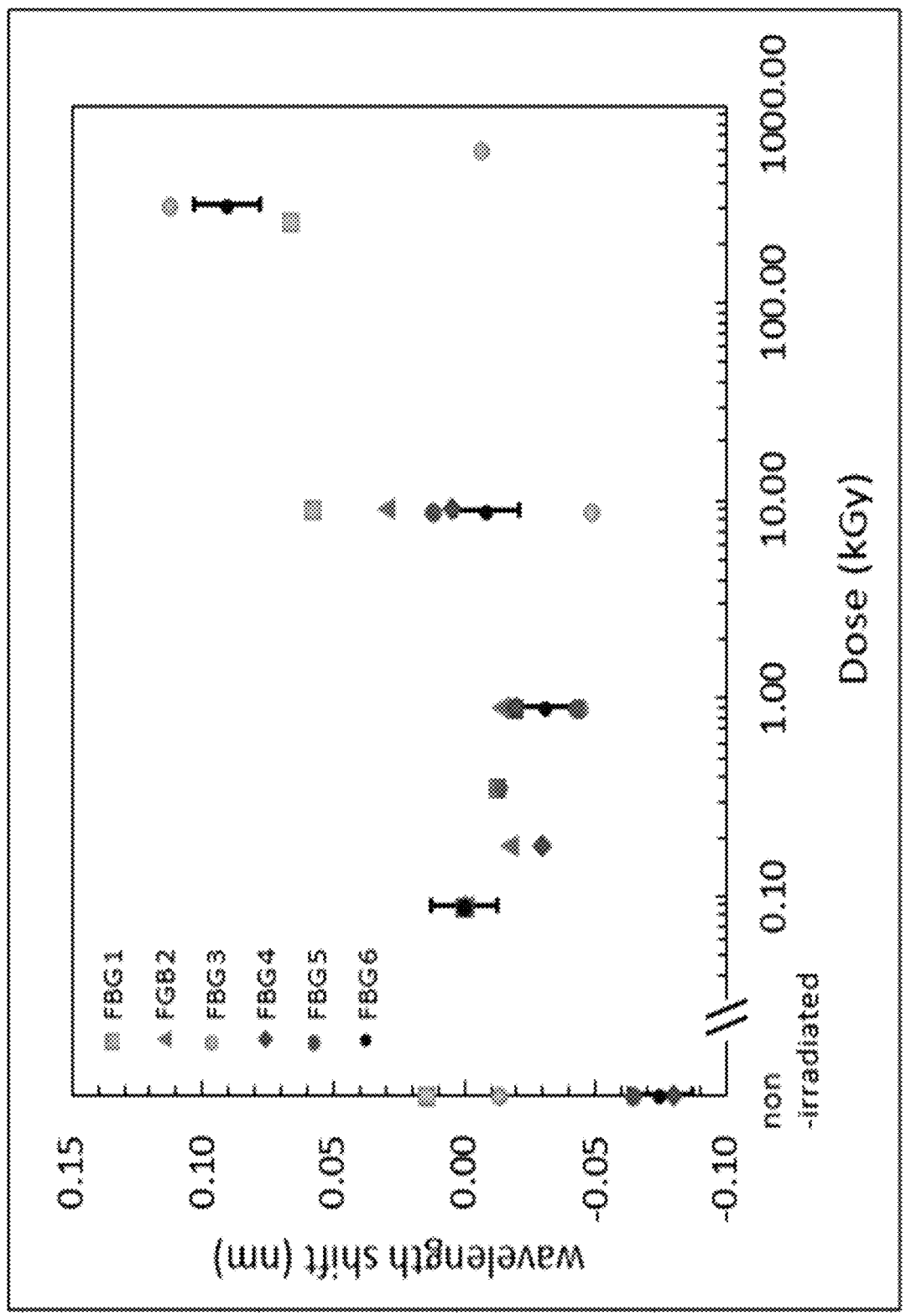
FIG. 42 shows a graph of wavelength versus dose.

FIG. 41A shows a graph of the resonance wavelength vs. temperature calibration curve for a fiber Bragg grating.

Example 4

FIG. 41B shows a graph of the resonance wavelength vs. temperature calibration curve for a fiber Bragg grating.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A photonic calorimeter for converting ionizing radiation dose to heat, the photonic calorimeter comprising:
   a radiation absorber comprising an outer surface and an interior material disposed in the interior material and bounded by the outer surface such that the radiation absorber:
      receives ionizing radiation; and
      converts the ionizing radiation into heat;
   a temperature compensator disposed within the radiation absorber and comprising:
      a compensation waveguide disposed in optical communication with a compensation resonator and that:
         receives primary compensation input light;
         communicates a resonant frequency based on the primary compensation input light to the compensation resonator;
         receives secondary compensation output light from the compensation resonator; and
         transmits primary compensation output light that is based on the secondary compensation output light; and
      a compensation resonator disposed in optical communication with the compensation waveguide and that:
         comprises an optical resonance;
         receives, from the compensation waveguide, the resonant frequency corresponding to the optical resonance; and
         produces the secondary compensation output light in response to receipt of the resonant frequency;
   a thermal isolator on which the radiation absorber is disposed and that thermally isolates the radiation absorber from heat loss by thermal transfer due to physical contact by an object, and the temperature compensator changes the optical resonance of the compensation resonator in response to a change in temperature of the radiation absorber due to absorption of the ionizing radiation by the radiation absorber.

2. The photonic calorimeter of claim 1, further comprising a substrate on which the thermal isolator is disposed,
wherein the thermal isolator is interposed between the substrate and the radiation absorber, and
the radiation absorber is thermally isolated from the substrate by the thermal isolator.

3. The photonic calorimeter of claim 1, wherein the compensation resonator comprises an element from
group I of the periodic table (IUPAC group 11), group II of the periodic table (IUPAC group 12), group III of the periodic table (IUPAC group 13), group IV of the periodic table (IUPAC group 14), group V of the periodic table (IUPAC group 15), or group VI of the periodic table (IUPAC group 16) in an absence of a compound semiconductor comprising a group semiconductor.

4. The photonic calorimeter of claim 1, wherein the radiation absorber comprises graphite or water.

5. A process for performing calorimetry with the photonic calorimeter of claim 1, the process comprising: receiving, by the compensation waveguide, primary compensation input light; producing, by the compensation waveguide, resonant frequency from the primary compensation input light; receiving, by the compensation resonator, the resonant frequency from the compensation waveguide; producing, by the compensation resonator, secondary compensation output light from the resonant frequency; receiving, by the compensation waveguide, the secondary compensation output light from the compensation resonator; producing, by the compensation waveguide, primary compensation output light from the secondary compensation output light; subjecting the radiation absorber to ionizing radiation; producing, by radiation absorber, heat from the ionizing radiation; communicating the heat to the compensation resonator; and changing the optical resonance of the compensation resonator in response to producing heat from the ionizing radiation by the radiation absorber to perform calorimetry.

6. The process for performing dosimetry of claim 5, further comprising:
determining a first calorimeter response based on the primary compensation output light prior to subjecting the radiation absorber to the ionizing radiation.

7. The process for performing dosimetry of claim 6, further comprising:
determining a second calorimeter response based on the primary compensation output light after subjecting the radiation absorber to the ionizing radiation.

8. The process for performing dosimetry of claim 7, further comprising:
determining an amount of the ionizing radiation absorbed by the radiation absorber from the first calorimeter response and the second calorimeter response.

9. The process for performing dosimetry of claim 8, wherein determining the amount of the ionizing radiation absorbed by the radiation absorber comprises:
performing an inverse Monte Carlo conversion from a temperature change of the radiation absorber due to absorption of the ionizing radiation; and
determining an energy absorbed per unit mass of the radiation absorber from heating with the inverse Monte Carlo conversion.

10. The process for performing dosimetry of claim 7, wherein the first calorimeter response and the second calorimeter response differ in a resonance frequency, an amount of transmission, or a combination comprising at least one of the foregoing differences.

* * * * *